(12) United States Patent
Radermacher et al.

(10) Patent No.: US 8,917,027 B2
(45) Date of Patent: Dec. 23, 2014

(54) DRIVING DEVICE AND METHOD FOR DRIVING A LOAD, IN PARTICULAR AN LED ASSEMBLY

(75) Inventors: Harald Josef Gunther Radermacher, Aachen (DE); Pieter Gerrit Blanken, Nuenen (NL); Yifeng Qiu, Eindhoven (NL); Haimin Tao, Eindhoven (NL); Ronald Van Langevelde, Waalre (NL); Ralph Kurt, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/007,149

(22) PCT Filed: Mar. 28, 2012

(86) PCT No.: PCT/IB2012/051477
§ 371 (c)(1),
(2), (4) Date: Oct. 24, 2013

(87) PCT Pub. No.: WO2012/131592
PCT Pub. Date: Oct. 4, 2012

(65) Prior Publication Data
US 2014/0049174 A1  Feb. 20, 2014

(30) Foreign Application Priority Data

Mar. 28, 2011 (EP) ..................................... 11160015

(51) Int. Cl.
*H05B 33/08* (2006.01)
(52) U.S. Cl.
CPC .......... *H05B 33/0815* (2013.01); *H05B 33/083* (2013.01); *H05B 33/0821* (2013.01); *H05B 33/0851* (2013.01); *Y02B 20/348* (2013.01)
USPC ...................................... 315/200 R; 315/224

(58) Field of Classification Search
CPC ........................... H05B 33/08; H05B 33/0815
USPC ............................... 315/121, 200 R, 201, 224
See application file for complete search history.

(56) References Cited

U.S. PATENT DOCUMENTS

| 7,081,722 B1 | 7/2006 | Huynh et al. |
| 2010/0327761 A1* | 12/2010 | Jin ................. 315/219 |
| 2011/0057568 A1* | 3/2011 | Tsai et al. ....... 315/121 |
| 2014/0197760 A1* | 7/2014 | Radermacher ... 315/307 |

FOREIGN PATENT DOCUMENTS

| EP | 0925710 B1 | 9/2003 |
| EP | 2244533 A2 | 10/2010 |
| WO | 2010027254 A1 | 3/2010 |

OTHER PUBLICATIONS

"Dynamo-Powered Led Light Circuits for Bycycles", www.pilom.com/BicycleElectronics/DynamoCircuits.htm, Sep. 23, 2013.

\* cited by examiner

*Primary Examiner* — Don Le
(74) *Attorney, Agent, or Firm* — Yuliya Mathis

(57) ABSTRACT

Driver device and a corresponding driving method for driving a load, in particular an LED assembly comprising one or more LEDs. To provide a better performance, better cost-efficiency, improved power factor and reduced losses, a driver device (1,1', 2, 2') is provided comprising a rectifier unit (10) for rectifying a received AC supply voltage ($V_S$), load terminals (20) for providing a drive voltage ($V_L$) and/or a drive current ($I_L$) for driving said load, a capacitive storage unit (30) coupled between said rectifier unit and said load terminals for storing electrical energy provided by said rectifier unit and providing electrical energy to said load, and a bridge switching unit (40) coupled between said rectifier unit and said load for switching said capacitive storage unit into a load current path from said rectifier unit to said load terminals with a desired polarity and for switching said capacitive storage unit out of said load current path.

20 Claims, 32 Drawing Sheets

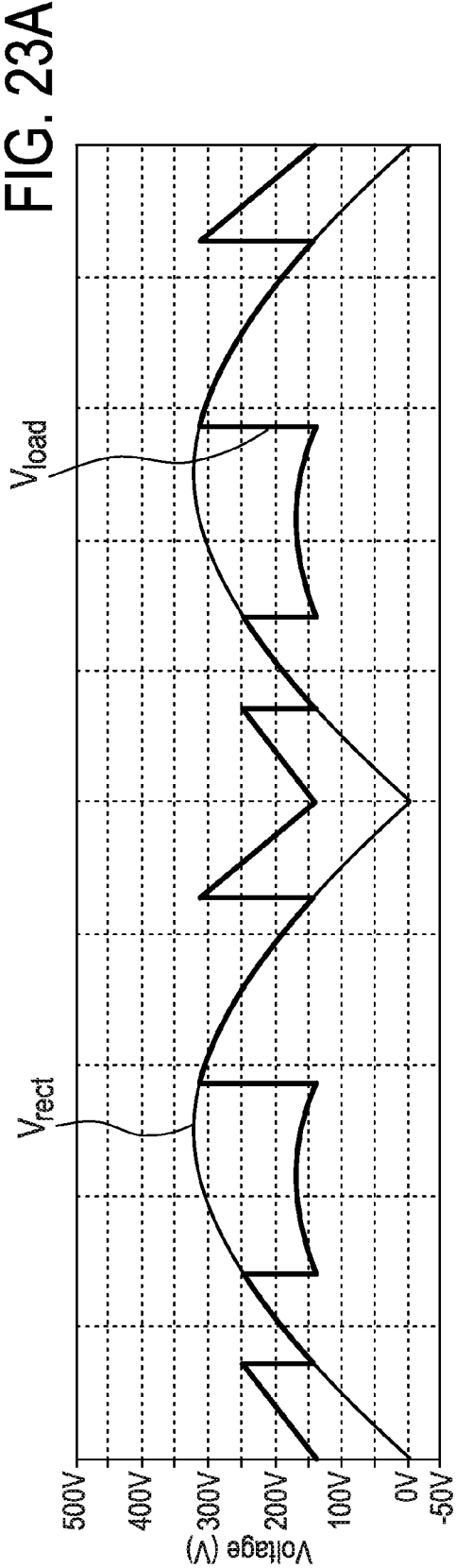
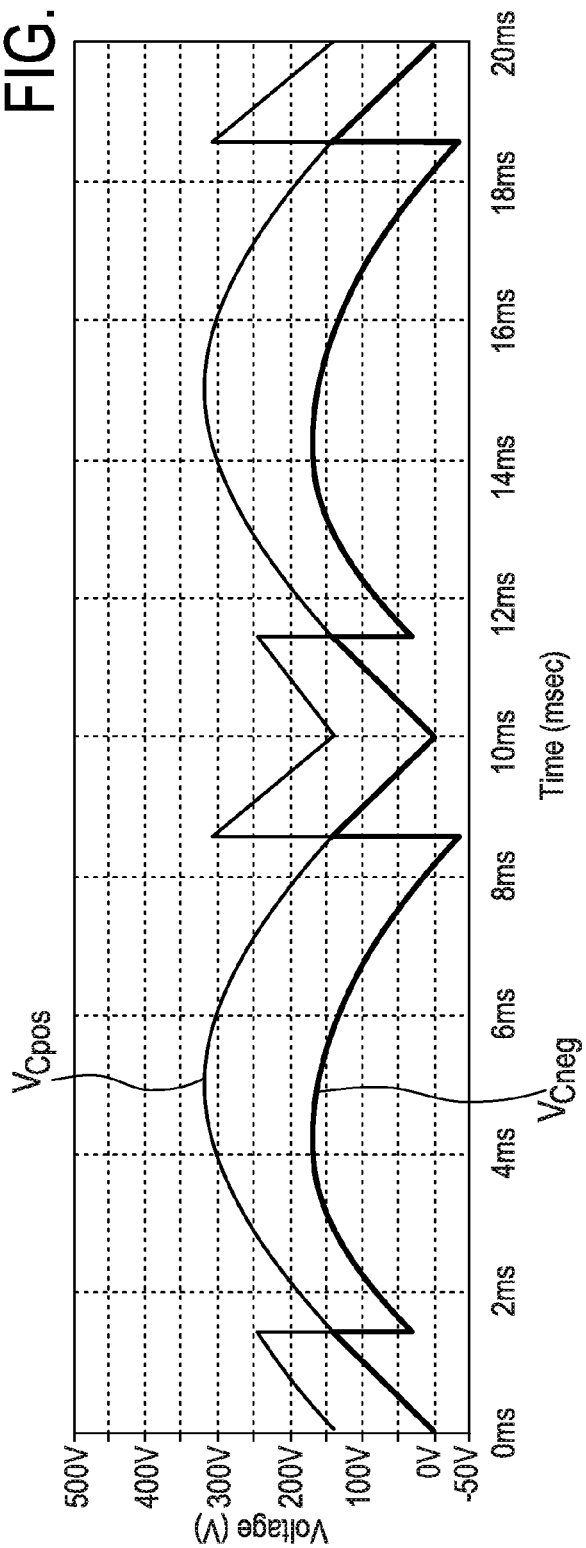

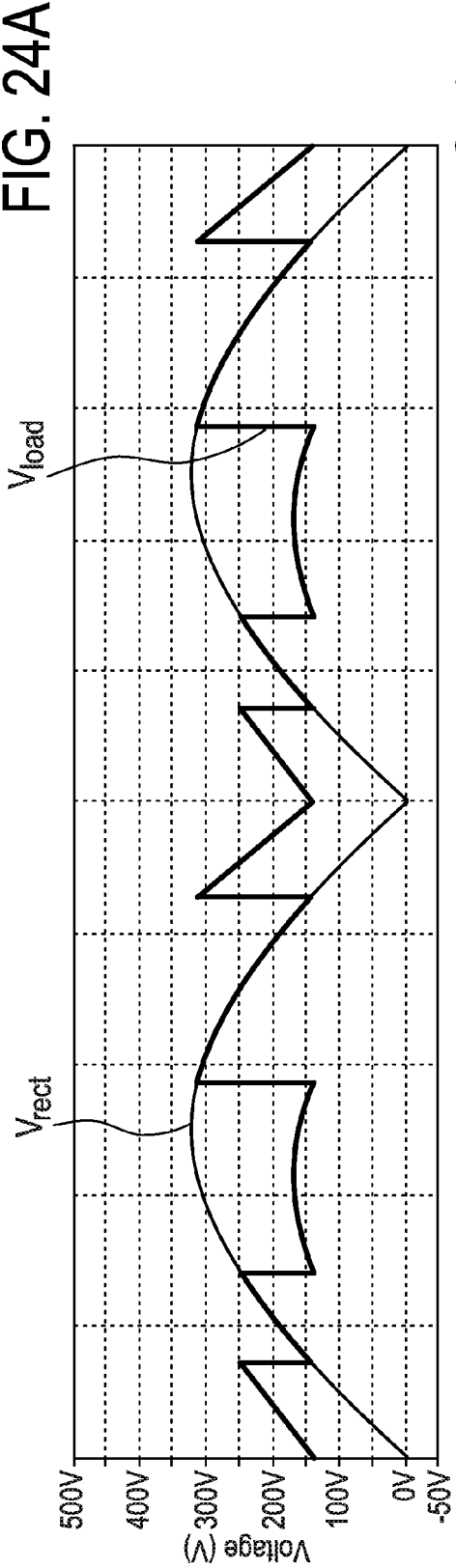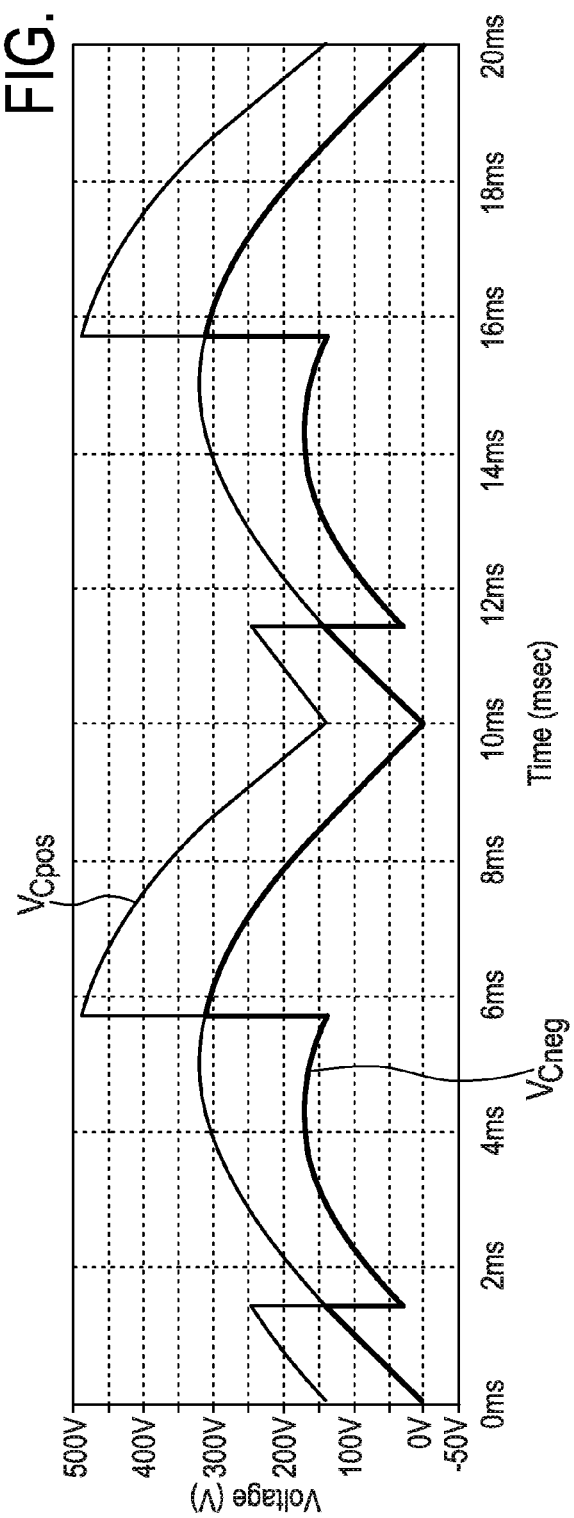
FIG. 24A
FIG. 24B

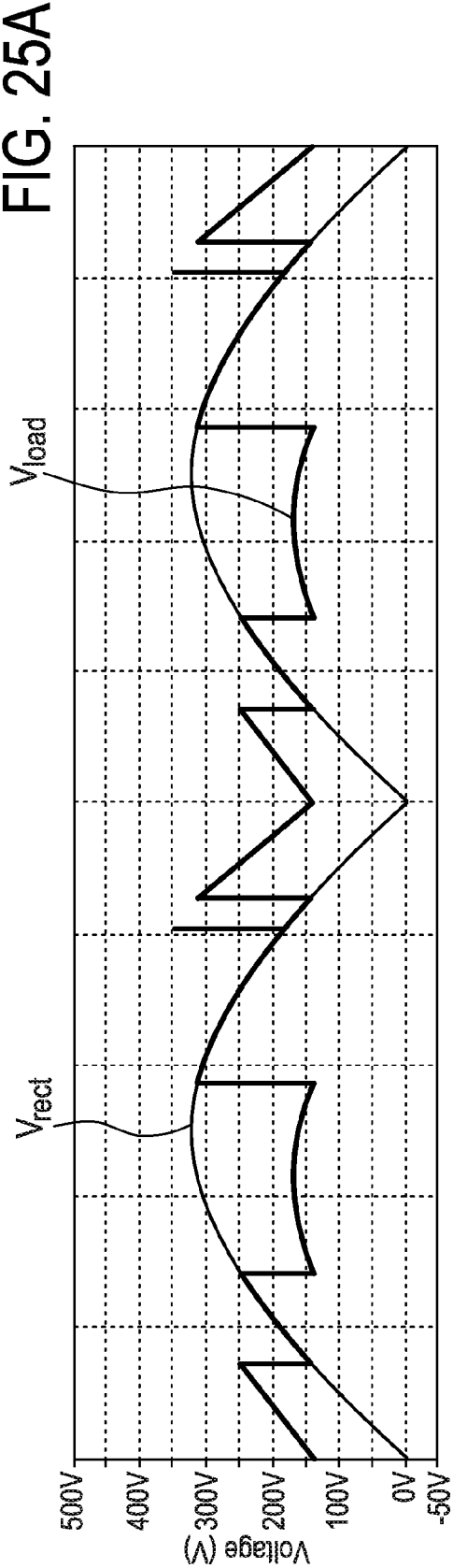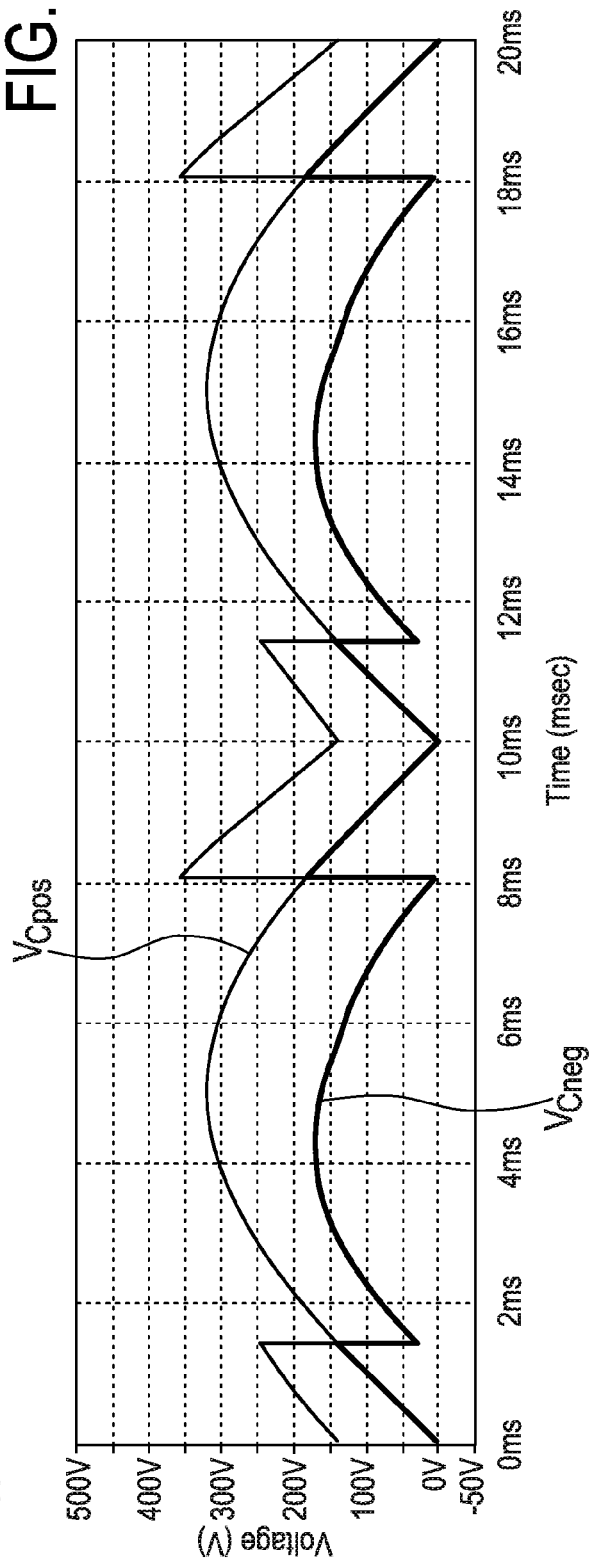

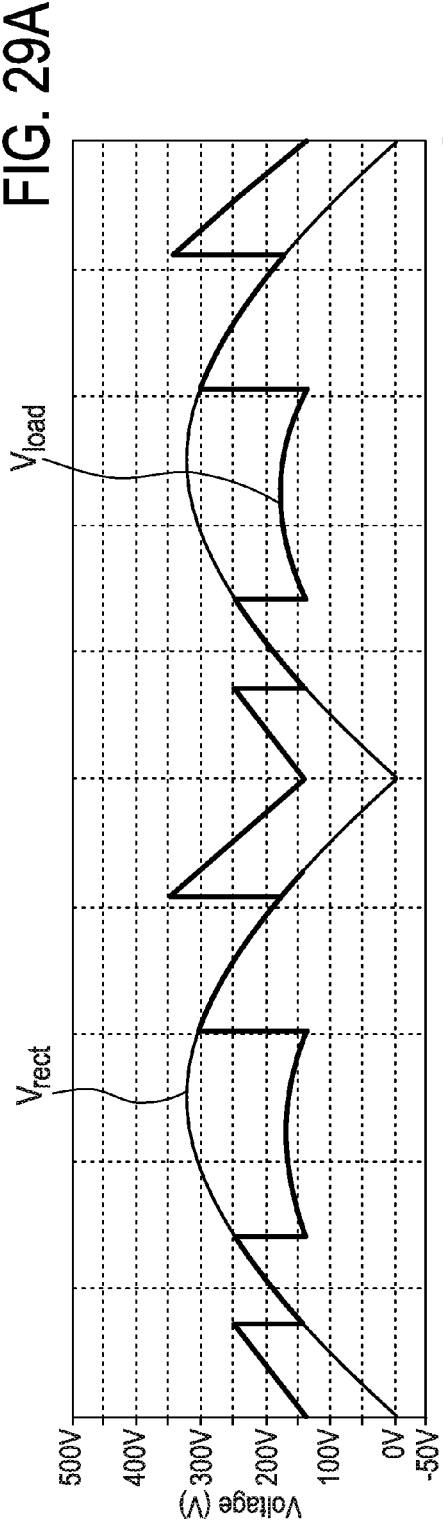
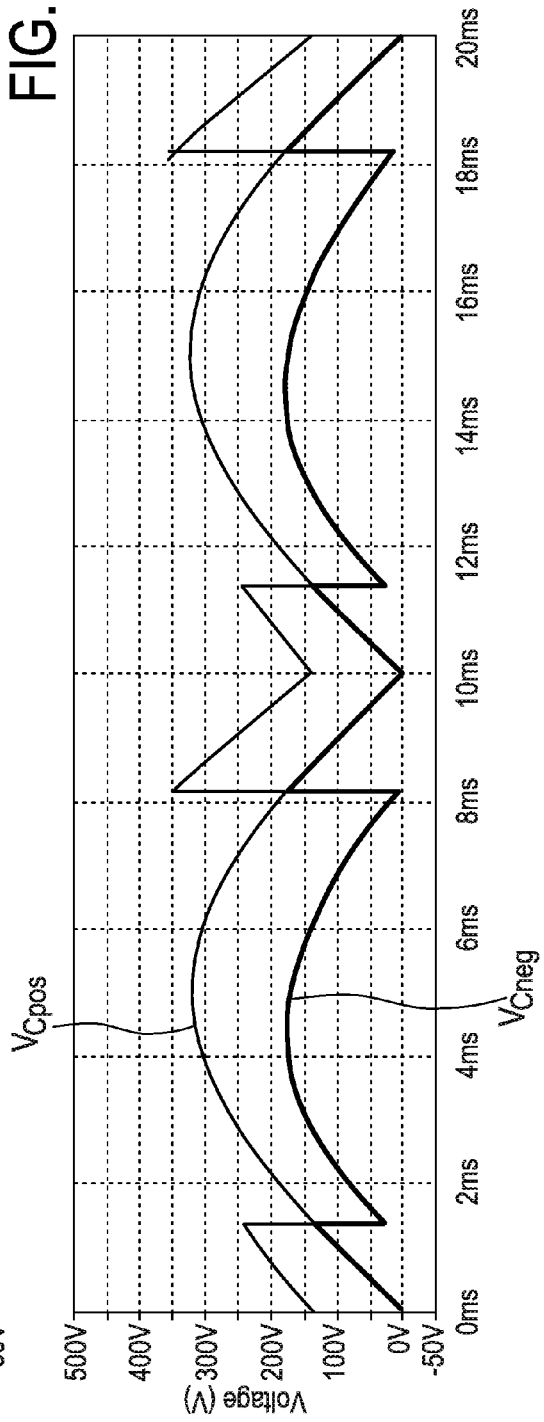

DRIVING DEVICE AND METHOD FOR DRIVING A LOAD, IN PARTICULAR AN LED ASSEMBLY

FIELD OF THE INVENTION

The present invention relates to a driver device and a corresponding driving method for driving a load, in particular an LED assembly comprising one or more LEDs. Further, the present invention relates to a lighting apparatus.

BACKGROUND OF THE INVENTION

The Light Emitting Diode (LED) is revolutionizing the lighting world. Its high and still increasing luminous efficacy, its long lifetime, its small form factor, its low weight, its ruggedness, its ease of manufacturing, etc., form driving forces for the lighting industry to move from the incandescent lamp to the LED lamp. However, the LED's non-linear (near exponential) I-V curve, its low operation voltage (a few volt) and its fast response of the current-to-light-output transfer create a number of problems when the lamp is to be supplied from mains voltage (e.g. 115 V AC or 230 V AC), including light output flicker and voltage misalignment.

Ideally the LEDs have to be supplied with a direct current as the transfer from current to light output is nearly linear. A solution is to apply an AC-DC converter to generate a DC supply for the LEDs from the mains input voltage. Such a converter can be controlled in such a way that the output current is set to a prescribed level. Preferably the prescribed level can be changed by actions undertaken by dimmers that are connected e.g. in series with the mains Live connection and the lamp. In order to realize a power-efficient solution, a common approach is to use a switched-mode power supply, built with (semiconductor) switches and inductive energy-storage components such as inductors or transformers. Especially the inductive components add to the cost and physical volume of the system.

The Tapped Linear Driver (TLD) concept as e.g. described in U.S. Pat. No. 6,989,807 B2, U.S. Pat. No. 7,081,722 B1 or U.S. 2008/0094000 A1, allows significant cost reduction for future mains-compatible drivers for LED lighting systems. Due to its small form factor it is suited for integrated LED light sources such as LED retrofit bulbs and spots, but also for down-light modules. The Tapped Linear Driver concept is low cost as it avoids the use of an inductive switched-mode power supply. It is based on applying high-voltage LEDs. Essentially a high-voltage voltage LED is a multi-junction LED, a string of series-connected LEDs, such that the high-voltage LED forward-biased voltage is several tens of volts when the LEDs emit light. In a Tapped Linear Driver several high-voltage LEDs are connected in series and the nodes at which the high-voltage LEDs are interconnected form the taps. Depending on the instantaneous value of the (rectified) mains voltage more or less high-voltage LEDs are supplied with current.

The current is supplied by a linear (non-switching) current source, in its simplest form a resistor. According to U.S. Pat. Nos. 6,989,807 B2 and 7,081,722 B1 the currents are supplied by parallel current sources, which offer the option to allocate different current values to the various current sources. According to U.S. 2008/0094000 A1 a single (constant) current source circuit is applied in series with the LED string while again multiple switches addressed by a logic circuit bypass the LEDs.

All of these TLD systems have one common disadvantage: if the (rectified) mains voltage falls below the voltage of the "shortest" high-voltage LED string, there is no light output. This happens around the zero crossing of the mains AC voltage. A solution proposed e.g. in WO 2010/027254 A1 is to insert a so-called fill-in capacitor. The fill-in capacitor is charged to nearly the peak value of the rectified mains voltage (+325V when the mains RMS voltage is 230V AC) and it supplies the energy to the LEDs for the time that the rectified mains voltage is "too low", in practice this is below a certain threshold value. During that time the diodes in the mains bridge rectifier are reverse biased and the fill-in capacitor is discharged by the LEDs from nearly +325V to e.g. +280V depending on various design parameters and choices.

Another disadvantage is the reduced efficiency. The linear current source will dissipate a certain amount of energy into heat, where the amount depends on the mismatch between momentary (rectified) mains and the available LED string voltage taps. Since the number of taps is normally limited (in order to avoid very high complexity and part count for the driver circuit) this voltage step and hence the mismatch and losses can be quite significant, resulting in driver efficiencies of approximately 80%.

When such a circuit is used with a dimmer in the mains supply branch a new problem arises. During the time that the fill-in capacitor is used to supply the energy, the current drawn from mains is substantially zero as the diodes in the mains bridge rectifier are reverse-biased, and this may lead to improper operation of the internal timing circuit of the dimmers, e.g. two-wire dimmers such as TRIAC dimmers. Such a dimmer is designed to operate with an incandescent lamp, which provides a conductive path all the time since the lamp itself is a resistor. Once a (non-dimmable) LED lamp is connected to the dimmer, this conductive path does not always exist. In most cases the lamp current stops flowing before the zero-crossing of the mains voltage. This results in no or incorrect activation of the power switch in the dimmer and leads to no or unstable light output (light flicker), which of course is unwanted.

In case of the power switch being a TRIAC, light flicker will also happen if the current drawn by the lamp is below the holding current of the TRIAC. In this situation, the dimmer stops conducting and the timing circuit may restart and trigger the TRIAC once again. This sequence may repeat. This is normally referred to as "multi-triggering" and also is unwanted.

The addition of the fill-in capacitor helps to maintain light output around the zero crossing of the mains voltage (flicker reduction), but creates problems with dimmers such as multi-triggering as its discharging current does not pass through the mains branches.

In general, in Solid State Lighting (SSL), i.e. in general illumination, the relative cost contribution of the driver is expected to increase due to the decrease in LED cost. So, in order to reduce the cost of the total system at a given performance level, also the driver has to become cheaper (in particular simpler and smaller) and/or more efficient. A closer linkage between LED and driver will still enable high performance. Besides the cost, for some countries certain mains regulations have to be fulfilled, such as low harmonic distortion and/or high power factor.

SUMMARY OF THE INVENTION

It is an object of the present invention to provide a driver device and a corresponding driving method for driving a load, in particular an LED assembly comprising one or more LEDs, providing a better performance and being more cost-effective. It is a further object to improve the power factor and reduce losses and output light flicker.

In a first aspect of the present invention a driver device for driving a load is presented that comprises
- a rectifier unit for rectifying a received AC supply voltage,
- load terminals for providing a drive voltage and/or a drive current for driving said load,
- a capacitive storage unit coupled between said rectifier unit and said load terminals for storing electrical energy provided by said rectifier unit and providing electrical energy to said load, and
- a bridge switching unit coupled between said rectifier unit and said load for switching said capacitive storage unit into a load current path from said rectifier unit to said load terminals with a desired polarity and for switching said capacitive storage unit out of said load current path.

In a further aspect of the present invention a driving method is presented comprising the steps of:
- rectifying a received AC supply voltage by a rectifier unit,
- providing a drive voltage and/or a drive current at load terminals for driving said load,
- storing electrical energy provided by said rectifier unit and providing electrical energy to said load by a capacitive storage unit coupled between said rectifier unit and said load terminals, and
- switching said capacitive storage unit into a load current path from said rectifier unit to said load terminals with a desired polarity and switching said capacitive storage unit out of said load current path by a bridge switching unit coupled between said rectifier unit and said load.

Preferred embodiments of the invention are defined in the dependent claims. It shall be understood that the claimed method has similar and/or identical preferred embodiments as the claimed device and as defined in the dependent claims.

The present invention provides a (theoretically) non-lossy, high power factor driver, in particular for mains powered, high voltage LEDs. The driver can be operated differently. In an embodiment the driver can operate approximately for 50% of the mains half cycle in the non-lossy mode and power the load (e.g. an LED or a string of LEDs) very efficiently. For the remaining part of the mains half cycle, the driver can operate in the known lossy modes. Effectively, the total losses can be cut to half. The power factor is particularly improved by avoiding the current peaks due to charging of buffer capacitors near the peak of the (rectified) supply voltage, as occurs in the case of supply rectification with a large fill-in buffer capacitor to generate a near-constant DC voltage.

According to the present invention, it is proposed to connect a capacitive storage unit, e.g. a capacitor, in series with a rectifier unit, e.g. converting a supplied mains voltage into a DC voltage, via a bridge switching unit, e.g. a switch network such as a full bridge. Further, by the bridge switching unit the capacitor can be coupled in series to the load. The load current through the LEDs and the driver is alternately used to charge and discharge the capacitive storage unit or is bypassed around the capacitive storage unit. In this way the load current can flow for 100% of the AC supply voltage (e.g. mains voltage) cycle, which is good for proper operation with various types of dimmers. Switching the polarity of the capacitive storage unit can be implemented with the bridge switching unit. Its timing is adapted to maintain a stable average voltage over time across the capacitive storage unit.

It shall be noted here that the proposed driver device generally receives as input an AC supply voltage, which can be provided by any pre-processing unit (such as a transformer, inverter or dimmer) which converts an AC mains voltage (or any other available voltage) into the required AC supply voltage. It may, of course, also be possible to directly use an available AC mains voltage as AC supply voltage if it fulfils the criteria for being used as input for the driver device, which is often the case. Hence, wherever "supply voltage" is mentioned herein, it may also be understood in certain conditions as "mains voltage" or, in other embodiments, as "dimmed mains voltage".

In a preferred embodiment said bridge switching unit comprises a full bridge of two switch paths coupled in parallel each comprising two switches coupled in series, wherein said capacitive storage unit is coupled between series coupling terminals of said two parallel switch paths, at which series coupling terminals the two switches of each of said two switch paths are connected. Generally, the switches can each be separately controlled to operate the driver device in the desired mode.

According to a simple embodiment said capacitive storage unit comprises a single capacitor. Alternatively, said capacitive storage unit comprises two or more capacitors coupled in parallel and said bridge switching unit is adapted for separately switching them into or out of said load current path, e.g. for activating a desired number of capacitors and switching them separately—with desired polarity—into or out of said load current path. This allows to choose the effective capacitance and to adjust the amount of load current, e.g. to adjust the current to different values during the mains cycle in order to provide a smoothed light output.

Generally, in such an embodiment for each additional capacitor a separate full bridge of four switches as mentioned above can be provided. However, in a much more simple embodiment it is sufficient that said bridge switching unit comprises an additional capacitor switch per capacitor for all or some capacitors, preferably for all capacitors except for a first capacitor, which additional capacitor switch is coupled in series to its associated capacitor. Alternatively, in another simple embodiment said bridge switching unit comprises an additional switch path per capacitor for all or some capacitors, preferably for all capacitors except for a first capacitor, coupled in parallel to the two switch paths of the full bridge. The simple capacitor switches of these embodiments also allow for the desired setting of the effective capacitance to adjust the amount of load current.

Preferably, the driver device further comprises a current source coupled between said rectifier unit and said load terminals. This current source is particularly useful in an operating mode where the capacitive storage unit is not used for setting the current, but said current source is used to limit the load current in a lossy mode.

In a preferred embodiment the direction of the current through the capacitor storage unit can be simply changed for which purpose said bridge switching unit is controlled to switch said capacitive storage unit into said load current path with a first polarity when the instantaneous value of the rectified supply voltage is higher than the load voltage and to switch said capacitive storage unit into said load current path with a second polarity opposite the first polarity when the instantaneous value of the rectified supply voltage is lower than the load voltage.

In an embodiment said bridge switching unit is controlled to alternately switch said capacitive storage unit into said load current path with the first and second polarity, in particular once, twice or four times during a half cycle of the rectified supply voltage. Switching an even number of times per half cycle of the rectified supply voltage allows the voltage of the capacitive storage unit to be always positive, which is preferred if the above mentioned full bridge of four switches is used as bridge switching unit. The advantage is that unidirectional switches can be used to implement the four switches of the full bridge, e.g. a single diode, a single NMOS transistor, a single PMOS transistor, etc. The positive voltage across the capacitive storage unit allows the use of a cheap electrolytic capacitor. Otherwise a larger and more expensive film capacitor would be needed.

In a further embodiment said bridge switching unit is controlled to control the timing of the switching of said capacitive storage unit into said load current path with said different polarities by a delay time with respect to the zero crossings of the rectified supply voltage. Thus, the phases during which the various branches of the bridge switching unit are conductive can be shifted i.e. delayed or advanced with respect to the mains cycle. How the timing is best chosen depends on which objective is pursued and on the kind of application. The value of the time delay may be generated by a feedback-and-control mechanism or may be predetermined.

Advantageously, said bridge switching unit is controlled to switch said capacitive storage unit out of said load current path when the electrical energy stored in the capacitive storage unit shall not be used for supplying the load. During this time the capacitive storage unit is neither charged nor discharged. Nevertheless, the timing of the switching can be controlled such that the load can still be provided with sufficient energy. This mode of operation is especially useful in combination with the non-lossy current limiting. At the end of this non-lossy current limitation, the capacitors may remain charged to a certain voltage level. This charge is to be preserved in the capacitors up to the beginning of the next cycle to enable starting of input current and/or LED powering. Further, an advantage of this embodiment is that the ratio of maximum load voltage and minimum load voltage is reduced, which helps to create less output light flicker and to improve the power factor. Also the required number of high-voltage LEDs may be reduced, which is good for cost reduction. Still further, the swing of the capacitor voltage is relatively small. This translates into a smaller capacitor for the same power.

Still further, in an embodiment said bridge switching unit is controlled to charge said capacitive storage unit to a predetermined voltage, in particular a predetermined initial capacitor voltage, for instance to keep the voltage over the capacitive storage unit within predetermined lower and upper capacitor threshold voltages. This is particularly important to make sure that also in the initial phase sufficient current load is provided. Also the timing of the switching is preferably controlled accordingly to make this sure. At start-up, the capacitor is empty. The purpose of the start-up sequence is to make sure that the capacitor is quickly charged to about the typical voltage. That means that directly after switch on, the load current can immediately be used to charge the capacitor, but it cannot be guaranteed that immediately light is generated, for that requires the load voltage to be at least as large as the forward voltage of the shortest LED string. If the start-up sequence is defined as the time between power switch on and the time that equilibrium is attained, then during the first part of the start-up sequence there will not yet be continuous light output, while during the last part there will be continuous light output (although maybe not with the right magnitude). Here, continuous is to be understood as meaning "over the entire mains half cycle".

Preferably, said switches are implemented as bidirectional or unidirectional switches, in particular comprising one or more PMOS transistors, NMOS transistors or diodes. Both alternatives have their own advantage and are generally selected dependent on the desired application and implementation. Of course, other elements could also be used, such as NPN or PNP transistors, IGBTs or other switch implementations.

For instance, in a practical implementation said switches are implemented by bidirectional switches and a bidirectional switch is implemented by two anti-series connected high-voltage NMOS transistors having a common gate terminal and common source terminal. In alternative practical implementation said switches are implemented by unidirectional switches and a unidirectional switch is implemented by a single transistor, e.g. a high-voltage transistor, or a diode, where applicable.

In a further embodiment said bridge switching unit is controlled to switch said capacitive storage unit such that the local minimum values of the load voltage per half cycle of the rectified supply voltage are substantially equal. In a practical implementation, it is e.g. preferred that the load voltage never drops below the minimum level required to produce sufficient light. This level depends on how the LED strings plus the driver load is implemented. E.g. if it is desired to be able to forward bias at least two 66V LED strings, a minimum load voltage of the order of 134V is needed (2*66V and some voltage headroom (e.g. 2V) for the current-source driver). As the forward LED string voltage depends on temperature, current level and also shows production spread, an absolute voltage level cannot be given. An alternative criterion would then be to guarantee sufficient current in at least two (or another number) high-voltage LEDs. Further, this embodiment is an optimized timing control of the capacitor, resulting in a more symmetrical waveform which is beneficial for improving the electrical efficiency.

Generally, for controlling the switches of said bridge switching unit appropriate control means are provided. Said control means are generally implemented by elements, e.g. by a processor or dedicated hardware, and are adapted for performing tasks that are necessary according to the respective application and implementation, such as measuring and comparing voltages and/or currents, storing the current status, operating differently in the rising slope of the mains voltage than in the falling slope, adjusting timing for actuating the shunting of parts of the LED string, providing continuous input current, adjusting the effective storage capacitance in order to smooth light output or harmonics, etc.

According to preferred embodiments of the present invention advantageous switch control circuits and methods are provided which reduce the voltages on the bridge nodes of said bridge switching unit whilst keeping them positive at all times, without significantly changing the situation for the load. These control methods define at which time moments and in which sequence, respectively, the switches are switched open and close.

Further, switch control methods are provided which allow for a larger series capacitor value range, create less glitches, have better compatibility with phase-cut dimmers, and avoid overcharging the switched series capacitor and too high node voltages.

BRIEF DESCRIPTION OF THE DRAWINGS

These and other aspects of the invention will be apparent from and elucidated with reference to the embodiment(s) described hereinafter. In the following drawings FIG. 23 shows waveforms of voltages when using a first switch control method, FIG. 24 shows waveforms of voltages when using a second switch control method, FIG. 25 shows waveforms of voltages when using a third switch control method, FIG. 29 shows waveforms of voltages when using a fourth switch control method.

DETAILED DESCRIPTION OF THE INVENTION

Figure 1:
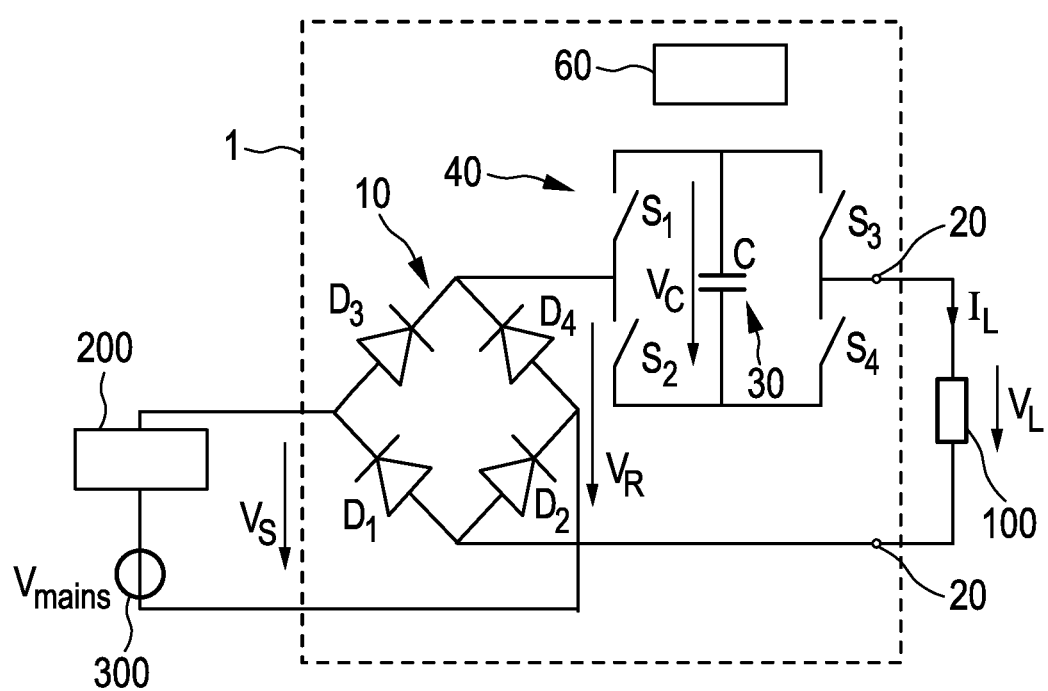
FIG. 1 shows a circuit diagram of a first embodiment of a driver device according to the present invention.

FIG. 1 shows a first embodiment of a driver device 1 (also called driver circuit) for driving a load 100, in particular an LED assembly comprising one or more LEDs, according to the present invention. Said driver device 1 comprises a rectifier unit 10 for generating a rectified supply voltage $V_R$ by rectifying a received AC supply voltage $V_S$, which is in this embodiment supplied by a (external) dimmer 200 coupled to a (external) mains voltage supply 300 providing a mains voltage $V_{mains}$. The drive voltage $V_L$ for driving the load 100 is provided at a pair of load terminals 20. A capacitive storage unit 30 is coupled between rectifier unit 10 and the load 100 for storing electrical energy provided by the rectifier unit 10 and providing electrical energy to load 100. A bridge switching unit 40 is coupled between the rectifier unit 10 and the load 100 for switching the capacitive storage unit 30 into a load current path from the rectifier unit 10 to the load 100 with a desired polarity and for switching the capacitive storage unit 30 out of said load current path.

In the embodiment shown in FIG. 1 the rectifier unit 10 is implemented by a full bridge diode rectifier of four diodes $D_1 \ldots D_4$, the capacitive storage unit 30 is implemented by a single capacitor C, and the bridge switching unit 40 is implemented by a full bridge circuit of four switches $S_1 \ldots S_4$, wrapping said capacitor C and is coupled in series with the load 100. Further, for controlling the switches of said bridge switching unit 40 (and for controlling other components if appropriate and needed a control unit 60 is preferably provided (although it is not explicitly shown in all figures).

Figure 2:
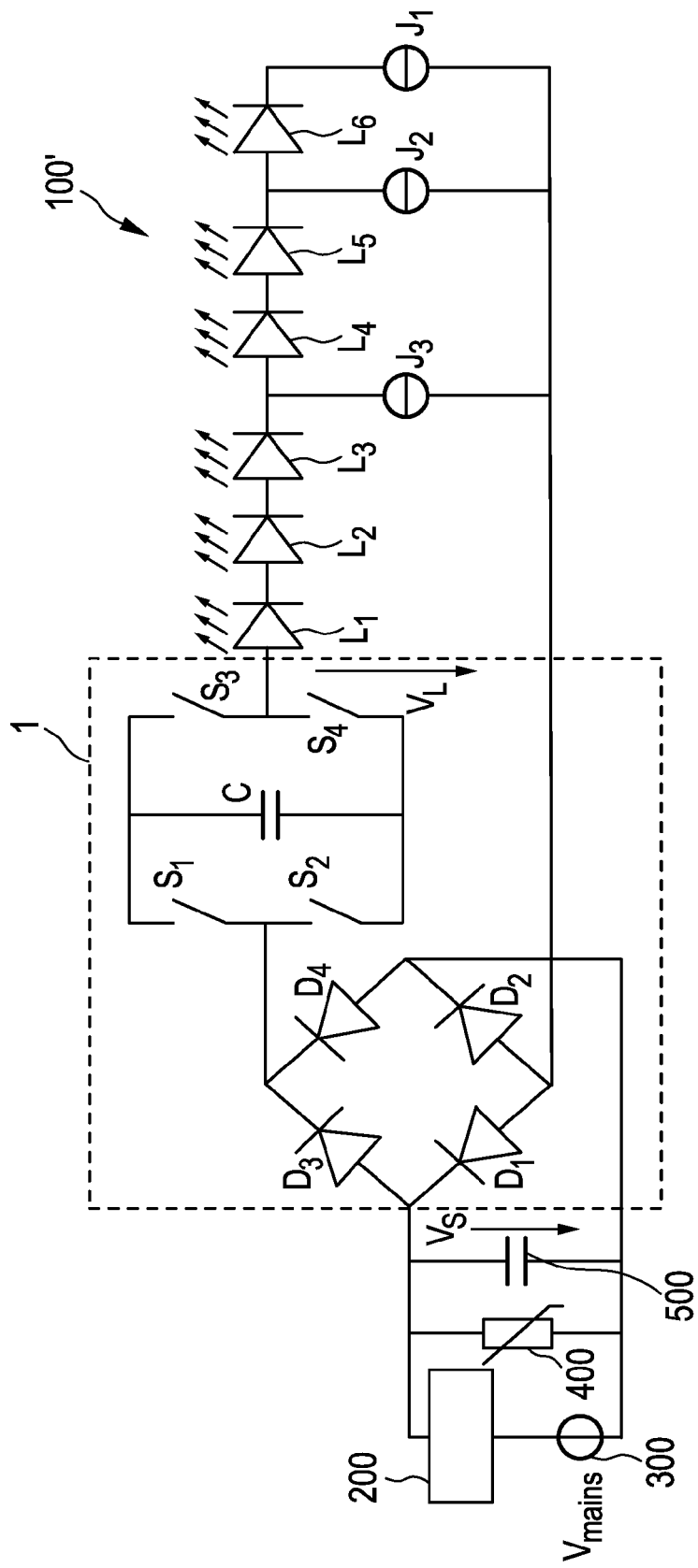
FIG. 2 shows a circuit diagram of a second embodiment of a driver device according to the present invention.

In FIG. 1 the load 100 is represented by a simple resistor symbol, but according to the present invention any type of linear or non-linear load can be driven by the driver device 1. As an example of a non-linear load, FIG. 2 shows a tapped LED string load 100'. Said tapped LED string load 100' comprises multiple high-voltage LED strings $L_1 \ldots L_6$ coupled in series and one or more controllable current sources $J_1 \ldots J_3$ coupled to different nodes (taps) of said LED string load 100'. These controllable current sources $J_1 \ldots J_3$ ensure that depending on the instantaneous value of the load voltage $V_L$ more or less high-voltage LEDs of said multiple high-voltage LEDs $L_1 \ldots L_6$ are provided with current. This offers the possibility to provide different current values to the various current sources $J_1 \ldots J_3$. Further, in this embodiment the supply voltage $V_S$ is provided at a parallel circuit of a variable resistor 400 and a capacitor 500 coupled in parallel to the series coupling of the mains voltage supply 300 and the dimmer 200.

In these embodiments the load voltage $V_L$ supplied to the load 100 or 100' is the sum of the rectified supply voltage $V_R$, generated by the mains bridge rectifier 10, and the (switched) series capacitor voltage $V_C$, generated by the energy storage capacitor C and the bridge switching unit 40. In principle either switches $S_1$ and $S_4$ are closed or switches $S_2$ and $S_3$ are closed or switches $S_1$ and $S_3$ are closed or switches $S_2$ and $S_4$ are closed. Synchronous closing of switches $S_1$ and $S_2$ or switches $S_3$ and $S_4$ is not considered useful for normal operation. As long as current flows through the load 100, it also flows through the mains full-bridge rectifier 10. As long as its value is above the dimmer holding current, dimmer triggering problems are avoided and no bleeder (as e.g. described in WO 2011/013060 A) is necessary. The timing of the bridge switching unit 40 should be controlled in such a way that the load current $I_L$ can continue to flow for 100% of the time, so also during the zero crossing of the mains voltage. This requires that the load voltage $V_L$ remains above the minimum string voltage of the tapped linear driver string, which is e.g. 48V or 64V. In this way the LEDs will generate light for 100% of the time, which is good for light flicker reduction.

Although the load 100 can be designed in such a way that the load current continues to flow when the load voltage is below the minimum string voltage, this is generally not considered useful as light output cannot be generated then, resulting in light flicker. This is particularly true in combination with a large, bulky capacitor. In combination with a small capacitor in the non-lossy version, but also to enable current flow immediately after power on, shorting the load is useful.

Figure 3:
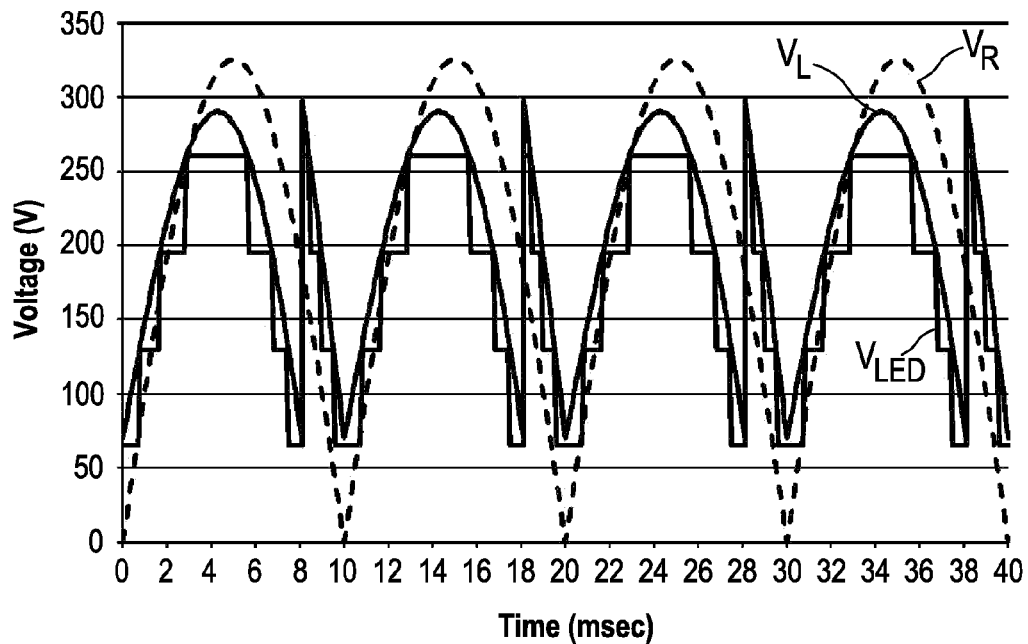
FIG. 3 shows example waveforms for a first mode of operation.

An example set of waveforms for the embodiment of the driver device 1 shown in FIG. 2 is shown in FIG. 3. The rectified supply voltage $V_R$ achieves a peak value of 230V*√2=325V. FIG. 3 further shows the load voltage $V_L$ that can be achieved by the embodiment of the driver device 1 and the string voltage $V_{LED}$ of the LEDs $L_1 \ldots L_6$. It can be seen that at least one high-voltage LED is always conducting and emitting light. Up to four high-voltage LEDs are thus powered. More details will be provided in the following.

As can be seen the power factor is improved. Assuming a constant current load, the input current waveform resembles an alternating square wave. Since the capacitor charging and discharging current is equal to the load current, a further advantage is the significant reduction of the repetitive peak in the input current waveform, which is favorable for TRIAC dimmers.

The operation shall be explained in more detail with reference to the test circuit depicted in FIG. 4. In this example the load is represented by a current source 110 with fixed value $J_L$. A dimmer is assumed not present. The mains voltage $V_{mains}$ is assumed to be 230V RMS, 50 Hz. The load current $J_L$ is assumed to be 50 mA. In this constant-current example the bridge switching unit 40 needs to be switched with a 50% duty cycle to keep the average capacitor voltage $V_C$ constant over time.

Assuming that repetitive waveforms are desired, the choice can be made how many times the bridge switching unit 40 is switched per supply half cycle. For simplicity's sake of the explanation provided herein, the following explanation will be limited to switching once or twice or four times per supply half cycle.

Figure 4:
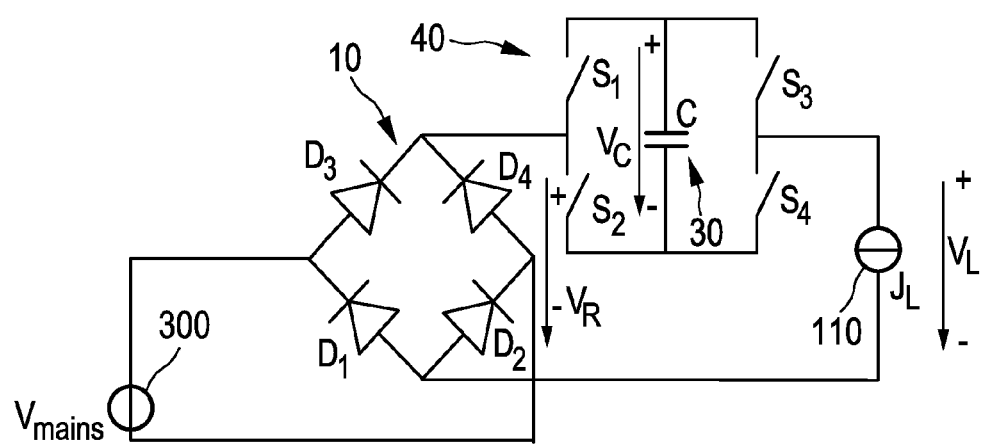
FIG. 4 shows a circuit diagram of a test circuit of a driver device according to the present invention.

Referring to FIG. 4, in a first example it is assumed that the bridge switching unit 40 is switched twice per supply half cycle, i.e. every 5 ms. The series capacitor C is assumed to have a value of 10 µF. The capacitor voltage swing then is $\Delta V_C = J_L * \Delta t/C = 50$ mA*5 ms/10 µF=25V. When the average capacitor voltage is chosen to be 100V and the bridge switching unit 40 is switched at $t_1$=2.5 ms and at $t_2$=7.5 ms (leading to 50% duty cycle) the voltages will be as shown in FIG. 5.

Figure 5:
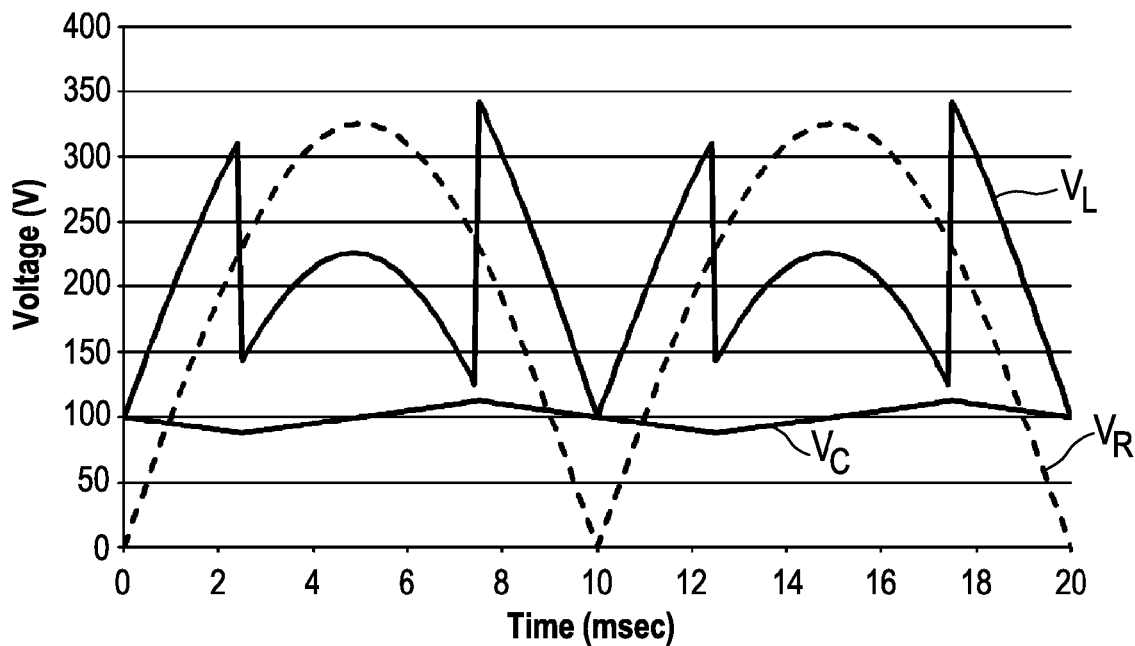
FIG. 5 shows example waveforms of voltages in the test circuit for first settings.

FIG. 5 shows the rectified supply voltage $V_R$, the capacitor voltage $V_C$ and the load voltage $V_L$. Initially, the capacitor C is discharged by the load current around the zero crossing of the mains voltage. Because the average capacitor voltage is chosen as high as 100V, the minimum capacitor voltage still is $V_{C,min}$=87.5V. The bridge switching unit 40 is switched at $t_1$=2.5 ms and from then on the capacitor C is charged by the same load current until at $t_2$=7.5 ms the bridge switching unit 40 is switched again. The capacitor C was thus charged around the peak value of the rectified supply voltage. Under these circumstances the minimum load voltage is $V_{L,min}$=100V, which is attained at the mains voltage zero crossing. The maximum load voltage is $V_{L,max}$=343V, which exceeds the peak mains voltage. That maximum value is attained directly after switching at $t_2$=7.5 ms.

Figure 6:
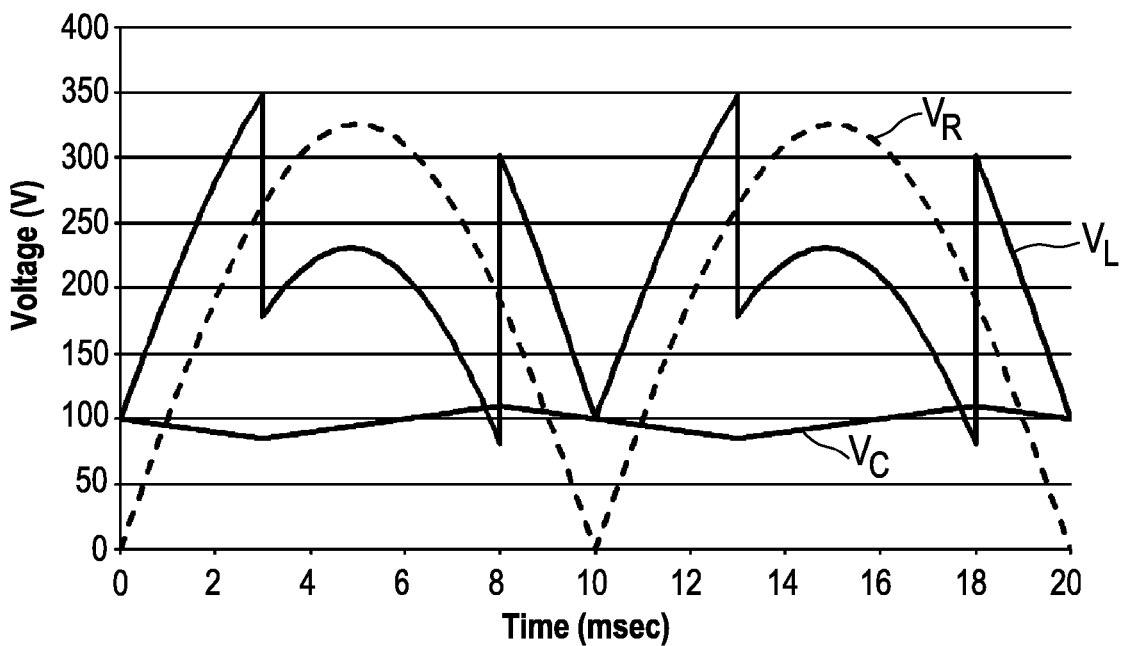
FIG. 6 shows example waveforms of voltages in the test circuit for second settings.

By delaying the timing slightly over +0.5 ms the waveforms change to those shown in FIG. 6. The minimum capacitor voltage now slightly reduces to $V_{C,min}$=85V, whereas the maximum voltage has reduced to 110V, so the average capacitor voltage has reduced slightly to 97.5V. Under these circumstances the minimum load voltage is $V_{L,min}$=81.2V, which is attained directly before switching at $t_2$=8 ms. The maximum load voltage is $V_{L,max}$=348V, which again exceeds the peak mains voltage. That maximum value is attained directly before switching at $t_1$=3 ms.

If the initial capacitor voltage is subsequently changed to 120V the waveforms change to those of FIG. 7. The minimum capacitor voltage now changes to $V_{C,min}$=105V. Under these circumstances the minimum load voltage is $V_{L,min}$=61.2V, which is attained directly before switching at $t_2$=8 ms. The maximum load voltage is $V_{L,max}$=368V, which again exceeds the peak mains voltage. That maximum value is attained directly before switching at $t_1$=3 ms.

Generally, the initial capacitor voltage will most probably be (close to) zero volt, e.g. when the driver device has not been connected to the supply voltage for a very long time. When the capacitor has no or negligible or too low charge, the general idea of the proposed invention is hard to be realized, which is to make sure that the load is supplied with a sufficiently high load voltage over the entire supply cycle, in order to be able to generate light over the entire supply cycle, and to ensure that supply current is flowing over the entire supply cycle (among others for dimmer compatibility). Therefore a start-up sequence is preferably added.

In a start-up sequence the timing of the various switches in the bridge switching unit around the capacitor is different from the sequence when equilibrium is reached. Initially the switch timing is chosen such that the capacitor is being charged more than discharged until the capacitor voltage is high enough to generate light output over the entire supply cycle. This implies that the various charge cycles, during which switches $S_1$ and $S_4$ are closed initially last longer than the discharge cycles, during which switches $S_2$ and $S_3$ are closed, e.g. by completely omitting the discharge mode initially.

Figure 8:
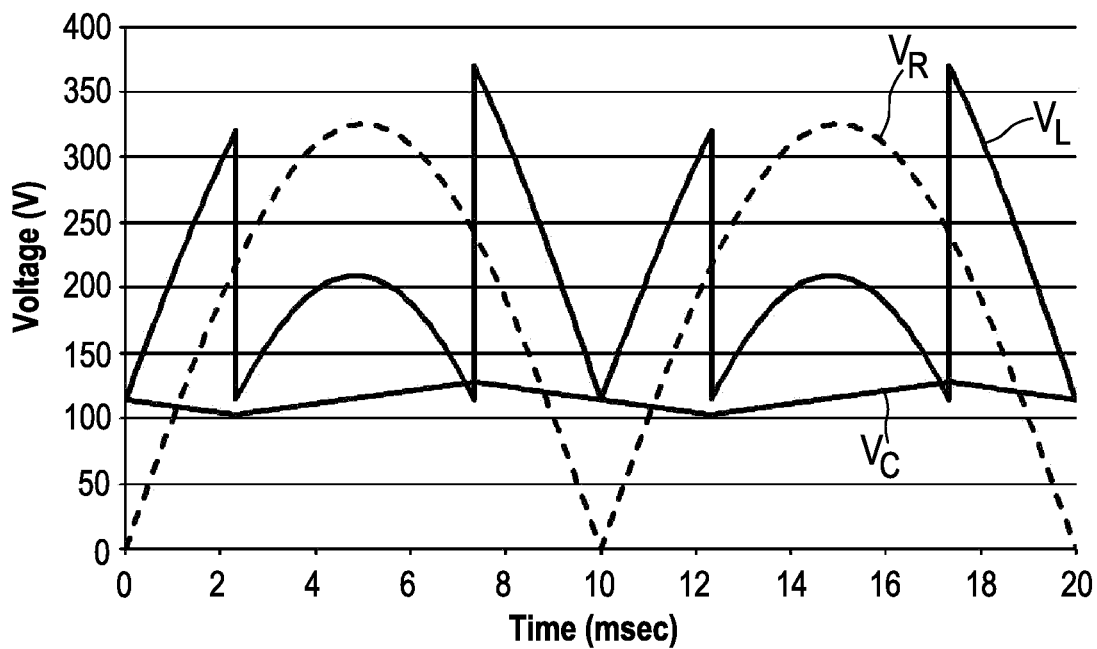
FIG. 8 shows example waveforms of voltages in the test circuit for fourth settings.

The timing and the initial capacitor voltage can also be chosen such that the three local minimum values per supply half cycle of the capacitor voltage are equal, as is shown in FIG. 8. The minimum capacitor voltage now changes to $V_{C,min}$=103V. Under these circumstances the minimum load voltage is $V_{L,min}$=114.4V, occurring three times per supply half cycle: directly after switching at $t_1$=2.327 ms, directly before switching at $t_2$=7.327 ms and at the mains voltage zero crossing. The maximum load voltage is $V_{L,max}$=370V, which exceeds the peak mains voltage.

The above-given examples clearly show that (apart from the situations when the mains voltage is not present or, when it is present, directly after start-up) the load voltage never attains a zero value. The minimum value can be chosen to be at least tens of volts. On the other hand a maximum value of the load voltage significantly exceeding the mains peak voltage is not attractive, as it might require an extra high-voltage LED to keep the power efficiency sufficiently high, and that adds to the cost.

Switching twice per supply half cycle allows the capacitor voltage to be always positive, which is attractive for the implementation of the bridge switching unit 40. The switches $S_1 \ldots S_4$ preferably require a unidirectional voltage blocking capability. For instance $S_1$ and $S_4$ can be realized with high-voltage diodes. Switch $S_2$ can be realized with a high-voltage NMOS transistor and switch $S_3$ can be realized with a high-voltage PMOS transistor.

As explained above the choice can also be made to switch the bridge switching unit 40 in FIG. 4 only once per supply half cycle. That means that at 50 Hz mains frequency the capacitor is discharged during 10 ms and charged during the next 10 ms. For the duration of half a supply cycle (10 ms at 50 Hz) the load voltage $V_L$ is the rectified supply voltage $V_R$ minus the capacitor voltage $V_C$ and during the next 10 ms the load voltage $V_L$ is the rectified supply voltage $V_R$ plus the capacitor voltage $V_C$. To assure that the waveforms in the various supply half cycles are identical, the capacitor voltage on average is preferably zero. This is an important difference with respect to the case of switching the bridge switching unit 40 an even number of times per supply half cycle, where the average capacitor voltage can be chosen freely. In general switching an odd number of times per supply half cycle and requiring that the waveforms in the various supply half cycles are identical results in the requirement that the capacitor voltage on average is zero.

A capacitor voltage that on average is zero is less attractive for the implementation of the bridge switching unit 40, as the switches $S_1 \ldots S_4$ preferably require a bidirectional voltage blocking capability. The switches $S_1 \ldots S_4$ preferably are four-quadrant switches and can e.g. be realized using two anti-series connected high-voltage NMOS transistors (common gate and common source). As the complexity is somewhat higher than in the other case this is better suited for monolithic integration than to be realized with discrete components.

However, it is quite possible that the average capacitor voltage is (close to) zero. It is less attractive for the implementation of the bridge switching unit as the switches then require a bidirectional voltage blocking capability, meaning that they should be able to be non-conductive with a positive voltage across the terminals, but also be non-conductive with a negative voltage between the terminals. In power electronics this is usually described as a four-quadrant switch. Such a bidirectional or four-quadrant switch can e.g. be realized using two anti-series connected (e.g. NMOS) transistors (common gate and common source). As the complexity of a bidirectional switch with control circuitry is higher than that of a unidirectional switch (which can be realized with a single transistor) and occupies a larger active silicon area than a unidirectional switch (to achieve the same equivalent on-resistance between the switch terminals, a bidirectional switch realization requires four times more active silicon area), the case in which bidirectional switches are needed is better suited for monolithic integration than to be realized using discrete (separate) transistors.

In order to guarantee a minimum load voltage of several tens of volt, it can be understood that the capacitor C has a much lower value than the previous case (10 μF). In the below examples a value is chosen of 2.2 μF. Due to the alternating polarity of the capacitor voltage, the capacitor C cannot be of the electrolytic type, so a non-electrolytic type is preferably chosen like e.g. a film capacitor, which, in general, has a longer lifetime than an electrolytic capacitor.

Figure 9:
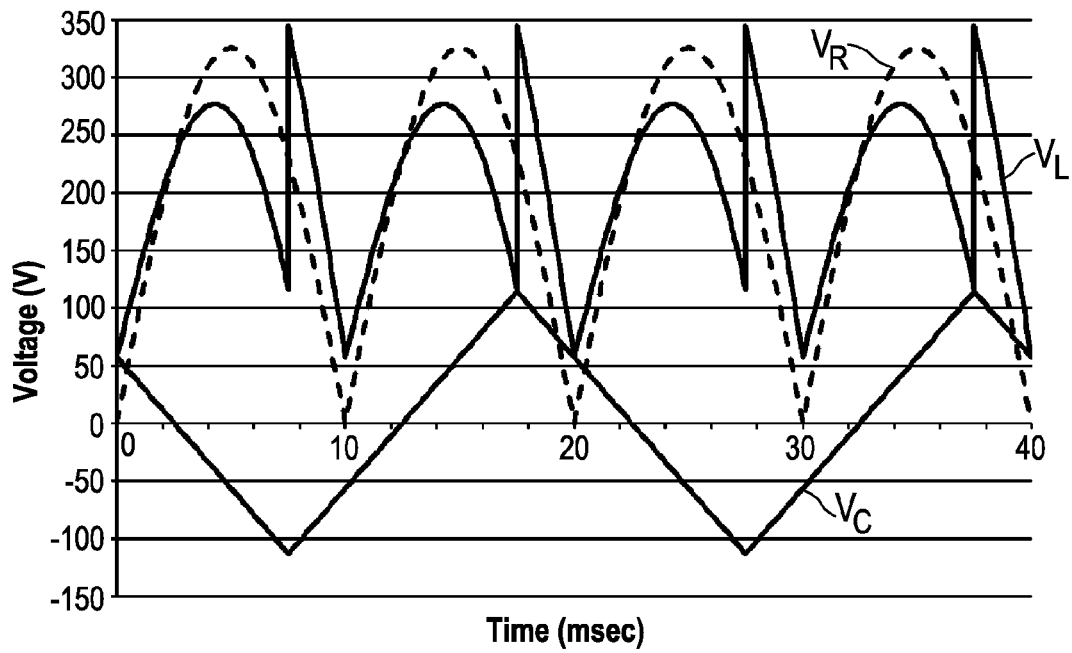
FIG. 9 shows example waveforms of voltages in the test circuit for fifth settings.

At 2.2 μF the capacitor voltage swing is $\Delta V_C = I_L * \Delta t / C = 50$ mA*10 ms/2.2 μF=227V. FIG. 9 shows the waveforms when the bridge switching unit 40 is switched at $t_1=7.5$ ms in every supply half cycle and the average capacitor voltage is zero. The minimum capacitor voltage is $V_{C,min}=-114V$ and the maximum capacitor voltage is $V_{C,max}=114V$. Initially the capacitor C is discharged by the 50 mA load current $I_L$. After switching the bridge switching unit 40 at $t_1=7.5$ ms the capacitor C is charged by the same load current $I_L$ until half a supply cycle later at $t_1=17.5$ ms the bridge switching unit 40 is switched again. Under these circumstances the minimum load voltage is $V_{L,min}=56.8V$, which is at the mains voltage zero crossing. The maximum load voltage is $V_{L,max}=344V$, which exceeds the peak mains voltage. It is attained directly after switching at $t_1=7.5$ ms.

Figure 10:
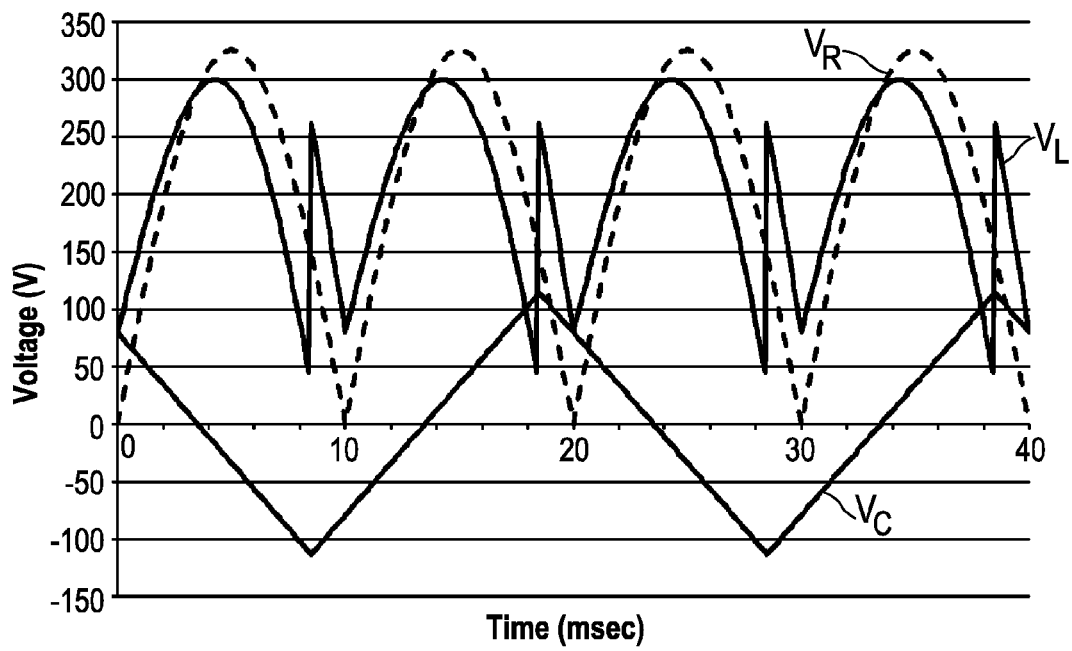
FIG. 10 shows example waveforms for voltages in the test circuit for sixth settings.

When the timing is delayed by 1 ms to $t_1=8.5$ ms, the waveforms change to those of FIG. 10. Now the minimum load voltage is $V_{L,min}=45V$, which is attained directly before switching at $t_1=7.5$ ms. The maximum load voltage is $V_{L,max}=299V$, which does not exceed the peak mains voltage. It is attained at t=4.3 ms.

Figure 11:
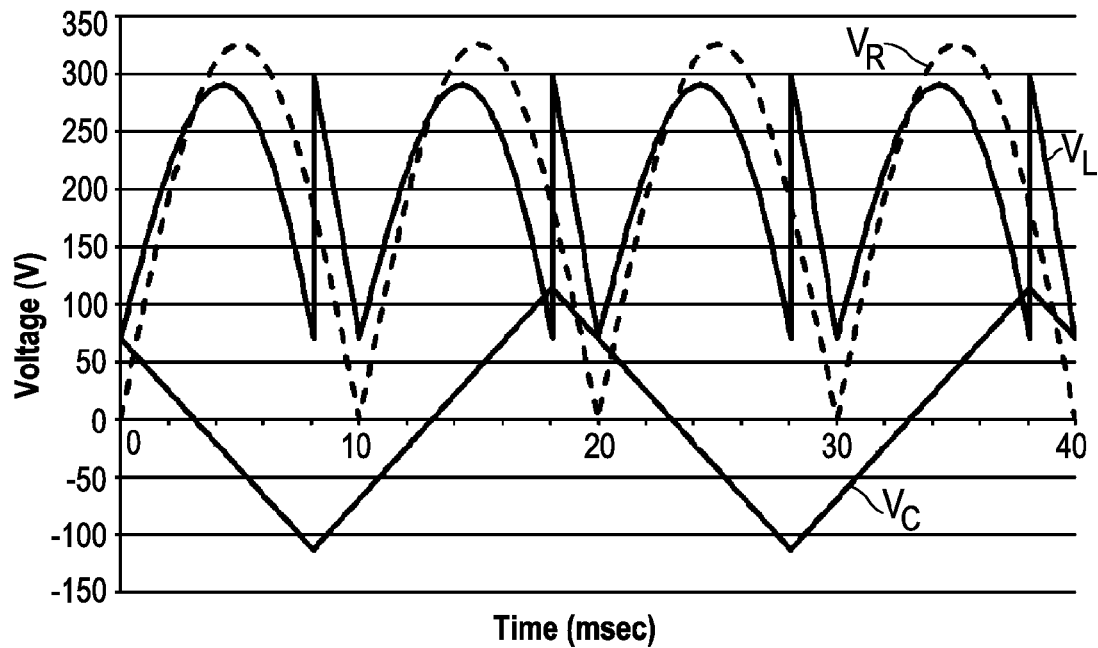
FIG. 11 shows example waveforms for voltages in the test circuit for seventh settings.

The timing can also be chosen such that the local minimum values per supply half cycle of the capacitor voltage are equal. To achieve that target in the example given above, the bridge switching unit 40 has to be switched at $t_1=8.088$ ms and the voltages will be as shown in FIG. 11. The minimum load voltage is $V_{L,min}=70.2V$, which is attained directly before switching at $t_1=8.088$ ms and at the mains voltage zero crossing. The maximum load voltage is $V_{L,max}=297V$, which does not exceed the peak mains voltage. It is attained directly after switching at $t_1=8.088$ ms.

Figure 12:
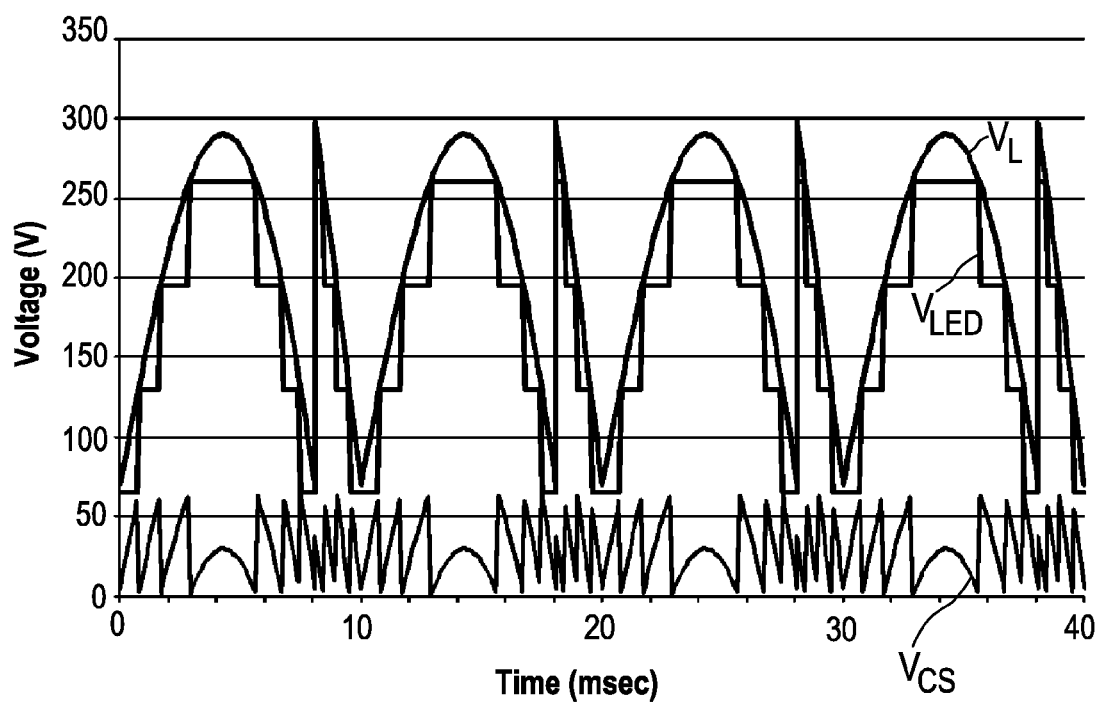
FIG. 12 shows example waveforms for voltages in the test circuit for eighth settings.

Assuming that the string voltage of a high-voltage LED at $I_L=50$ mA is $V_{LED}=65V$ it can be seen that the load voltage waveform of the above FIG. 11 allows at least one high-voltage LED to emit light for 100% of the time, as is shown in FIG. 12 showing the string voltage $V_{LED}$ of the LEDs. It can be seen that at least one high-voltage LED is always conducting and emitting light. Up to four high-voltage LEDs are thus powered. The (always positive) difference between the load voltage $V_L$ and the LED string voltage $V_{LED}$ is the voltage $V_{CS}$ to bias the 50 mA current source.

In the two examples provided above, switching once or twice per supply half cycle, the load current was assumed constant. This eases calculations and the making of illustrative figures, but it shall be noted that it is not at all required according to the present invention, but the load current may vary as well.

Further, it was also assumed above that no dimmer is present, but this is also not required according to the present invention. On the contrary, the present invention advantageously serves to avoid problems with dimmers, like multi-triggering of TRIAC dimmers, by assuring that for 100% of the time the load current is conducted by the mains branches, in which the dimmer is connected, and to make sure that the load current exceeds the holding current of the dimmer.

Most dimmers cut the phase of the mains voltage waveform, either in the leading edge or in the trailing edge, in order to dim the light output. For LED lights this means that the operating current has to be reduced. As the full-wave rectified dimmed supply voltage $V_R$ is available, a circuit can use that phase-cut input voltage and output a current setting in proportion to the calculated RMS content (or average content or something similar) of the input waveform. Alternatively other dim characteristics can be implemented, describing the transfer from dimmer phase cut angle to load current setting or output power setting.

It shall also be noted that the timing of the bridge switching unit 40 needs to be adapted in order to cope with loads that conduct non-constant currents, or when a dimmer is connected in the mains branches.

As explained above, according to an aspect of the present invention a switched capacitive current limiting method is proposed. A capacitor or, more generally, a capacitive switching unit can be switched into the current path of the load. Via surrounding switches (e.g. implemented by means of CMOS bidirectional analog switch IC or with discrete MOSFETs or bipolar transistors), the effective polarity of the capacitor can be set to be positive or negative or the capacitor may be bypassed. When the instantaneous value of the supply voltage is higher than the load voltage, the excess voltage is used to charge the capacitor. When the instantaneous value of the supply voltage is lower than the load voltage, the (previously charged) capacitor is connected with the opposite polarity, hence boosting the voltage such that the load can be operated. The capacitor may, for instance, be bypassed when no change of the load voltage via the capacitor is desired. Using the capacitor to store and release the excess voltage (and energy) improves the efficiency of the total system, compared to the lossy current limitation used normally.

Figure 13:
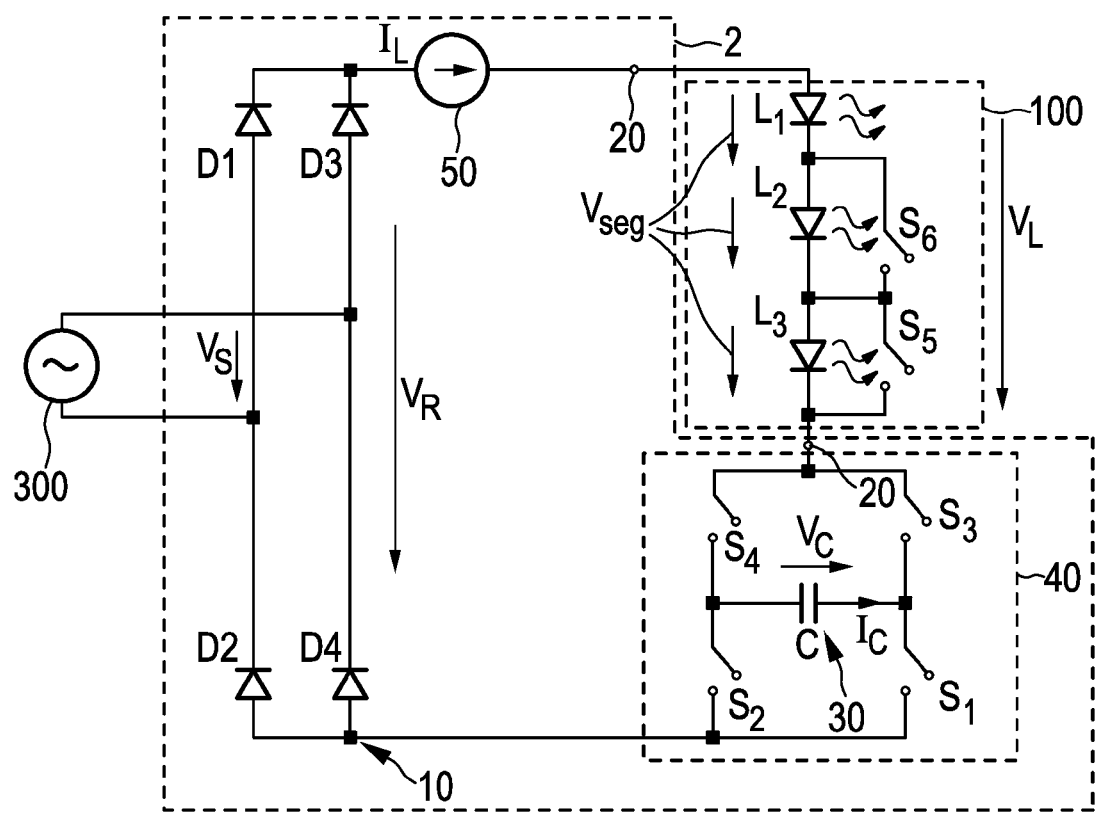
FIG. 13 shows a circuit diagram of a third embodiment of a driver device according to the present invention.

FIG. 13 shows a block diagram of another embodiment of the driver device 2 according to the present invention. Here, as load a LED string with variable forward voltage is used (here represented by a tapped LED string with 1, 2, or 3 LEDs $L_1$, $L_2$, $L_3$ in series controlled by switches $S_5$, $S_6$). Although a single LED symbol is used for $L_1$, $L_2$ and $L_3$ there may be multiple individual or integrated LED junctions connected in series or in parallel used to realize any of the $L_1$, $L_2$ and $L_3$. For higher freedom in setting the load voltage, a third switch for shunting the LED Li and optionally control the load voltage to be $V_L=0$ may be used. Further, in addition to the embodiment of the driver device 1 an additional current source 50 is provided in series between the rectification unit 10 and the load 100. This arrangement allows

- driving the LED current $I_L$ in one direction through the capacitor C when $S_1$ and $S_4$ are closed,
- driving the LED current $I_L$ in the opposite direction through the capacitor C when $S_2$ and $S_3$ are closed, and
- passing the LED current $I_L$ by the capacitor C by closing either $S_4$, $S_2$ or $S_3$, $S_1$, while the capacitor C does not receive any charging or discharging current; this state is especially useful when the switched capacitor C is not used but the current source 50 is used to limit the LED current in a lossy mode. The capacitor C remains charged (i.e. to have some energy stored for the next boost phase) while the load current $I_L$ is passed by the arrangement.

Together with the direction of $I_L$ through the capacitor C, also the effective polarity of the capacitor voltage in the driver device 2 is set. The capacitor C can "add" or "subtract" its capacitor voltage from the total loop.

During the supply voltage cycle, the absolute instantaneous value of the supply voltage $V_S$ is not equal to the load voltage $V_L$ (realized by LED load forward voltage) for most of the time. In a lossy linear driver, a LED load setting that results in $V_L$ being lower than the absolute instantaneous value of the supply voltage might be selected, and the difference in voltage might be dropped across a lossy current source/resistor. For example, FIG. 12 shows a voltage $V_{CS}$, which is the voltage drop across the current source in another embodiment. This voltage drop determines to a large extent the losses in the driver. It should be noted that the system, from which the waveforms in FIG. 12 are derived, contains already a capacitive switching unit, but this is dimensioned and controlled in a different way than in the embodiment described now.

With the introduction of the polarity switchable capacitor C, this capacitor C can be used to "consume" the difference in voltage. Since the capacitor C can store the energy, at a later point in time the capacitor C can "release" its voltage and energy to the load. In contrast to a lossy current source 50 the capacitor C has better efficiency and can also boost the voltage. As long as the current is limited by the capacitor to a lower value than the actually currently programmed current level of the current source 50, the current source 50 will stay in a saturated mode. Then, there will be no significant voltage drop across current source 50, and there will be no significant losses associated with that current source.

When switching between consume and release state in a suitable manner, the load current $I_L$ can be controlled (such that the current source 50 does not have to limit the current) and the load 100 can be powered from the rectified supply voltage waveform virtually without losses at least for a part of the time. In especially during the rising slope of the supply voltage (from 0 to nearly 90° of each half cycle), the capacitor C can be used as the main "lossless driver" for the load 100. For the rest of the period, the capacitor C is bypassed and the normal (lossy) current source 50 controls/limits the load current $I_L$.

Alternatively, by using a capacitor unit with selectable capacitance, one capacitance setting may be used for a non-lossy driving mode while a different capacitance setting may be used for operation modes according to the previously described embodiments of the invention.

When averaging over the complete supply cycle, ~50% of the time the lossless driver can be active while ~50% of the time a "normal" lossy driver is used.

Figure 20:
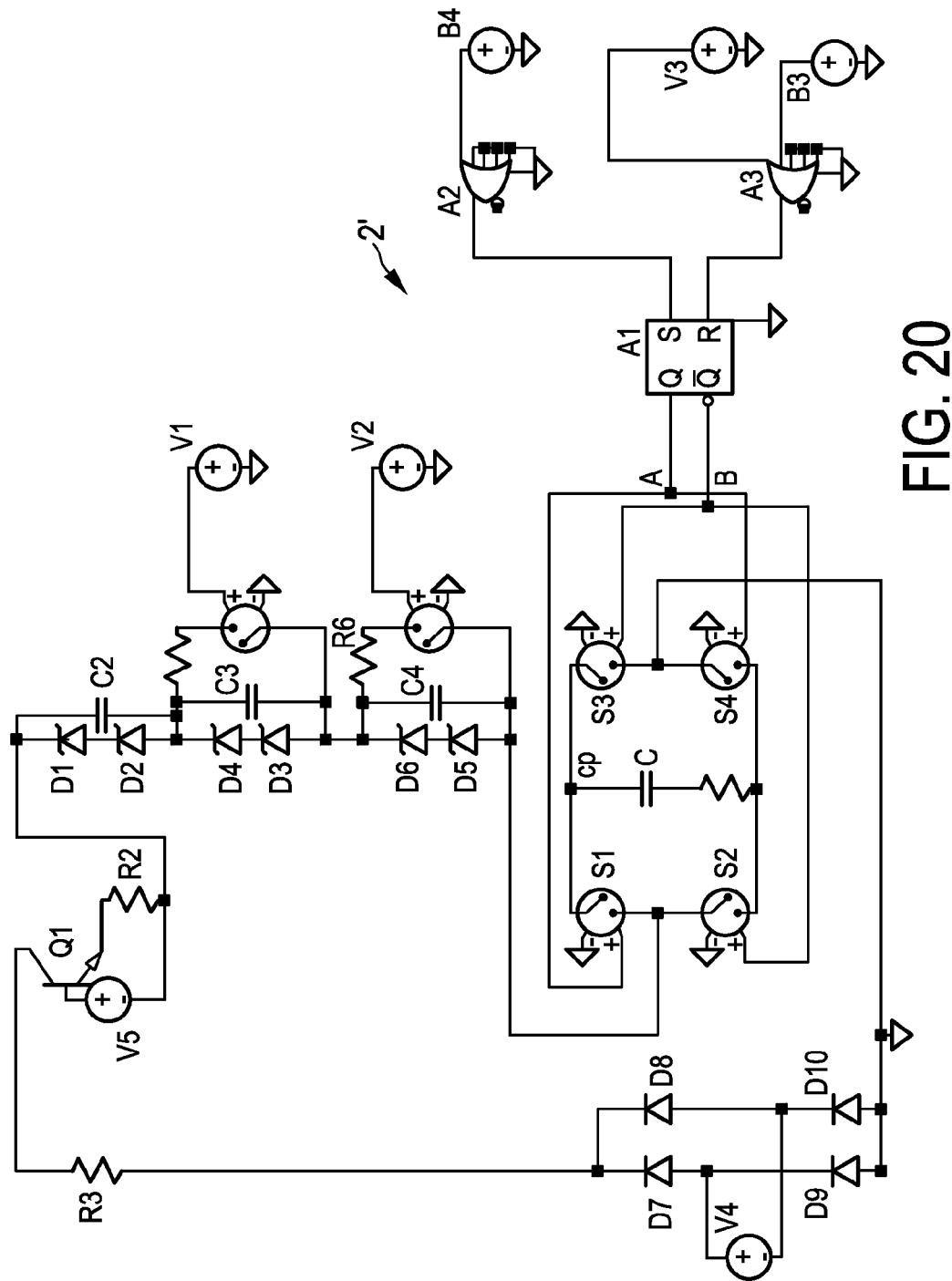
FIG. 20 shows an exemplary implementation of the driver device shown in FIG. 13.

The behaviour of the driver device according to the present invention was calculated by use of a simulation circuit as shown in FIG. 20 depicting an exemplary implementation 2' of the driver device 2 shown in FIG. 13. In this implementation Zener diodes D1 . . . D6 model the high-voltage LED strings. In this implementation voltage source V1 controls the time driven shunting of the second LED segment (D3, D4), voltage source V2 controls the time driven shunting of the third LED segment (D5, D6). The first segment (D1, D2) is not shunted in this example. Optionally, a further voltage source could control shunting of this LED segment, too. Voltage source V3 creates an initial reset condition (to start the simulation). Voltage-controlled voltage source B4 is a comparator, comparing the capacitor voltage to a lower threshold value (around zero volt). If the capacitor voltage falls below the lower threshold, B4 generates a high output signal, setting the latch A1. Voltage-controlled voltage source B3 is a comparator, comparing the capacitor voltage to an upper threshold value (around 0.5 $V_{seg}$ being the LED segment voltage). If the capacitor voltage rises above the upper threshold, B3 generates a high output signal, resetting the latch A1. Latch A1 is used to store the switching status. Latch output Q and inverted latch output /Q control the switches $S_1 \ldots S_4$ surrounding the capacitor. The switches $S_1 \ldots S_4$ used here are theoretical (simulation purposed) switches. In a physical implementation, different types/numbers of switches and different driving (other than a logic latch) will be sufficient or required.

As shown in FIG. 20, in this implementation programmable (voltage-controlled) voltage sources have been used for controlling the switches (both for the capacitor switches as well as for adjusting the length of the LED string). For instance, logic gates can be used to control the capacitor switches $S_1 \ldots S_4$ by a simple voltage monitoring: As soon as the voltage across the capacitor C is nearly zero or is equal to half the LED forward voltage stepping, either one of the signal sources issues a signal and storage element changes its state, controlling the switches the capacitor switches in a way that the effective polarity of the capacitor is reversed. The capacitor C is discharged as deep as possible. During recharging, the capacitor C is charged until it has reached 50% of the forward voltage of the next segment. During this charging mode, the effective capacitor voltage is negative. Directly after having reached 50%, the capacitor C is reversed, starting to be discharged, and the effective capacitor voltage is positive, and at the same time the forward voltage of the LED is increased by increasing the number of LED junctions to be powered (e.g. in a tapped string this is done via opening a shunting switch $S_5$, $S_6$).

For instance, when looking at the total rectified input voltage $V_R$ during the transition from one LED segment to two LED segments:
t<end of charging: $1 V_{seg} - V_C$
t>end of charging: $2 V_{seg} + V_C$.
When the switching action is performed during $V_C = \frac{1}{2} V_{seg}$, this will be a smooth transition.

Figure 14A:
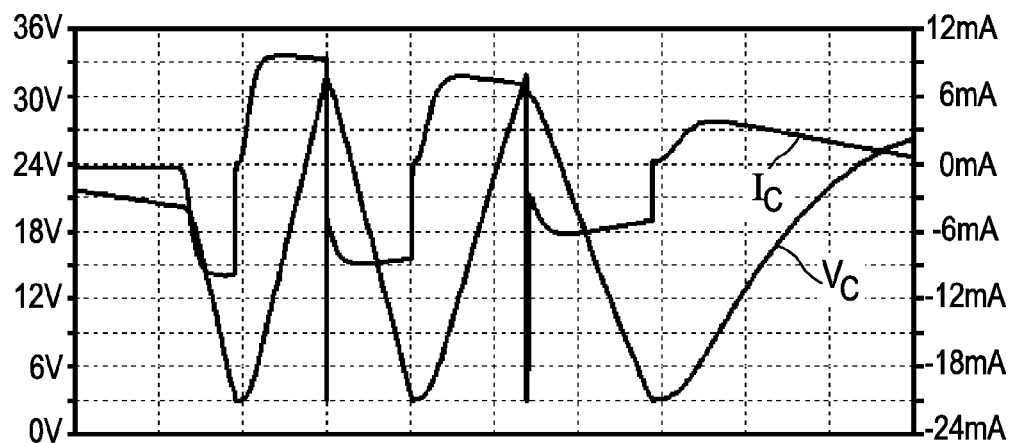
FIG. 14 shows waveforms of voltages and currents in the circuit shown in FIG. 13.
Figure 14B:
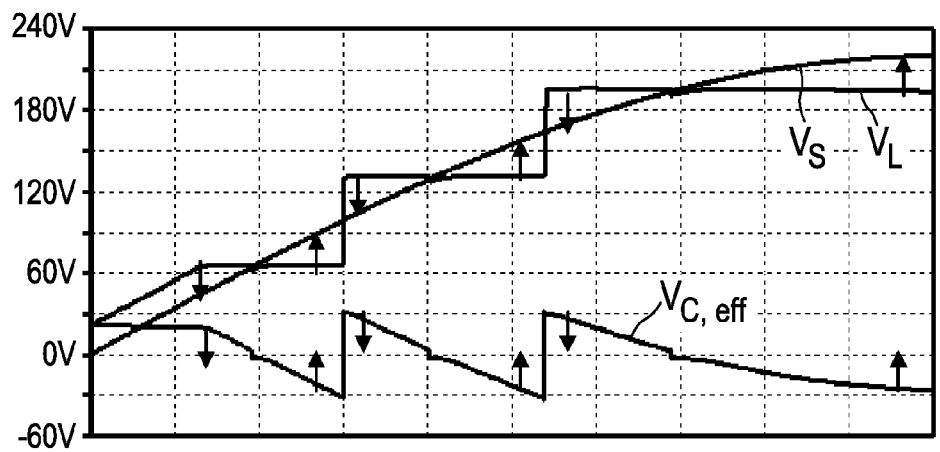

In FIG. 14 A, B, C, some signal traces during the rising slope of the mains voltage (for a 50 Hz mains supply voltage meaning the first 5 ms) are plotted. The capacitor voltage $V_C$ is always positive, but due to the switches, the effective voltage $V_{C,eff}$ of the capacitor C can also be negative. At the beginning of the supply cycle, the rectified supply voltage $V_R$ is lower than the lowest LED string voltage $V_L$ (66V here), so the capacitor C is set to boost the voltage. As soon as the rectified supply voltage is 40V, the sum of rectified supply voltage and the remaining charge (from the previous cycle) in the capacitor C is enough to reach the 66V level and to allow current flow through the LED segment, modeled by Zener diodes D1, D2. The capacitor C is discharged and at 3V the capacitor polarity is reversed, such that now the capacitor current $I_C$ flows through at least one LED junction, producing light. When the capacitor C is charged to approximately half the step in LED string voltage, the capacitor C is reversed again (now resulting in a step in the effective capacitor voltage) and the LED string is set to higher voltage (two segments, $V_L = 132V$). Once again, the pure rectified supply voltage is not sufficient to drive the LED, but with the boost voltage from the capacitor C, the two segments can be driven. This switching between charging and discharging, between adding and subtracting voltage repeats over the rising slope of the supply voltage for the number of LED segments (here, only three segments and a reduced RMS mains voltage of 156V was used to ease the simulation and explanation).

The current in the LED (and hence also the mains current) has some modulation but does not have a large phase shift with respect to the supply voltage. This enables high power factor. With the correct setting of the capacitor C, the input current waveform can be tuned to the desired value. At any point in time, the lossy current source 50 can be used to set a lower current (with the capacitor C in place) or a higher current (after bypassing the capacitor C).

The quite broad input current waveform (meaning flow of current over a large part of the supply cycle) is (in principle) beneficial for the dimmability of the circuit in combination with existing phase cut dimmers.

The current in a capacitor C is proportional to the time-derivative of the voltage $V_C$ (the change of the voltage $V_C$ in time). Next to the zero crossing, the time-derivative of the supply voltage is quite high, hence the current set by the capacitor C is quite high, too. Around the peak of the supply voltage, the time-derivative is quite low, hence the capacitor current drops to smaller values. As a result, the operation current for the LED changes, too. What might look like a drawback at the first glance, turns out to be a benefit of the circuit: Next to the zero crossing, the LED string is quite "short", hence only few junctions can be connected in series. So, the high current is multiplied by a low voltage, resulting in a certain power and finally light. When the supply voltage is higher, more LED segments can be operated, but only with a smaller current. Now, the reduced current is beneficial, because the same high current multiplied with a high voltage would result in a higher power and more light. So, the modulation of the current helps a bit to smooth the light output.

Since the voltage across the capacitor changes, this will result in a current flow, defined by the size/value of the capacitor and the rate of change in capacitor voltage. With a fixed capacitor value and fixed LED segment voltage steps, a fixed input current shape would be achieved, which may not be compatible with mains harmonics regulation. In addition, the amount of light generated by the LED is determined by the value of the capacitor. It is quite unlikely that one fixed set of control parameters and capacitor size will fulfill harmonics and light output requirements at the same time. Control can be changed (also in combination with unequal LED segments) to shift switching instants to earlier or later points in time, to deal with certain harmonics, but the current level itself is more heavily influenced by the capacitance. Hence, a change of the capacitor value during operation can be used to have a higher or lower capacitance available when required. As an example: the power delivery to the LED (and hence, in a first order approximation, also the light generated by the LED) will not be stable during operation with a fixed capacitance value. Increasing the capacitance around 0° and around 90° can boost the power, to equalize light so some extent.

The realization of the bridge switching unit 40 by means of a full bridge has the benefit that the capacitor voltage can always have the same polarity, hence a non-polarized capacitor type can be used and the circuits can be realized e.g. by means of a CMOS analogue switch IC, where the capacitor is connected at the power supply terminals. A series connection of capacitors or capacitor switching stages is of course possible, too, e.g. in case it is desired to limit the maximum voltage stress per capacitor or per switch.

The example above is with a tapped linear string, but the applicability of the driver device according to the present invention is not limited to this. For other driving concepts the same driving can be used.

During the lossless capacitive driving (in the first half of the supply half cycle), the value of the capacitor C and the time-derivative of the rectified supply voltage $V_R$ determine the load current $I_L$. To have even better control on the load current $I_L$, multiple capacitive storage units or a capacitive storage unit with multiple (at least two) capacitors could be used in parallel. By choosing the effective capacitance, the amount of load current $I_L$ can be adjusted, e.g. to reduce the current during dimming. The number of activated capacitors can even be adjusted during a supply cycle, e.g. to achieve the power boosting at certain phase angles, as mentioned above. . Reducing the current is possible at any point in time by deactivating a capacitor. Lossless activation of a capacitor for increased current delivery is also possible during a supply cycle, since the capacitor voltage is cycled with a higher rate than the mains voltage as shown in FIG. 14A: There are multiple points in time where the (changing) voltage of the active capacitors is equal to any (static) voltage of the previously not activated capacitor(s), so they can be activated (connected in parallel) again without equalizing currents.

As an example a more detailed description of the operation of the embodiment of the driver device 2 as shown in FIG. 13 shall be provided. This embodiment is based on matching the available rectified supply voltage to the LED load voltage with high efficiency. The load voltage can be adjusted in steps. E.g. it may be possible to supply (part of) the LED with 30V or with 60V. Input voltage is a rectified sine wave.

The operation and description starts at a mains voltage zero crossing, ($V_S$=0), capacitor discharged ($V_C$=0).

$V_S$=0: Shunt complete LED string, so load voltage is zero. Control switches such that capacitor is connected in "polarity 1".

$V_S$>0: Input voltage will rise. Capacitor will be charged to input voltage value. $V_L$=$V_S$−$V_C$=0 (LED is shunted)-> $V_C$=$V_S$.

$V_S$=15V: Capacitor voltage is $V_C$=15V. Shunting of lowest LED segment is deactivated, so $V_L$=30V. The switches are controlled such that the capacitor is connected with the opposite polarity.

$V_L$=$V_S$+$V_C$=15V+15V=30V, the LED segment will be powered.

$V_S$>15V: Forward current of the LED will act as discharging current for the capacitor. At the same time, the input voltage is increasing. Increase of input voltage and decrease of capacitor voltage will cancel out, so $V_L$ stays at 30V.

$V_S$=30V: Capacitor is discharged to 0V. Further discharging would result in negative voltages. Capacitor polarity is once again reversed. Since $V_C$=0V, there will be no effect on the instantaneous LED current.

$V_S$>30V: With further increasing input voltage, the capacitor will be charged to the voltage difference between $V_S$ and $V_L$ (exactly like before at $V_S$>0, the difference is that now $V_L$=30V, whereas before $V_L$=0 due to shunted LED). Capacitor will be charged.

$V_S$=45V: Capacitor voltage is $V_C$=15V. Shunting of next LED segment is deactivated, so $V_L$=60V. The switches are controlled such that the capacitor is connected with the opposite polarity. $V_L$=$V_S$+$V_C$=45V+15V=60V, the LED will be operated.

$V_S$>45V: Forward current of the LED will act as discharging current for the capacitor. At the same time, the input voltage is increasing. Increase of input voltage and decrease of capacitor voltage will cancel out, so $V_L$ stays at 60V.

In the same way the operation continues.

As a kind of control law, in case of equal LED segment voltages (e.g. $V_{seg}$=30V, $V_L$=n*$V_{seg}$:n=0→$V_L$=0, n=1→$V_L$=30V, n=2→$V_L$=60V, . . . ) the operation is as follows:

Measure rectified input supply voltage $V_R$.

Set LED load to the forward voltage setting matching best to the input voltage: n=round($V_S$/$V_{seg}$).

Calculate required effective capacitor voltage $V_{C,eff}$=$V_R$−n*$V_{seg}$. Effective capacitor voltage will be −0.5$V_{seg}$≤$V_{C,eff}$≤0.5 $V_{seg}$.

Set switches according to the sign of $V_{C,eff}$ (the difference: $V_C$ is the voltage of the capacitor, whereas $V_{C,eff}$ is the effective voltage that the capacitor produces, depending on the polarity=status of the surrounding switches).

As mentioned above the switches are preferably unipolar/unidirectional switches in this embodiment. The capacitor voltage is always positive, but the polarity with which the capacitor is connected in series with the LED is changed. Then, the switches around the capacitor can be unidirectional. It would be possible to use both polarities for the capacitor voltage (in case the type of capacitor allows this), so cycling the capacitor from +0.5 $V_{seg}$ across 0 to −0.5 $V_{seg}$. Then, the switches would have to block both positive and negative voltages. Normally, this requires more effort (may require two physical switches to realize one bidirectional switch) and hence is less preferred.

Figure 15A:
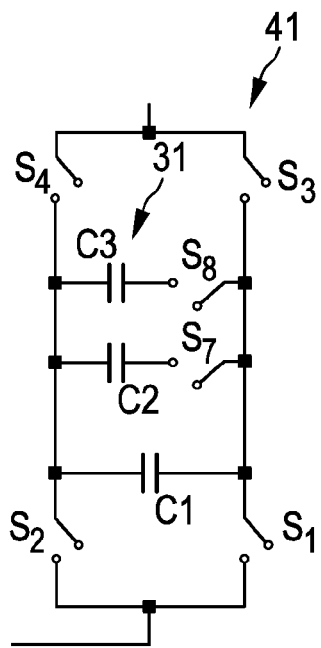
FIG. 15 shows embodiments of a capacitive storage unit for use in the driver device according to the present invention.
Figure 15B:
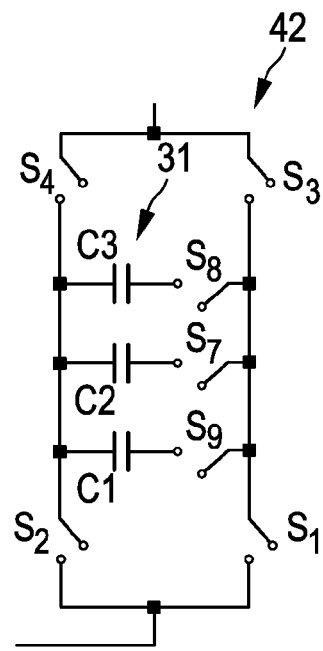

For using multiple capacitors, it is possible but not required to have four switches for each capacitive storage unit. Alternatively, a further switch $S_7$, $S_8$ per additional capacitor C2, C3 can be used as shown in FIG. 15A depicting another embodiment of the bridge switching unit 41 and a capacitive storage unit 31 comprising three capacitors C1, C2, C3 coupled in parallel and two additional switches $S_7$, $S_8$. Another embodiment of the bridge switching unit 42 is shown in FIG. 15B where a third additional switch $S_9$ is provided in series to capacitor C1.

Figure 15C:
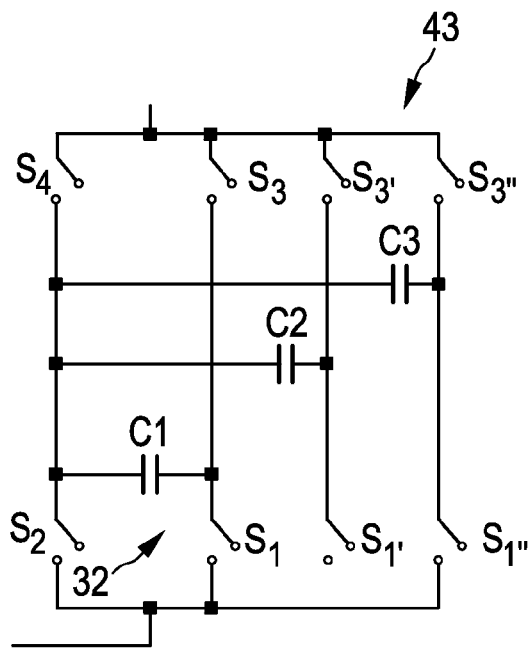

Another option is to duplicate only one half of the bridge switching unit as shown in FIG. 15C depicting another embodiment of the bridge switching unit 43 comprising four additional switches $S_{1'}$, $S_{1''}$, $S_{3'}$, $S_{3''}$ and a capacitive storage unit 32 comprising three capacitors C1, C2, C3 coupled in parallel. Although the solution depicted in FIG. 15B requires more switches, this might still be better, cheaper and smaller due to sharing level shifting logic with the existing four switches $S_1$, $S_2$, $S_3$, $S_4$ might be possible.

Figure 21:
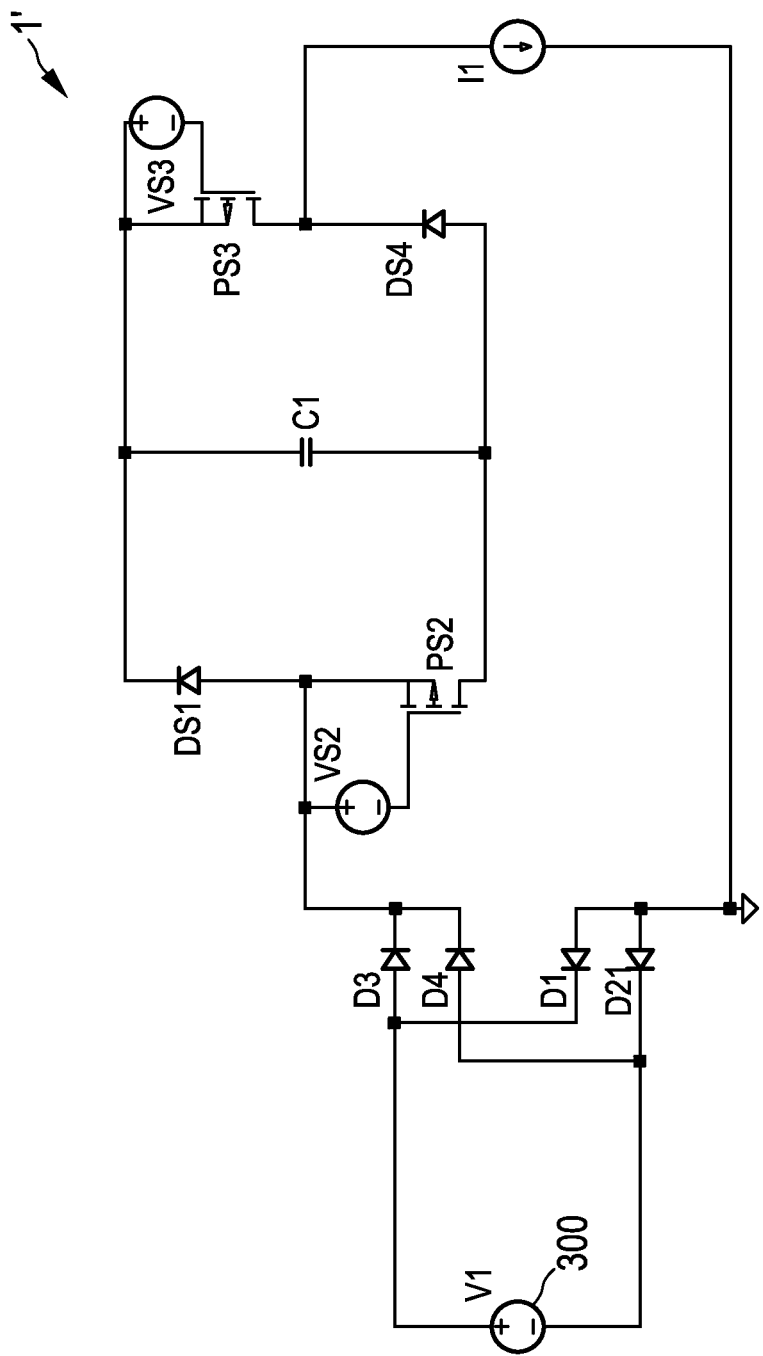
FIG. 21 shows an exemplary implementation of the driver device shown in FIG. 1.

Using all three modes of operation (charging the capacitor, discharging the capacitor and bypassing the capacitor) as explained above even more attractive waveforms can be achieved. Examples of such waveforms will be shown below. FIG. 21 shows an exemplary implementation 1' of the driver device 1 as shown in FIG. 1. In this implementation the driver device 1' is supplied by a sinusoidal 230V 50 Hz AC voltage source 300. Switches $S_1$ and $S_4$ are implemented by diodes DS1, DS4 and the switches $S_2$ and $S_3$ are implemented by PMOS transistors PS2, PS3. Each switch preferably has its own timing, generated by separate voltage sources $V_{S2}$ respectively $V_{S3}$. A rather large value of 100 μF has been chosen for the capacitor C.

Figure 16A:
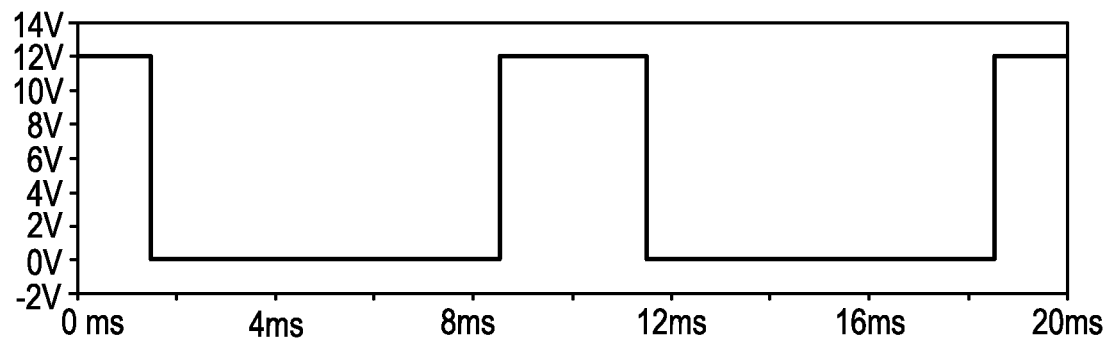
FIG. 16 shows control signals for controlling switches $S_2$ and $S_3$ in the embodiment of the bridge switching unit of the driver device shown in FIG. 1.
Figure 16B:
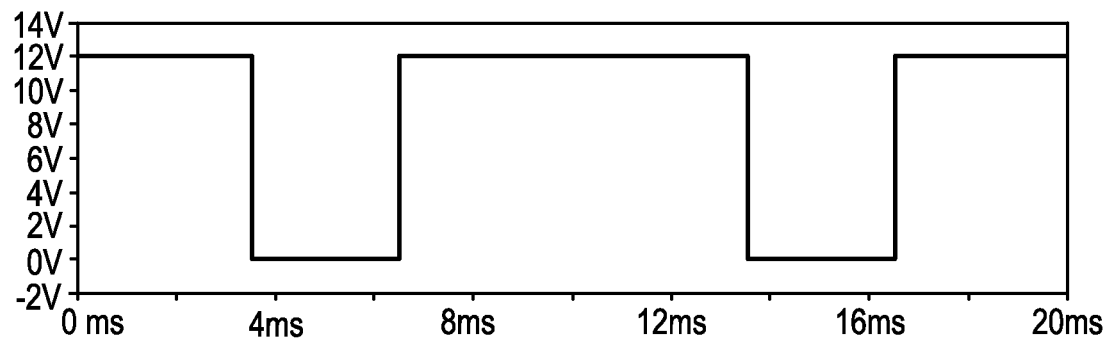

FIG. 16 shows exemplary control signals for switches $S_2$ and $S_3$. Switch $S_2$ is closed from 0 to 1.476 ms and from (10 ms−1.476 ms)=8.524 ms to 10 ms, repetitive waveform, as shown in FIG. 16A. Switch $S_3$ is closed from 3.524 ms to (10 ms−3.524 ms)=6.476 ms, repetitive waveform, as shown in FIG. 16B.

Figure 17:
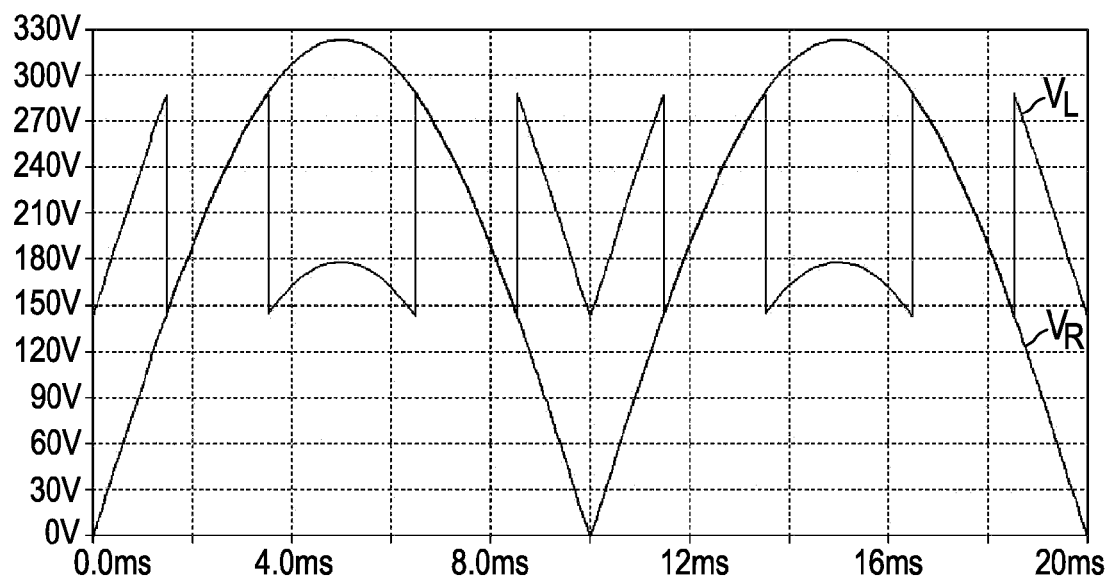
FIG. 17 shows waveforms of the rectified supply voltage and the resulting load voltage for the control signals shown in FIG. 16.

In FIG. 17 the rectified supply voltage $V_R$ and the load voltage $V_L$ are shown. During discharging the capacitor voltage $V_C$ will decrease. This takes place around the zero crossing of the mains voltage. During charging, around the peak of the rectified supply voltage $V_R$, the capacitor voltage $V_C$ will increase. Between the charging and discharging modes the capacitor C is neither charged nor discharged, as the bridge switching unit 40 is placed in the through-connection or capacitor bypassing mode.

As the value of 100 μF of the capacitor C has been chosen rather large the capacitor voltage $V_C$ hardly changes: in the example of FIG. 17 it is a nearly constant 145.5V. The minimum load voltage thus achieved over the entire supply cycle is 145.5V at a mains RMS voltage of 230V.

Figure 18A:
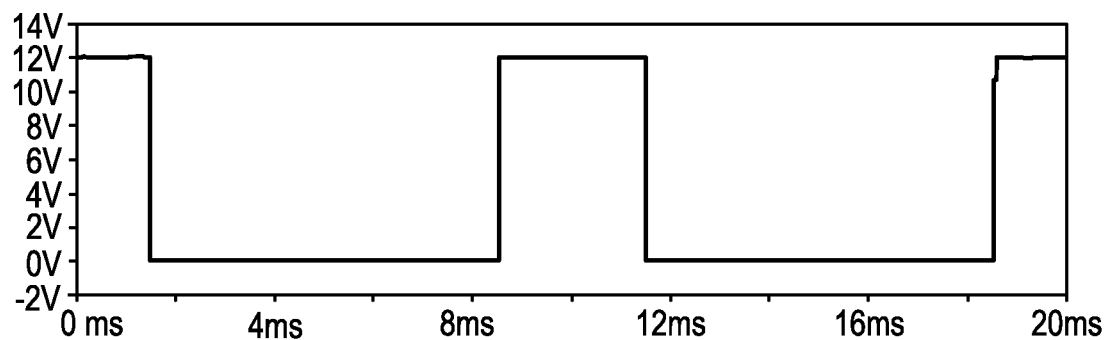
FIG. 18 shows control signals for controlling switches $S_2$ and $S_3$ in the embodiment of the bridge switching unit of the driver device shown in FIG. 1.
Figure 18B:
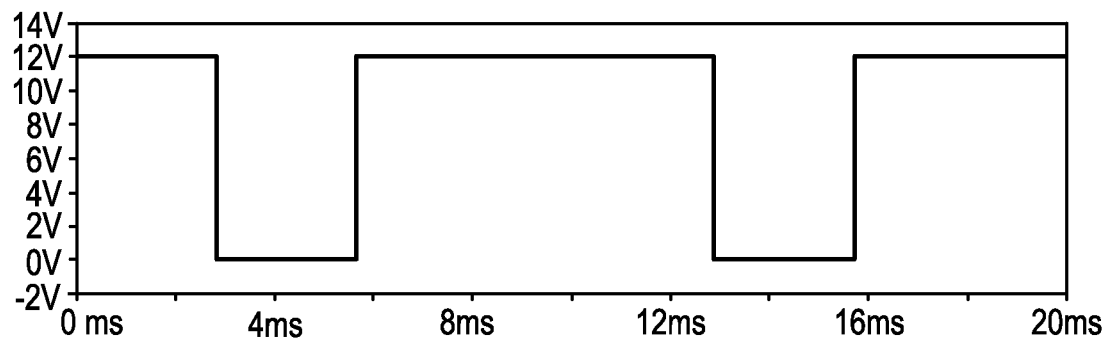

A practical series capacitor has a much lower value to save cost and volume. For a capacitor value of 2.2 μF the timing of the switches has been adapted as shown in FIG. 18 with the objective to guarantee a load voltage as large as possible. In this example switch $S_2$ is closed from 0 to 1.42 ms and from (10ms−1.42ms)=8.58 ms to 10 ms, repetitive waveform, as shown in FIG. 18A. Switch S$_3$ is closed from 2.84 ms to 5.68 ms, repetitive waveform, as shown in FIG. 18B.

Figure 19:
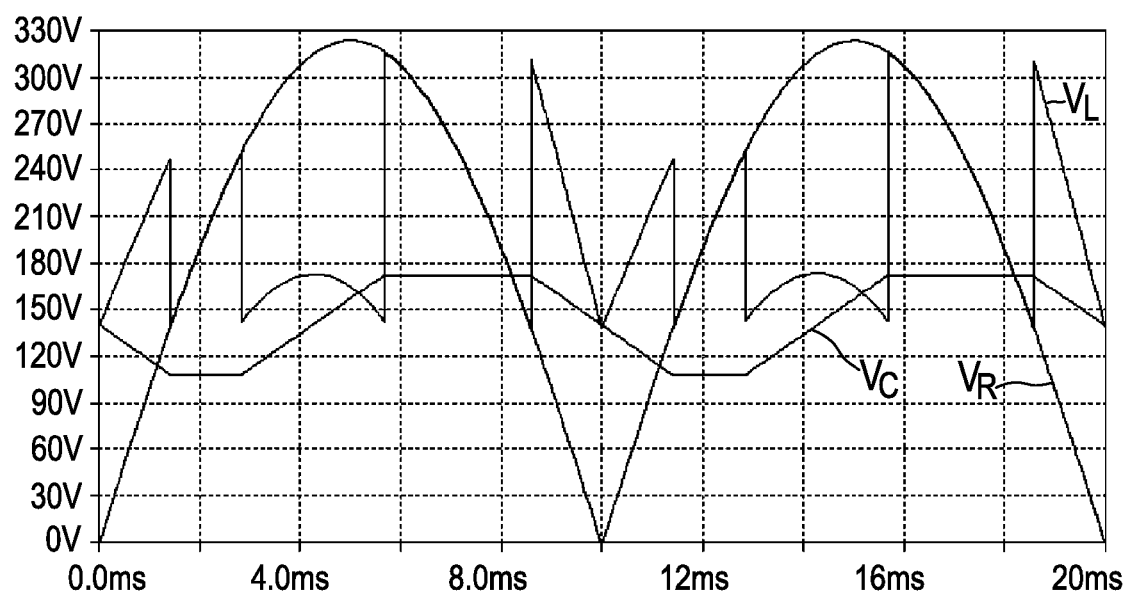
FIG. 19 shows waveforms of the rectified supply voltage and the resulting load voltage and capacitor voltage for the control signals shown in FIG. 18.

FIG. 19 shows the waveforms of load voltage V$_L$, rectified supply voltage V$_R$ and capacitor voltage V$_C$ for this embodiment. In equilibrium the capacitor voltage V$_C$ swings between two values (in this case between 108V and 172V). With respect to the results shown in FIG. 17, the minimum load voltage has decreased a little bit to some 140V.

When the load is a tapped linear LED driver, the load voltages V$_L$ of both FIGS. 16 and 18 are sufficiently high to supply two 64-V LED strings in series over the entire supply cycle, whereas a third and a fourth high-voltage LED string can be supplied over parts of the supply cycle. The forward voltages of these high-voltage LED strings can be 64V as well, but it must be emphasized that they need not necessarily be equal to the forward voltages of the first and second LED string.

In the above example the minimum voltage is about 140V over the entire supply cycle. Therefore it is no longer necessary to have a tap between the first and second 64V LED string. In place of the first and second 64V LED string a single 128V LED string could alternatively be used as well.

Figure 7:
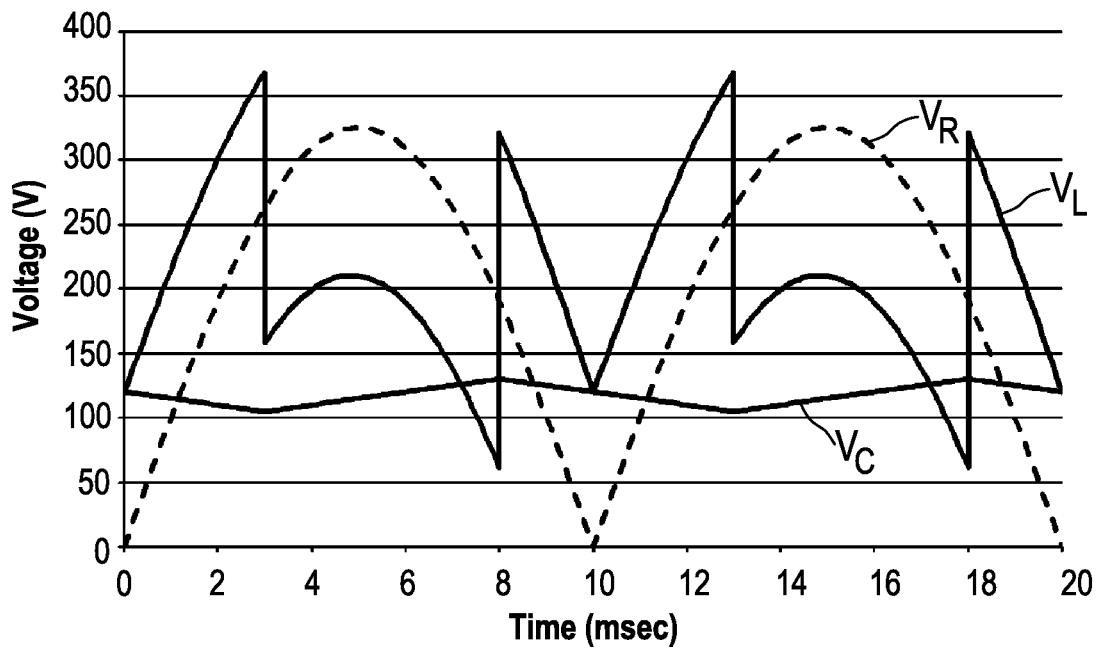
FIG. 7 shows example waveforms of voltages in the test circuit for third settings.

In FIG. 8 the phase over which the respective switches are conducting has been shifted in time by 0.5 ms with respect to FIG. 7. In the waveforms shown in FIGS. 16 to 19 the phase, during which the switch is conductive, i.e. during which the control signal has a value of 12V, shifts a little bit to the right (delaying), or to the left (advancing). How the timing is best chosen depends on which objective is pursued. That objective can be to make sure that all local minimum values of the load voltage are equal to each other (as e.g. shown in FIG. 8). However, other objectives might also be pursued and be valuable, e.g. to make sure that the minimum voltage over the supply half cycle is sufficiently high to keep at least two series-connected 64V LED strings (or a single 128V LED string) supplied over the entire supply cycle. This has the consequence that the other local minima will then be higher than the global minimum. Such objectives can be realized by carefully controlling the phases over which the various switches in the bridge switching unit are conductive/non-conductive.

The timing chosen in the above examples of FIGS. 16 and 18 was chosen such that the minimum load voltages are about equal over the entire supply cycle. However, there are many more ways to control or determine the timing.

The above described embodiments are based on the same general idea. The operation and functionality depends on component selection and control/usage of switches. Further, the embodiments may differ in efficiency, flicker, and compatibility with dimmers such as leading-edge TRIAC-based dimmers or trailing-edge dimmers, size/value of capacitor as well as in other implementation details, such as bidirectional or unidirectional switches, which has implications for IC integration. But generally, all embodiments are directed to achieve a high power factor, low harmonic distortion of the mains current, low flicker of the light output. Further, the embodiments can be used with other loads than shown by the examples, e.g. even loads other than solid-state LED lighting.

The implementations described above use capacitor values that cannot easily be monolithically integrated. A typical integratable specific capacitor value is 1 nF per 1 mm$^2$ silicon area, which requires the IC technology option of MIM (Metal-Insulator-Metal) capacitors. The voltages on the capacitors exceed the allowable voltages of 20 . . . 25V on integrated high-density capacitors. However, in general, whether the capacitors can be monolithically integrated depends on architectural choices, current level etc.

The differences between the various embodiments mainly result from different focus on power efficiency improvement, flicker reduction, dimmer compatibility, mains current harmonic distortion, choice of capacitor value and capacitor voltage and other aspects.

Further, in the embodiment shown in FIG. 13 increased power efficiency is achieved during the rising part of the rectified mains voltage, while during the falling part a "normal" lossy driver is used. In the embodiment shown in FIG. 1 the (lossy) current source(s) determine(s) the LED currents for 100% of the time.

Figure 14C:
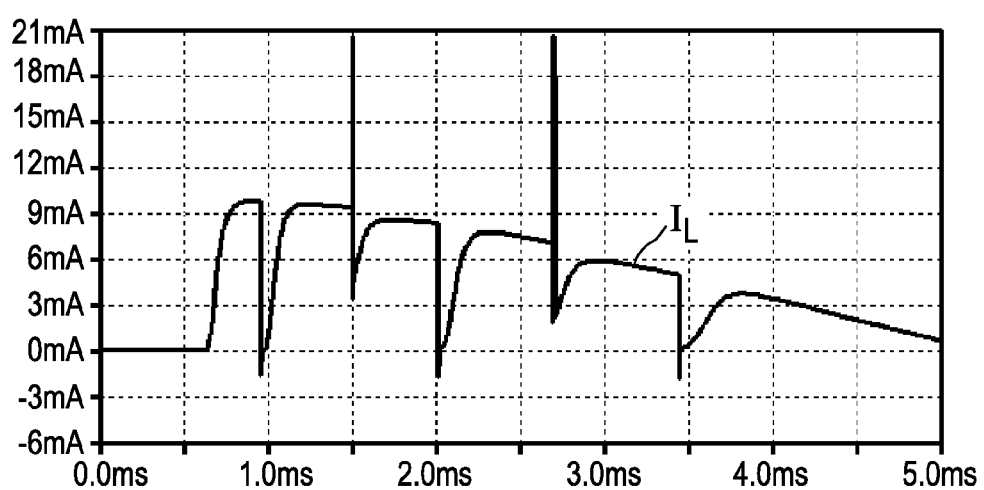

In the embodiment shown in FIG. 13, during the rising part of the rectified mains voltage, the current source should behave more or less as a short-circuit (thus avoiding power dissipation) and the current through the LED string is determined by the capacitor, which is an energy storage device and not an energy dissipating device. The capacitor voltage is the difference of rectified supply voltage and LED string voltage (assumed that the voltage across the current source is negligible). As the time derivative of the LED string voltage is small with respect to that of the rectified supply voltage (assumed to be a rectified sine wave), the current behaves as a cosine wave (apart from switching glitches), as shown in FIG. 14C. The capacitor voltage alternates polarity. Each time the magnitude of the capacitor voltage reaches a value equal to half of the forward voltage of a single high-voltage LED the full bridge is toggled and at the same time a next tap of the LED string is selected.

In the embodiment shown in FIG. 13 during the falling part of the rectified mains voltage the capacitor is bypassed and the normal (lossy) current source 50 has to control/limit the LED current.

In the embodiment shown in FIG. 2 the (lossy) current source(s) determine(s) the LED currents for 100% of the time. The purpose of the capacitor, wrapped in a full bridge, is to guarantee that at all time the available load voltage exceeds the forward voltage drop of at least one high-voltage LED to reduce light output flicker. As such the full bridge plus a capacitor, connected in series with the tapped linear driver and the LED load, can be seen as a replacement of the (parallel) fill-in capacitors in other tapped linear drivers. However, now the AC mains current flows at all times which e.g. avoids problems with TRIAC-based dimmers and improves the power factor. Preferably the ratio of the maximum and the minimum load voltage is kept limited to avoid a large number of required high-voltage LEDs and/or a large number of taps along the LED string and/or a large voltage drop across the (lossy) current source(s). Preferably the average voltage drop across the current source(s) is kept as small as possible to avoid power losses. This can be achieved by appropriate timing of the switches in the full bridge. Especially the mode where the full bridge is switched four times per supply half cycle and is sequenced from "charging" to "through connection" to "discharging" to "through connection" etc. offers very attractive waveforms as shown above in FIGS. 16 to 19.

In the embodiment shown in FIG. 2 the shape of the load current can be chosen freely e.g. by controlling the current sources. E.g. the load current can be chosen to be constant over time. Other current waveforms are also possible by controlling the current sources.

In the embodiment shown in FIG. 13, if the choice is made for lossless driving during the rising part of the rectified supply voltage according to the proposed invention, the shape of the load current cannot be chosen freely, because the load current then is determined by the dV/dt of the rectified supply voltage during the rising part and the value of the capacitor that is connected. Better control of the value of the load current during the rising part of the rectified supply voltage can be achieved by an adjustable capacitor. Using the through connection of the bridge switching unit or different timing of the bridge, the current source can be forced into operation, which implies that lossless driving is no longer selected.

In the embodiment shown in FIG. 13 the supply current does not flow during the supply voltage zero crossing, but only when the supply voltage exceeds a level of 40V. This results from the specific embodiment with small capacitor value, limited capacitor voltage and 66V LED segment voltage. In the embodiment shown in FIGS. 1 and 2 the supply current flows for 100% of the supply cycle.

In the embodiment shown in FIG. 13 the bridge switching unit is preferably switched six times per supply half cycle. The number also depends on the forward voltage drop of the high-voltage LEDs (e.g. 66V, 132V, 198V). The higher the forward voltage is, the less often the bridge switching unit is switched.

The bridge switching unit can be built with bidirectional switches, as the polarity of the capacitor voltage alternates. There are, however, other implementations that allow unidirectional switches. For instance, in the implementation shown in FIG. 13 the bridge switching unit can use unidirectional switches, as the polarity of the capacitor voltage does not change with the dimensioning used in the embodiment and the direction of the current flow is always the same. Of course, bidirectional switches (e.g. as commercially available as so called "analog switches") can be used, too.

In the embodiment shown in FIGS. 1 and 2 the bridge switching unit is preferably built with bidirectional switches when the bridge switching unit is switched an odd number of times per supply half cycle, but the bridge switching unit can also be built with unidirectional switches when the bridge switching unit is switched an even number of times per supply half cycle (e.g. twice or four times etc.). Unidirectional switches are more attractive for monolithic integration, as it saves a lot of silicon area compared to bidirectional switches. Further, the control of (the gate-source voltage of) a unidirectional switch (such as an NMOST) usually is simpler than the control of (the gate-source voltage of) a bidirectional switch, as the unidirectional switch's source usually is connected to a terminal with a direct voltage. In a bidirectional switch formed by a pair of anti-series-connected NMOS transistors the common source is not connected to a terminal with a direct voltage but is "floating". As such the driver, which determines the control (i.e. the gate-source voltage of the bidirectional switch) is also "floating" and needs a "floating" supply.

All embodiments can be implemented as a tapped linear driver having as load a series-connected string of LEDs, wherein some can be bypassed by switches, and having a current source connected in series. Also (controlled or switched) current sources connected to the taps can be used.

With the embodiment shown in FIG. 13 the current waveform is primarily tuned and chosen to (try to, as good as possible without extra losses) compensate the different forward current requirements with variable LED string length.

In the following further embodiments of the control unit according to the present invention will be explained. According to the above explained embodiments the timing of the switches $S_1$-$S_4$ resulting in the waveforms shown in FIG. 19 is synchronized to a clock reference. The time instants are chosen such that the minimum load voltages are about equal over the entire mains cycle, simply by inspection of the generated waveforms and trial-and-error. For a professional and/or consumer product realization a more advanced control method might, however, be more preferable.

It is particularly desired that the control method adapts to changes in the RMS voltage of the supply voltage (e.g. EU mains 230V+10%−6%), to changes in the LED string voltage (spread in production, spread in current, spread in temperature, etc.) and to other uncertainties, like to changes in the supply/mains frequency (50 Hz+/−1% or 60 Hz+/−1%), Further, the timing of the switches $S_1$-$S_4$ of the full bridge (i.e. the bridge switching unit 40) shall preferably be generated by measurement and control circuits. Hence, based on an understanding how the lowest load voltage relates to capacitor value, load current, mains RMS voltage, mains frequency etc. the following control methods and control units according to the present invention are proposed to select design parameters such as LED string voltages etc. for good performance and to design measurement and feedback circuitry to best control the timing of the switches. Further, in addition a control method is proposed that selects between the four modes of operation of the full bridge (in the following called capacitor charge mode, capacitor discharge mode, capacitor top bypass mode or capacitor bottom bypass mode) whilst keeping all voltages above zero and keeping all node voltages of the full bridge as low as possible.

First, the theoretical limits are investigated of the above described control methods, for which a few assumptions are made.

The first assumption is that a mains voltage (generally, the term "mains voltage" shall be understood as referring generally to a supply voltage) has a sinusoidal time evolution with a peak value $V_{peak}$ $$V_{mains}(t) = V_{peak} \cdot \sin(2 \cdot \pi \cdot f \cdot t) \quad (1)$$

The mains voltage often is specified in terms of effective value or root-mean-square value $V_{mains,RMS}$. For the sinusoidal time evolution of equation this results in $$V_{mains,RMS} = \frac{V_{peak}}{\sqrt{2}}. \quad (2)$$

The second assumption is that equilibrium is attained, so the situation is considered sufficiently long after power up (at which the capacitor 30 still is uncharged).

The third assumption is that ideal switches are assumed, implying zero current conduction when the switch is open and zero voltage drop when the switch is closed.

The fourth assumption is that a capacitor is used with large capacitance. Then the capacitor voltage shows negligible variations and the capacitor voltage can be considered a constant $V_C$.

At the zero crossing of the mains voltage the load voltage equals the capacitor voltage, see e.g. at t=10 ms in FIG. 19, It can be calculated that the maximum value of the lowest load voltage that appears over time is $$V_{load}(t) \geq V_C = 1 \cdot \sqrt{2/5} \pi \cdot V_{mains,RMS} \approx 0.632 \cdot V_{mains,RMS} \quad (3).$$

This is the absolute theoretical limit of the above described method, For a nominal 230V mains RMS voltage this amounts to 145.5V and for a nominal 120V mains voltage this amounts to 75.9V. These high values are very attractive to achieve low light output flicker for LED lighting, combined with high power factor.

The fourth assumption (very large capacitance) is not very realistic. A large capacitance is unwanted for volume and cost reasons. A more practical new fourth assumption is that (in equilibrium, see the second assumption) the capacitor voltage cycles between a minimum value $V_{C,min}$ and a maximum value $V_{C,max}$. The capacitor voltage swing $\Delta V_C$ now is $$\Delta V_C = V_{C,max} - V_{C,min} \qquad (4).$$

A value $V_{C,m}$ can be defined to be the mean value of $V_{C,max}$ and $V_{C,min}$ $$V_{C,m} = \frac{V_{C,max} + V_{C,min}}{2}. \qquad (5)$$

It shall be noted that the average capacitor voltage in general is unequal to this mean value, as will be seen later.

The capacitor voltage swing can be normalized with respect to the mains voltage by defining the normalized capacitor voltage swing d as $$d = \frac{\Delta V_C}{2 \cdot V_{peak}} = \frac{\Delta V_C}{2 \cdot \sqrt{2} \cdot V_{mains,RMS}}. \qquad (6)$$

The fifth assumption is that the current drawn from the system is constant over time. It can be proven that the maximum value of the lowest voltage that can be guaranteed to be present at all times is equal to $V_{C,m}$ of equation (5). Note that $V_{C,m}$ approaches $V_C$ of equation (3) when the capacitance approaches infinity and the capacitor voltage swing reduces to zero. It can furthermore be calculated that the value of $V_{C,m}$ is $$V_{C,m} = \sqrt{\frac{1 + d^2 + \sqrt{1 - 18 \cdot d^2 + d^4}}{5}} \cdot V_{mains,RMS}. \qquad (7)$$

To better see the relation with the result of equation (3), calculated for a very large capacitor value (implying taking the case d=0), the equation can be rewritten as $$V_{C,m} = \sqrt{\frac{2}{5}} \cdot V_{mains,RMS} \cdot \sqrt{\frac{1 + d^2 + \sqrt{1 - 18 \cdot d^2 + d^4}}{2}}. \qquad (8)$$

A normalized guaranteed voltage x can be defined as follows $$x = \frac{V_{C,m}}{\sqrt{\frac{2}{5}} \cdot V_{mains,RMS}}. \qquad (9)$$

The relation between the normalized capacitor voltage swing d and the normalized guaranteed voltage x is found by rewriting equation (8) to get $$x = \sqrt{\frac{1 + d^2 + \sqrt{1 - 18 \cdot d^2 + d^4}}{2}}. \qquad (10)$$

Figure 22:
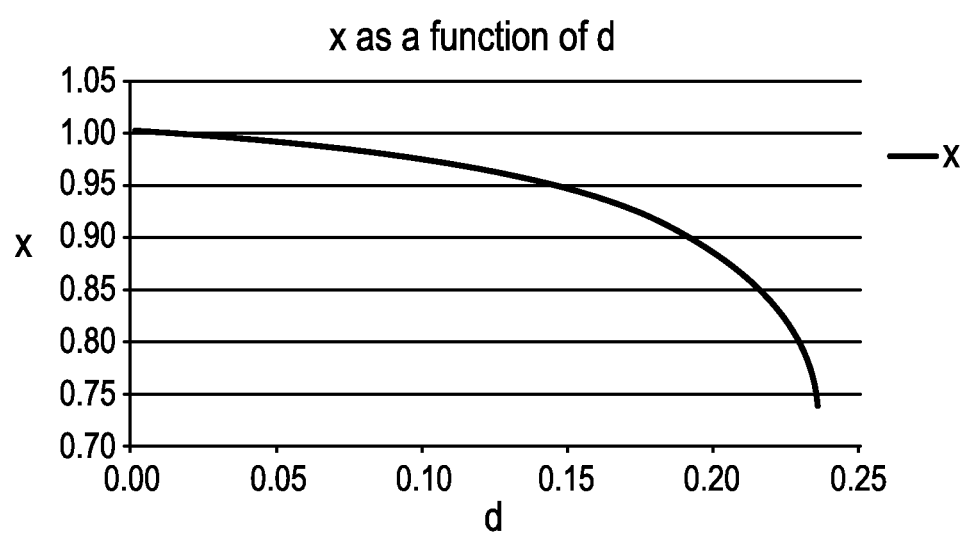
FIG. 22 shows a normalized guaranteed voltage x as a function of the normalized capacitor voltage swing d.

FIG. 22 shows a graph of x as a function of d.

Equation (10) can also be reversed to express d as a function of x:

$$d = x \cdot \sqrt{\frac{x^2 - 1}{x^2 - 5}}. \qquad (11)$$

FIG. 22 shows that for values of the normalized capacitor voltage swing d<0.10 the reduction of the normalized guaranteed voltage x is limited to 2.2%, and for d<0.15 the reduction of x is limited to 5%.

From the graph shown in FIG. 22 it is obvious that a significant capacitor voltage swing such as d=0.2 should not be allowed because it leads to a significant reduction of the normalized guaranteed voltage x of some 13%, and increasing d to values d>0.236 even leads to an unstable system. Taking into account that component values show some spread (or even considerable spread to save cost) and that additional voltage headroom has to be allowed for practical voltage drops across switches (e.g. a forward-biased diode voltage drop of some 1V for a semiconductor diode used as non-controllable switch) it is preferable to select the capacitance of the capacitor such that the normalized capacitor voltage swing d is chosen in the range 0.10 . . . 0.15.

Using equation (6) and a target value of d=0.10 the allowable capacitor voltage swing can be expressed in the mains voltage:

$$\Delta V_C = 0.283 \cdot V_{mains,RMS} \qquad (12).$$

This limit value can be respected by selecting a sufficiently large capacitor value. Making this capacitor choice the lowest load voltage that appears over time is only 2.2% worse than predicted by equation (3) and amounts to $$V_{load}(t) \geq V_{C,m} = 0.619 \cdot V_{main,RMS} \qquad (13).$$

The European mains RMS voltage is specified at 230V −6%+10%. The worst case is $V_{mains,RMS}$=216.2V, which results in a capacitor voltage swing of $\Delta V_C$=61.2V and a lowest load voltage of $V_{load(t) \geq VC,m}$=133.8V.

The capacitor voltage swings between values of $V_{C,max}$ and $V_{C,min}$. Using equations (4) and (5) and assuming worst case $V_{mains,RMS}$=216.2V it can be calculated that $$V_{C,max} = V_{C,m} + \frac{\Delta V_C}{2} = 164.4 \text{ V} \qquad (14)$$

and $$V_{C,min} = V_{C,m} - \frac{\Delta V_C}{2} = 103.2 \text{ V}. \qquad (15)$$

At the nominal mains voltage of $V_{mains,RMS}$=230V the capacitor voltage swing is $\Delta V_C$=65.1V and the lowest load voltage is $V_{load}(t) \geq V_{C,m}$=142.4V.

At $V_{mains,RMS}$=230V the capacitor voltage swings between $$V_{C,max} = V_{C,m} + \frac{\Delta V_C}{2} = 175.0 \text{ V} \qquad (16)$$

and $$V_{C,min} = V_{C,m} - \frac{\Delta V_C}{2} = 110.0 \text{ V}. \qquad (17)$$

It can be calculated that the optimal switching time instants are $$t_1 = \frac{1}{2\pi f} \cdot \arcsin\left(\frac{V_{C,m}}{\sqrt{2} \cdot V_{mains,RMS}}\right) = \frac{1}{2\pi f} \cdot \arcsin\left(\sqrt{\frac{1+d^2+\sqrt{1-18 \cdot d^2+d^4}}{10}}\right), \quad (18)$$

$$t_2 = \frac{1}{2\pi f} \cdot \arcsin\left(\frac{V_{C,m} + V_{C,min}}{\sqrt{2} \cdot V_{mains,RMS}}\right), \quad (19)$$

$$t_3 = 2 \cdot t_1 + t_2, \quad (20)$$

$$t_4 = \frac{1}{2f} - t_1. \quad (21)$$

Using the values determined above and assuming worst case $V_{mains,RMS}$=216.2V we get $t_1$=1.442 ms, $t_2$=2.824 ms, $t_3$=5.708 ms, $t_4$=8.558 ms. At $V_{mains,RMS}$=230V we get $t_1$=1.442 ms, $t_2$=2.827 ms, $t_3$=5.712 ms, $t_4$=8.558 ms.

The required capacitor value can be calculated to be $$C = \frac{I_{load} \cdot 2 \cdot t_1}{\Delta V_C}. \quad (22)$$

For $V_{mains,RMS}$=216.2V and a load current of $I_{load}$=50 mA the result is C=2.36 μF. For $V_{mains,RMS}$=230V and a load current of $I_{load}$=50 mA the result is C=2.22 μF.

As mentioned above, the European mains RMS voltage is specified at 230V−6%+10%. The lowest value is $V_{mains,RMS}$=216.2V, which results in $\Delta V_C$=61.2V and $V_{load}(t) \geq V_{C,m}$=133.8V. At the nominal RMS mains voltage of $V_{mains,RMS}$=230V the result is $\Delta V_C$=65.1V and $V_{load}(t) \geq V_{C,m}$=142.4V.

Assuming a constant load current of $I_{load}$=50 mA (this of course depends on the type of load, e.g. Tapped Linear LED Driver or Switch Matrix Driver) the required capacitor value is calculated to be C=2.36 μF at worst case mains RMS voltage of 216.2V, and C=2.22 μF at nominal mains RMS voltage of 230V.

FIG. 19 shows example waveforms of load voltage, rectified mains voltage and capacitor voltage at a nominal RMS mains voltage of 230V, a capacitor value of 2.2 μF (standard value) and a constant load current of $I_{load}$=50 mA. In equilibrium the capacitor voltage swing is 64V and the minimum load voltage is some 140V. These values correspond rather well to the calculations.

The calculations show that the above described technique implies that if a high-voltage LED string load (without taps) is chosen with a string voltage exceeding the theoretical $V_C$ limit of equation (3) or the more practical $V_{C,m}$ limit of equation (13), (e.g. a 150V LED string at an RMS mains voltage of 230V) the LED load current cannot be conducted for the entire mains (half) cycle, but will cut off during at least part of the mains (half) cycle, thereby creating unwanted light output flicker.

Seen from the other way around, if a high-voltage LED string is chosen with a string voltage below the theoretical $V_C$ limit or the more practical $V_{C,m}$ limit, (e.g. a 128V LED string at an RMS mains voltage of 230V) the load current can be continuously conducted during the entire mains (half) cycle by choosing a sufficiently large capacitor and proper timing control of the switches in the full bridge, thereby avoiding light output flicker.

If a phase-cut dimmer is used in the mains supply branch, e.g. either a leading edge, trailing edge or even both edges dimmer, the resulting RMS voltage will drop depending on the conduction phase angle. As a result also the maximum value of the lowest load voltage that can be generated by the above described technique will drop. Based on the above insights further improved measurement and control techniques can be derived as described in the following.

At least three further methods will be proposed to control the switches. In each of the three methods the resulting load voltage as shown in FIG. 19 is identical. The differences between the three methods are found in the voltages at the negative and positive terminals of the capacitor 30 included in the full bridge 40. To clearly show the differences the vertical scales of FIGS. 23 to 25 are fixed to the range −50V ... 500V.

The switches $S_1$ ... $S_4$ of the full bridge 40 have to be controlled in such a way that current flow through the load is possible. This opens four possibilities:

switches $S_1$ and $S_4$ are closed (capacitor charge mode)
switches $S_2$ and $S_3$ are closed (capacitor discharge mode)
switches $S_1$ and $S_3$ are closed (capacitor top bypass mode)
switches $S_2$ and $S_4$ are closed (capacitor bottom bypass mode).

The first switch control method cycles iteratively as follows through the modes:
capacitor discharge mode
capacitor top bypass mode
capacitor charge mode
capacitor top bypass mode in the way shown in FIG. 23. The top two waveforms of FIG. 23A show the rectified mains voltage $V_{rect}(t)$ and $V_{load}(t)$, which are identical to the waveforms of FIG. 19. The bottom two waveforms of FIG. 23B show the voltages $V_{Cpos}(t)$ and $V_{Cneg}(t)$ at the positive respectively the negative terminal of the capacitor 30 included in the full bridge 40. Note that none of the voltages attains values above the peak value of the mains voltage (325V), but the voltage $V_{Cneg}(t)$ at the negative terminal of the capacitor does show negative values. This happens particularly at the end of the capacitor charge mode and is inherent to this first switch control method: in order to be able to supply the load at the time of the mains voltage zero crossing with a voltage of $V_{C,m}$ the voltage stored in the capacitor at the end of the capacitor charge mode is at least as large as $V_{C,m}$. This is not a problem for a circuit built with discrete components, but for an integrated circuit it can be a drawback.

In the second and third switch control methods these negative voltages are prevented.

In the second switch control method the mode capacitor top bypass mode the capacitor charge mode is interchanged by capacitor bottom bypass mode. The iteratively repeated sequence of modes thus becomes:
capacitor discharge mode
capacitor top bypass mode
capacitor charge mode
capacitor bottom bypass mode in the way shown in FIG. 24. It can be seen that none of the voltages ever attains negative values, which is good for integrated circuit design. However, the voltage $V_{Cpos}(t)$ at the positive terminal of the capacitor achieves values significantly above the peak value of the mains voltage, namely 488V at 325V peak value of the 230V RMS mains voltage. This stretches the requirements set to the components, and can be a drawback.

The third switch control method mixes the properties of the first and second switch control methods. In the third switch control method the capacitor bypass mode after the capacitor charge mode is split in two parts: first capacitor top bypass mode is selected and subsequently capacitor bottom bypass mode is selected. The iteratively repeated sequence of modes thus becomes:

capacitor discharge mode
capacitor top bypass mode
capacitor charge mode
capacitor top bypass mode
capacitor bottom bypass mode in the way shown in FIG. 25. Stepping over from capacitor top bypass mode to capacitor bottom bypass mode can for instance be done when the voltage at the negative terminal of the capacitor has decreased to a value of just a few volts. Now none of the voltages ever attains negative values, and the highest voltage that ever appears is just a bit above the peak value of the mains voltage, in the example used only 355V at 325V peak value of the 230V RMS mains voltage.

For control of the switches according to the third switch control method two reference voltages $V_{ref1}$ and $V_{ref2}$ and two instantaneous voltages $V_{rect}(t)$ and $V_{Cneg}(t)$, measured real time, are used. In addition a timing signal First is used.

Timing signal First indicates whether the rectified mains voltage $V_{rect}(t)$ is in the first half (0<t<T/4) or in the second half (T/4<t<T/2) of the mains half cycle 0 ... T/2. Hence, this is a repetitive sequence with period T/2.

$$First = \begin{cases} 1 & 0 < \frac{T}{4} \\ 0 & \frac{T}{4} < t < \frac{T}{2} \end{cases} \quad (23)$$

The reference voltages $V_{ref1}$ and $V_{ref2}$ are intended to be direct (or DC) voltages, i.e. voltages that can be considered constant over time.

There are several ways to generate an actual value for the first reference voltage $V_{ref1}$. A first way is to measure the difference of voltages at anode and cathode of the first LED string (e.g. typically 128V at a mains RMS voltage of 230V) and add a minimum voltage headroom (e.g. 5V) necessary to properly bias a transistorized current regulator. This way is appropriate for non-dimmable LED drivers with low light output flicker.

A second way is to measure the real-time mains input voltage and generate an output voltage proportional to the RMS value, e.g. according to the above calculations, namely $V_{ref1} = 0.619\ V_{mains,RMS}$. This way is appropriate for dimmable LED drivers with low light output flicker.

The other required reference voltage is $V_{ref2}$, which reflects the minimum voltage headroom (e.g. 2V or 5V) necessary to properly bias a transistorized current regulator. This voltage can be generated by a transistor circuit.

The two instantaneous voltages, measured real time, which can be used to control the switches are the rectified mains voltage $V_{rect}(t)$ and the voltage $V_{Cneg}(t)$ at the negative terminal of the capacitor included in the full bridge.

The above-mentioned voltages $V_{rect}(t)$, $V_{Cneg}(t)$ are compared to the reference voltages $V_{ref1}$, $V_{ref2}$, resulting in digital control signals A, B and C.

A comparator (B6 in FIG. 26) compares the rectified mains voltage $V_{rect}(t)$ to reference voltage $V_{ref1}$ $$A = \begin{cases} 1 & V_{rect}(t) \geq V_{ref1} \\ 0 & V_{rect}(t) < V_{ref1} \end{cases}. \quad (24)$$

A comparator (B5 in FIG. 26) compares the voltage $V_{Cneg}(t)$ at the negative terminal of the capacitor to reference voltage $V_{ref1}$ $$B = \begin{cases} 1 & V_{Cneg}(t) \geq V_{ref1} \\ 0 & V_{Cneg}(t) < V_{ref1} \end{cases}. \quad (25)$$

A comparator (B4 in FIG. 26) compares the voltage $V_{Cneg}(t)$ at the negative terminal of the capacitor to reference voltage $V_{ref2}$ $$C = \begin{cases} 1 & V_{rect}(t) \geq V_{ref2} \\ 0 & V_{rect}(t) < V_{ref2} \end{cases}. \quad (26)$$

Figure 26:
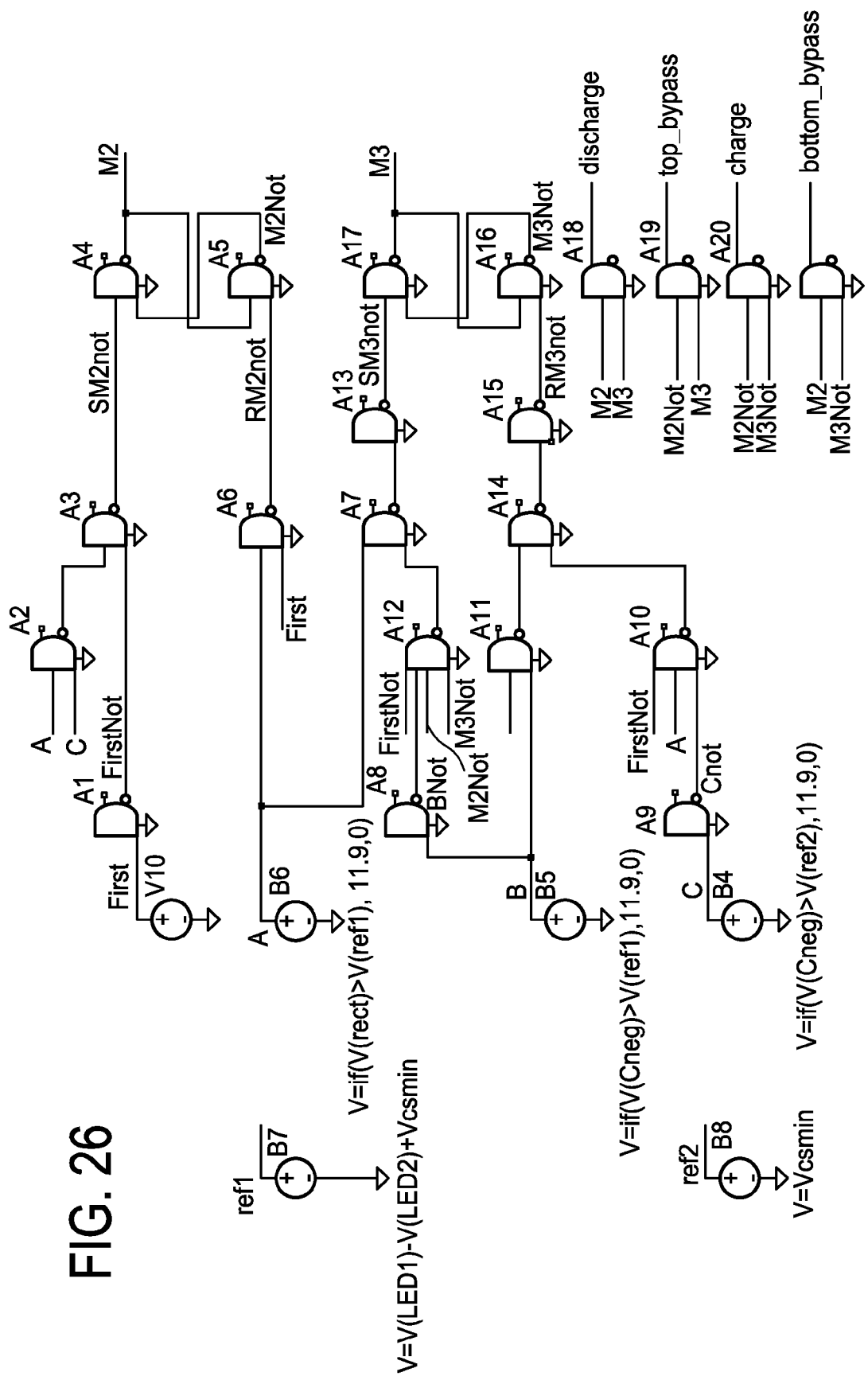
FIG. 26 shows an embodiment of a control circuit for implementing the third switch control method.

With the four digital control signals First, A, B and C the two independent switches $S_2$ and $S_3$ in the full bridge 40 can be controlled according to the third switch control method. Two Set-Reset flip-flops, built with two-input NAND gates and each having Snot (the logical inverse of S) and Rnot inputs are used to create the driving signals $M_2$ and $M_3$ for the two MOSFET switches $S_2$ and $S_3$. FIG. 26 shows an exemplary circuit diagram that realizes the required functionality of the third switch control method.

Figure 27:
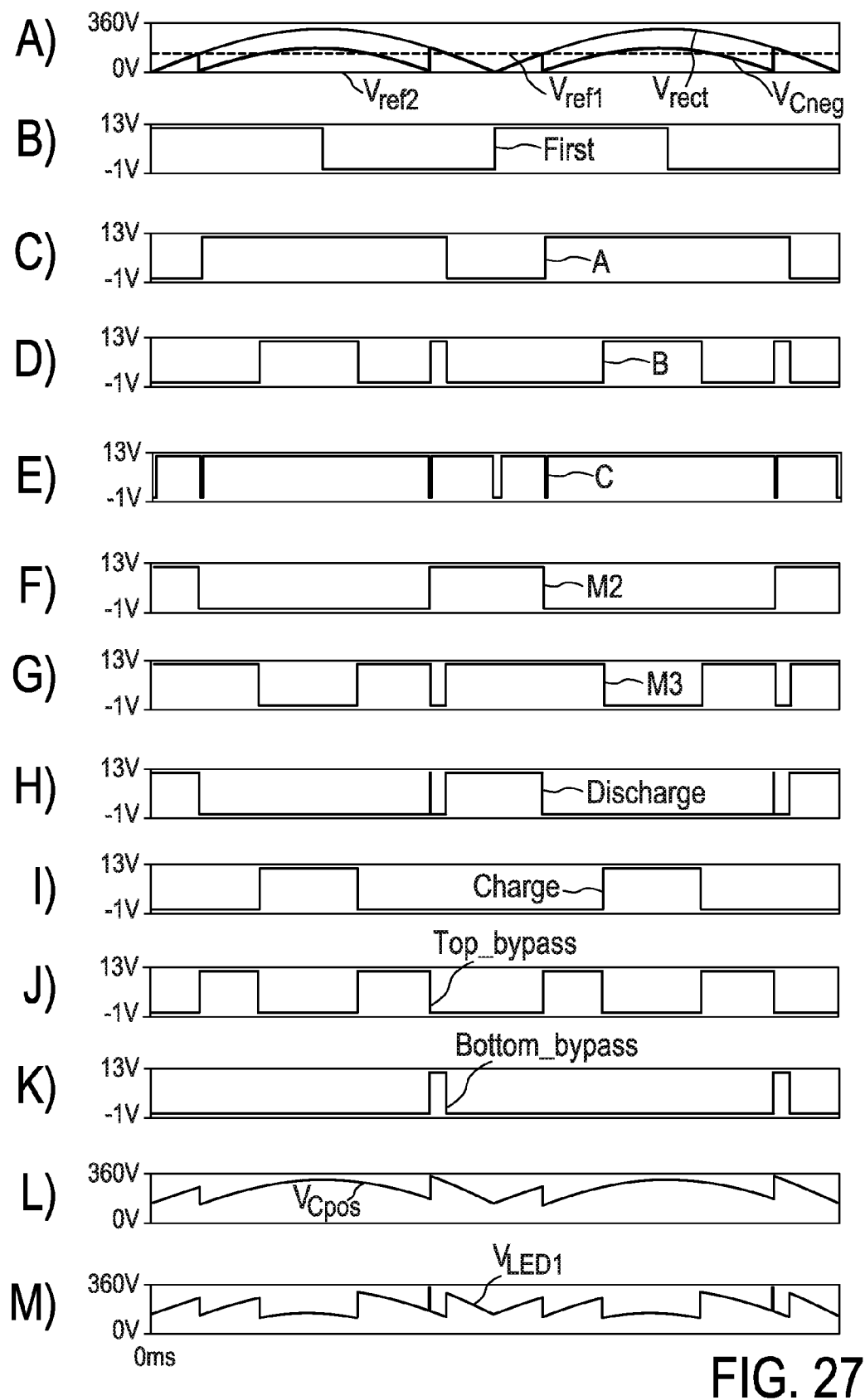
FIG. 27 shows waveforms of various voltages and logic signals using the third switch control method.

FIG. 27 shows various waveforms of voltages and logic signals as a function of time over a time span of one full mains cycle (or two mains half cycles). FIG. 27A shows the reference voltages $V_{ref1}$ and $V_{ref2}$ at levels of some 135V and 5V, respectively, the rectified mains voltage $V_{rect}(t)$ and the voltage at the negative terminal of the capacitor $V_{Cneg}(t)$. The logic signal First, shown in FIG. 27B, can be derived from the rectified mains voltage $V_{rect}(t)$.

FIGS. 27C, 27D, 27E show the logic signals A, B and C, respectively, generated by the three comparators B6, B5 and B4 of FIG. 26. FIGS. 27F and 27G show the switch control signals M2 and M3 of the two independent switches. These signals are generated by Set-Reset Flip Flops, built with NAND gates in this embodiment.

FIGS. 27H, 27I, 27J, 27K show the logic signals Discharge, Charge, Top_bypass and Bottom_Bypass which indicate the corresponding switch control modes. Especially the sequence during the negative slope of the rectified mains voltage, where the mode Top_Bypass is followed by Bottom_Bypass is characteristic for the third switch control method: none of the voltages ever attains negative values, and the highest voltage that ever appears is just a bit above the peak value of the mains voltage, in the example used only 355V at 325V peak value of the 230V RMS mains voltage.

FIGS. 27L and 27M show the voltages $V_{Cpos}(t)$ on the positive capacitor terminal and the voltage $V_{LED1}(t)$ offered to the load.

Figure 28:
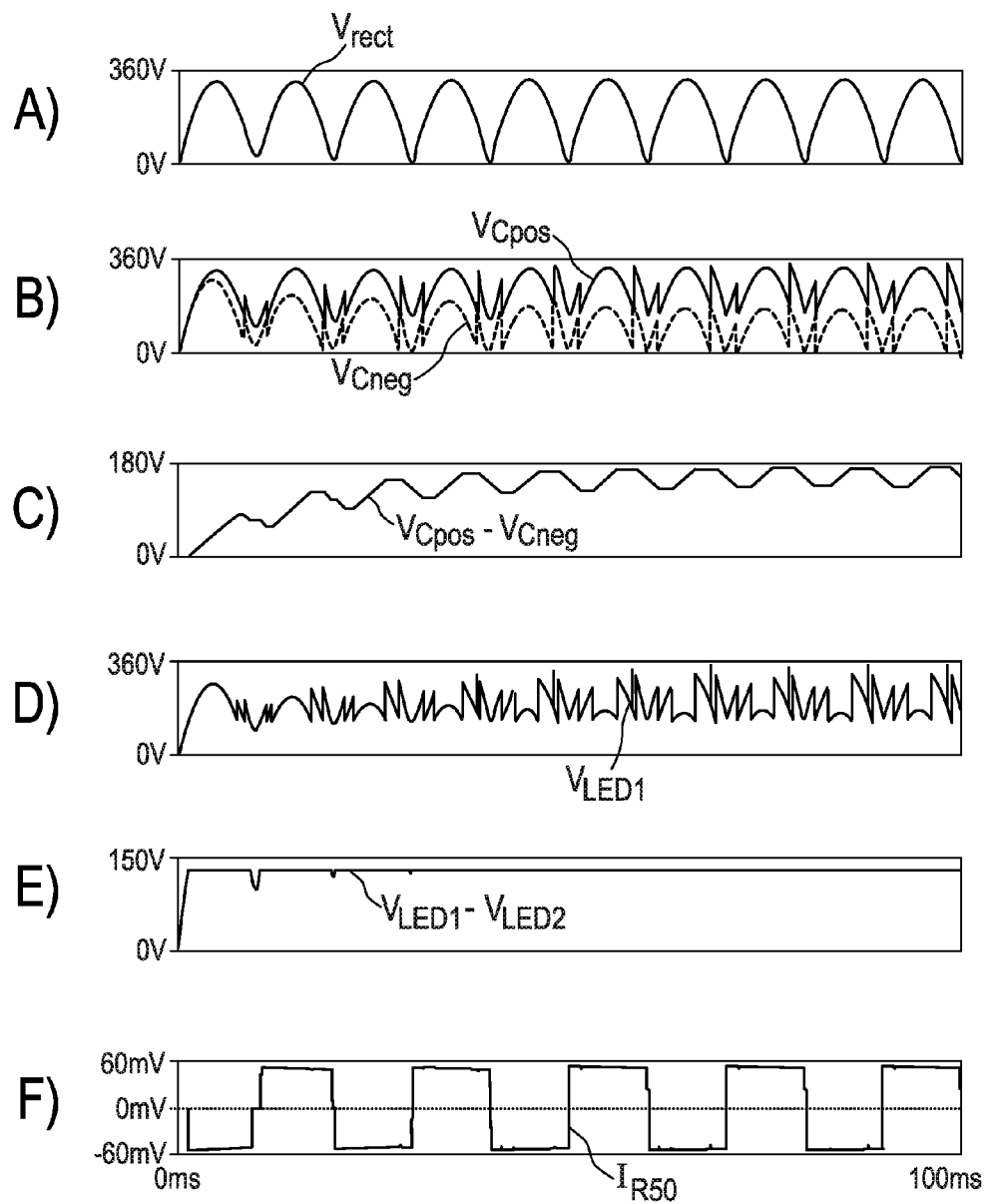
FIG. 28 shows waveforms of various signals illustrating the start-up behavior during the first 100 ms when using the third switch control method.

FIG. 28 shows the start-up behavior during the first five full mains cycles, corresponding to 0.1 sec at 50 Hz mains frequency. The FIGS. 28A and 28B show the rectified mains voltage and the voltages at the positive and negative capacitor terminals. FIG. 28C shows the differential capacitor voltage. FIG. 28D shows the resulting load voltage $V_{LED1}(t)$.

The waveforms of FIGS. 27 and 28 were taken from a system with a tapped linear LED driver as load. In this system the first high-voltage LED is a 128V LED, thus complies to the practical $V_{C,m}$ limit of equation (13). FIG. 28E shows the differential voltage across said 128V LED, and it shows that after some 40 ms the 128V LED conducts current continuously, such that this particular LED does not show light output flicker. The waveforms also show that in about 60 ms (three full mains cycles) the system has reached equilibrium.

FIG. 28F clearly shows that for this particular tapped linear LED driver the mains current has a near-zero value only during the first very few voltage zero crossings. This behavior not only depends on the series capacitor and surrounding full bridge switch network with control, but also depends on the applied load.

Stepping over from capacitor top bypass mode to capacitor bottom bypass mode in the above third switch control method requires the opening of switches $S_1$ and $S_3$, and closing of switches $S_2$ and $S_4$. As a result the nodes cpos and cneg are shifting levels over a voltage as large as the instantaneous capacitor voltage. As the switches $S_1 \ldots S_4$ are implemented by $D_{S1}$, $P_{S2}$, $P_{S3}$ and $D_{S4}$, respectively, it requires the active control of opening switch $P_{S3}$ by making its control signal M3 a logic 0 and the active control of closing switch $P_{S2}$ by making its control signal M2 a logic 1. The passive switches $D_{S1}$ and $D_{S4}$ will open and close automatically (without the need of control signals). As the influence of the level-shifting circuits (not shown) that drive the gates of the PMOS transistors $P_{S2}$ and $P_{S3}$ cannot be neglected and all kinds of parasitic effects are present such as parasitic capacitances, parasitic inductances and stored charge, it is common practice to prepare for the case that switches PS2 and PS3 are not activated synchronously, although their control signals M2 and M3 may switch states synchronously. If PS3 opens after PS2 is closed, temporarily the capacitor discharge mode is activated, which results in a positive-going glitch on the load voltage. If PS3 opens before PS2 is closed, temporarily the capacitor charge mode is activated, which results in a negative-going glitch on the load voltage. The latter case is highly unwanted, because the load voltage temporarily would be insufficient to create light output. A cheap solution then is to create a timing delay between the rising edge of the control signal M2 for PMOS transistor $P_{S2}$ and the falling edge of the control signal M3 for PMOS transistor $P_{S3}$, thus realizing a short capacitor discharge mode. This shows as a glitch at the load node, as can be seen in the graph of $V_{load}$ in FIG. 25A at t=8.1 ms and at t=18.1 ms, unless special measures are taken to guarantee that the timing delay is accurately tuned, e.g. by a feedback strategy.

In the implementations of the above first, second and third switch control methods the reference voltage $V_{ref1}$ is generated by measuring the differential voltage across high-voltage LED strings of which the summed voltage drop (say 132V) is chosen to be close to the theoretical maximum (142V). This is appropriate for non-dimmable LED drivers with low light output flicker, but is not optimal for dimmable LED drivers with low light output flicker. As soon as an input supply voltage is present with significant phase cut due to dimming, the input RMS voltage drops significantly and the implementations of the three control methods might result in light output flicker, as the system can no longer produce a load voltage larger than 132V.

The choice of the value of the applied series capacitor C in principle is a matter of cost versus performance. The control strategy of the third switch control method is appropriate when the chosen capacitor value is rather low and the capacitor voltage swing is rather high. However, simulations have shown that when the capacitor value is chosen relatively large, such that the capacitor voltage swing is small, negative voltages might show up, especially at switching instant $t_1$, when moving from the capacitor discharge mode to the capacitor top bypass mode. In particular the node cneg, to which the negative capacitor terminal is connected, might show a negative voltage at that time, which is unwanted and should be avoided.

At power up of the system all capacitors are discharged. It has already been shown in FIG. 28 that the control system can take care that the switched series capacitor is quickly charged and equilibrium is achieved. The control method that was used to generate this start-up behavior, shown in FIG. 26, has a main time constant, determined by the series capacitor itself. However, other control methods can be used, such as will be presented hereafter, of which the main time constant is larger than the one determined by the switched series capacitor, which might lead to an overcharged switched series capacitor and too high node voltages during the power-up sequence.

Hence, it is the purpose of the following explanation to propose further switch control methods which allow for a larger series capacitor value range, create less glitches, have better compatibility with phase-cut dimmers, and avoid overcharging the switched series capacitor and too high node voltages.

The glitch such as in the third switch control method can be prevented by using a control method that does not need a (near-) synchronous state change of active switches. The above first and second control methods do not have such a glitch, as at each mode transition only one active switch (either $P_{S2}$ or $P_{S3}$) changes state. However, these control methods have the drawbacks of negative voltages (control method 1) or too high positive voltages (control method 2). A solution is presented below as switch control method 4.

Additional conditions should be fulfilled in order to avoid negative voltages on nodes in the system. This requires measurement of the instantaneous differential series capacitor voltage $V_C = V_{Cpos} - V_{Cneg}$.

Capacitor overcharge can be prevented by creating a logic signal G indicating whether or not the capacitor voltage $V_C$ is above (G=0) or below (G=1) a maximum voltage indicated by a reference voltage $V_{ref3}$ that e.g. is derived from the mains voltage or is derived from LED string voltages. In the control strategy the capacitor charge mode is only allowed when this logic signal G is true=1.

Better compatibility with phase-cut dimmers can be created by using other methods to create reference voltage $V_{ref1}$. Basically it means that the reference voltage $V_{ref1}$ should be a value lower than, but close to the theoretical maximum (142V) in case of undimmed mains voltage (230V RMS). In case of dimmed mains voltage the value should decrease accordingly.

Switch control method 4 has the following properties;
at each mode transition only one active switch (either $P_{S2}$ or $P_{S3}$) changes state;
negative voltages are avoided by requiring more conditions to be fulfilled for a state transition;
capacitor overcharge can be avoided by allowing the capacitor charge mode only as long as the capacitor voltage is below a voltage limit.

Switch control method 4 cycles through the modes in the same order as switch control method 1:
capacitor discharge mode;
capacitor top bypass mode;

capacitor charge mode;
capacitor top bypass mode
in the way shown in FIG. 29 showing the voltages in the control method 4.

The three instantaneous voltages, measured in real time, which can be used to control the switches, are:
The rectified mains voltage $V_{rect}(t)$;
the capacitor voltage $V_C(t)$ of the capacitor, wrapped in a full bridge;
the voltage $V_{Cneg}(t)$ at the negative capacitor terminal.

Besides these instantaneous voltages three reference voltages are needed.

Reference voltage $V_{ref3}$ reflects the maximum voltage that ever should appear across the switched series capacitor e.g. during the start-up sequence. It can be derived e.g. from the mains voltage or from forward voltages of LED strings. At a mains RMS voltage of 230V its value can e.g. be $V_{ref3}=200V$, which is a value above the values of the voltage appearing across the capacitor in stable operation.

Reference voltage $V_{ref2}$ reflects the minimum voltage headroom (e.g. 2V) necessary to properly bias a transistorized current regulator in its active region.

Reference voltage $V_{ref1}$ can be chosen to be approximately the maximum value of the minimum load voltage that can be generated. At undimmed 230V RMS mains it amounts to approximately 140V. Other possibilities to generate $V_{ref1}$ are mentioned below.

The above-mentioned voltages $V_{rect}(t)$, $V_C(t)$ and $V_{Cneg}(t)$ are compared to reference voltages $V_{ref1}$, $V_{ref2}$ and $V_{ref3}$ to generate digital control signals A, B, C and G. In comparators A, B and C the right-hand terms are offset by a few volts in accordance with reference voltage $V_{ref2}$:

comparator A compares the rectified mains voltage $V_{rect}(t)$ to the capacitor voltage $V_C(t)$;

$$A = \begin{cases} 1 & V_{rect}(t) \geq V_C(t) + V_{ref2} \\ 0 & V_{rect}(t) < V_C(t) + V_{ref2} \end{cases}. \quad (27)$$

comparator B compares the rectified mains voltage $V_{rect}(t)$ to the reference voltage $V_{ref1}$;

$$B = \begin{cases} 1 & V_{rect}(t) \geq V_{ref1}(t) + V_{ref2} \\ 0 & V_{rect}(t) < V_{ref1}(t) + V_{ref2} \end{cases}. \quad (28)$$

comparator C compares the negative capacitor terminal voltage $V_{Cneg}(t)$ to the reference voltage $V_{ref1}$;

$$C = \begin{cases} 1 & V_{Cneg}(t) \geq V_{ref1}(t) + V_{ref2} \\ 0 & V_{Cneg}(t) < V_{ref1}(t) + V_{ref2} \end{cases}. \quad (29)$$

comparator G compares the capacitor voltage $V_C(t)$ to a maximum value indicated by reference voltage $V_{ref3}$;

$$G = \begin{cases} 0 & V_C(t) \geq V_{ref3} \\ 1 & V_C(t) < V_{ref3} \end{cases}. \quad (30)$$

Figure 30:
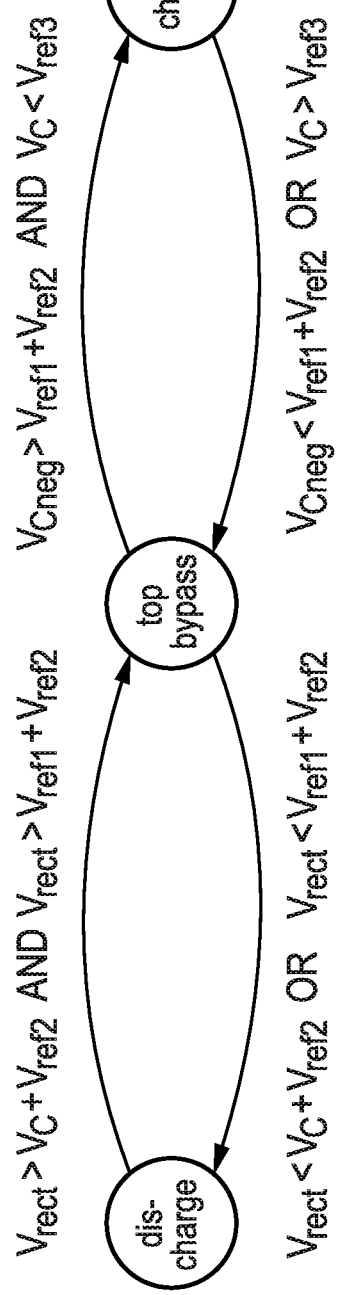
FIG. 30 shows a state diagram of the fourth switch control method in which the conditions are stated in terms of voltages.
Figure 31:
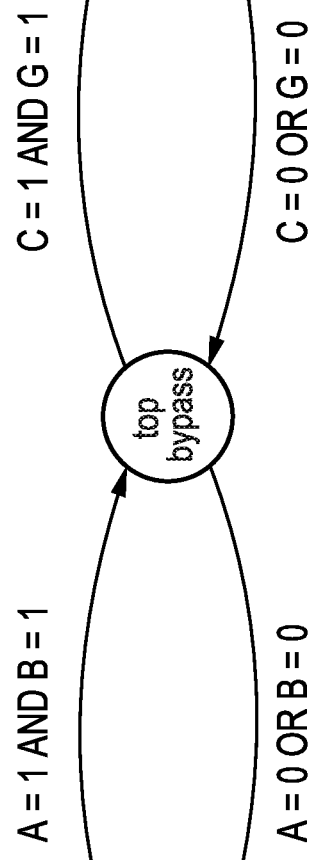
FIG. 31 shows a state diagram of the fourth switch control method in which the conditions are stated in terms of logic signals.

With the four digital control signals A, B, C and G the two independent switches $S_2$ and $S_3$ in the full bridge can be controlled according to the fourth switch control method with control signals M2 and M3, respectively, as explained in the state diagram of FIG. 30 (conditions stated in terms of voltages) or FIG. 31 (conditions stated in terms of logic signals).

The state diagrams of FIG. 30 and FIG. 31 only show three states. It is convenient to code the capacitor discharge mode with $Q_1Q_2=11$, as the required switch control signals are $M_2=1$ and $M_3=1$. Likewise the capacitor top bypass mode is coded with $Q_1Q_2=01$, and the capacitor charge mode is coded with $Q_1Q_2=00$.

Upon careful investigation of the influence of switch states on the four digital control signals A, B, C and G it can be understood that a fourth state is necessary. To move from capacitor discharge mode to capacitor top bypass mode it is required that A=1 and B=1. And to move from capacitor top bypass mode to capacitor charge mode it is required that C=1. However, when the series capacitor has a relatively large value it can occur that comparator C shows a logic high (C=1) during the time that A=0 and B=1, and switches to C=0 after comparator A switches to a logic 1 (A=1). Thus for a short time A=1 and B=1 and C=1, might, after the transition from capacitor discharge mode to capacitor top bypass mode, induce a subsequent immediate transition to capacitor charge mode. To avoid this, the mentioned fourth state is introduced. The system remains in this second capacitor top bypass state as long as comparator C shows a logic high (C=1) and moves to the original capacitor top bypass state as soon as comparator C shows a logic low (C=0). Thus two of the four states represent the capacitor top bypass mode.

For coding of the four states at least two flip-flops are needed. If it is chosen to code this second capacitor top bypass mode with the remaining combination $Q_1Q_2=10$ then the transition between the two capacitor top bypass modes requires both flip-flops $Q_1$ and $Q_2$ to toggle. Depending on inequalities in the circuit realization one of these will toggle faster than the other, which implies that for a short time either the capacitor discharge mode ($Q_1Q_2=11$) or the capacitor charge mode ($Q_1Q_2=00$) is selected which represents a highly undesirable glitch.

To avoid this glitch it is chosen to use a third flip-flop $Q_{extra}$ to distinguish between the two states representing the capacitor top bypass mode. They now are coded $Q_1Q_2Q_{extra}=010$ and $Q_1Q_2Q_{extra}=011$. The capacitor discharge mode is coded $Q_1Q_2Q_{extra}=110$ and the capacitor charge mode is coded $Q_1Q_2Q_{extra}=000$.

Figure 32:
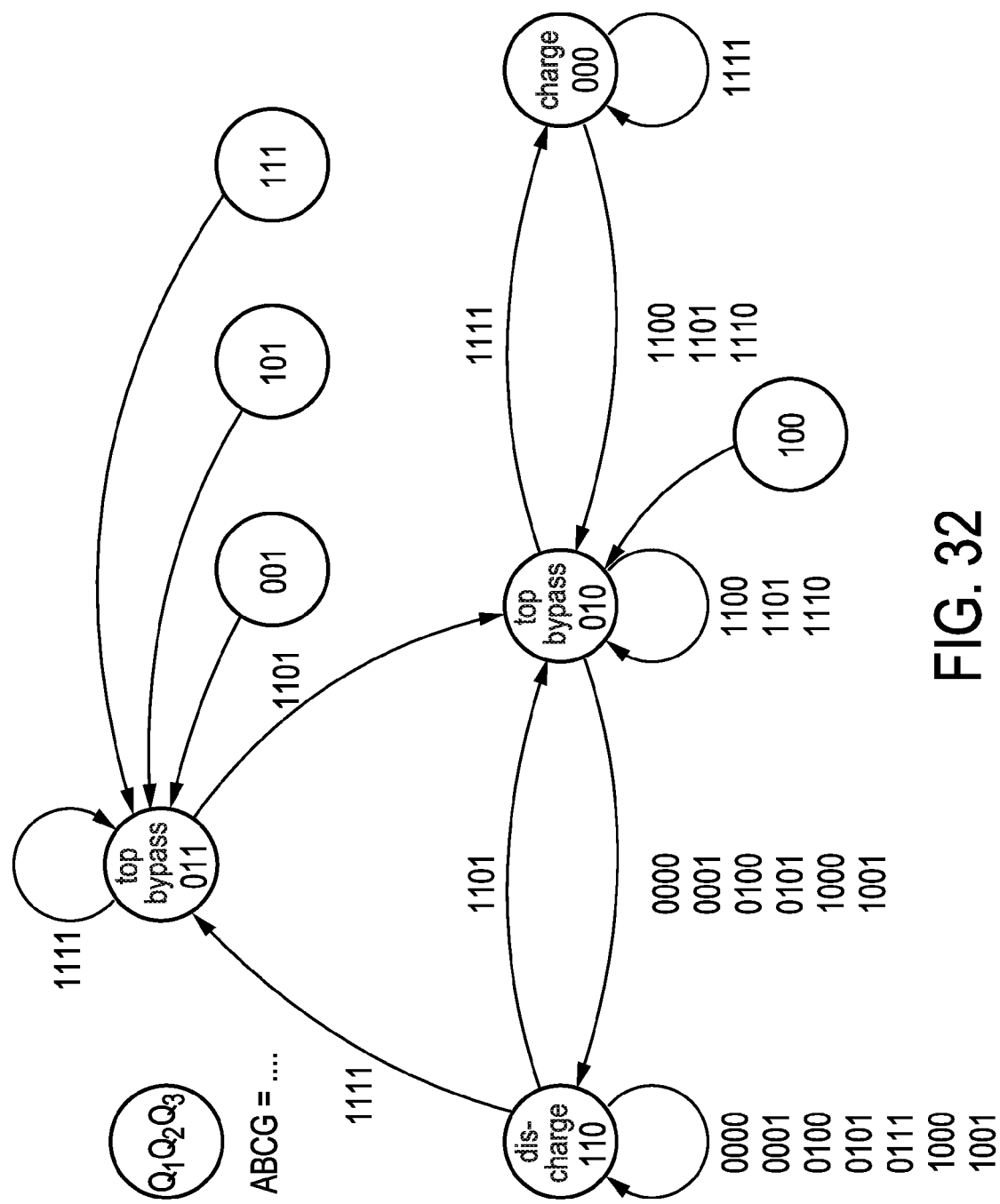
FIG. 32 shows a state diagram of the fourth switch control method with additional states.

The state diagram is extended with the remaining four states 001, 100, 101 and 111 that might show up at power up, but in principle are unused. The conditions for state transitions are chosen as shown in FIG. 32 and all conditions not mentioned imply don't care positions in the control of the three flip-flops.

The main difference with respect to the above first switch control method is the different set of conditions that have to be met in order to let the controlling state machine sequence through the states. This results in different timing.

When compared to the third switch control method the discharging time is extended and as a result also the charge time is extended and advanced, as can be clearly seen when studying the graphs of FIG. 25 and FIG. 29. All of this goes at the cost of a slightly lower guaranteed load voltage.

Practical implementations of comparators show delay and offset. Logic gates show delay. Hysteresis can be added e.g. in the comparators to reduce sensitivity to noise and disturbances e.g. on the mains voltage and to create more stable transitions of the four comparators. The addition of hysteresis is not shown in FIG. 30.

Figure 33:
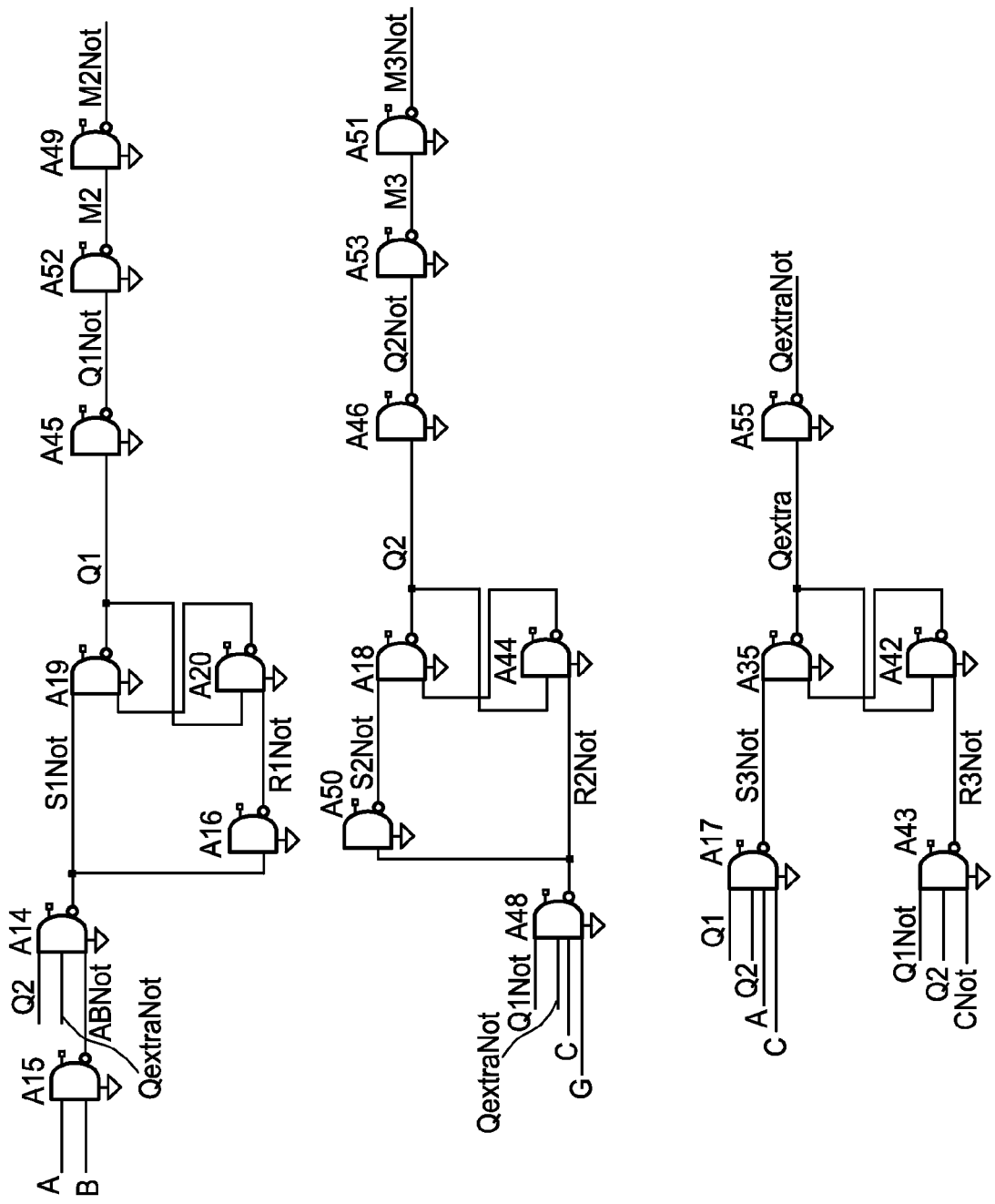
FIG. 33 shows an embodiment of a control circuit for implementing the fourth switch control method.

An implementation with three Set-Reset flip-flops, built with two-input NAND gates, is shown in FIG. 33. FIG. 33 shows a logic circuit that processes digital input signals. A, B, C and G to create the control signals M2 and M3 for switches S2 and S3, respectively, using the fourth switch control method.

The behavior of the proposed fourth switch control method, implemented by the state machine of FIG. 33, will be illustrated by various examples.

As a first example a constant current load of 50 mA is taken. Reference voltage $V_{ref1}$ is set at a fixed level of 125V (hereafter referred to as switch control method 4a) and reference voltage $V_{ref2}$ is set at a fixed level of 5V. Two subcases are investigated: either a relatively low value of the applied series capacitor (FIG. 34, C=3 μF) or a relatively large value (FIG. 35, C=20 μF). These result in relatively large (55V) and small (8V) capacitor voltage swings, respectively.

Figure 34:
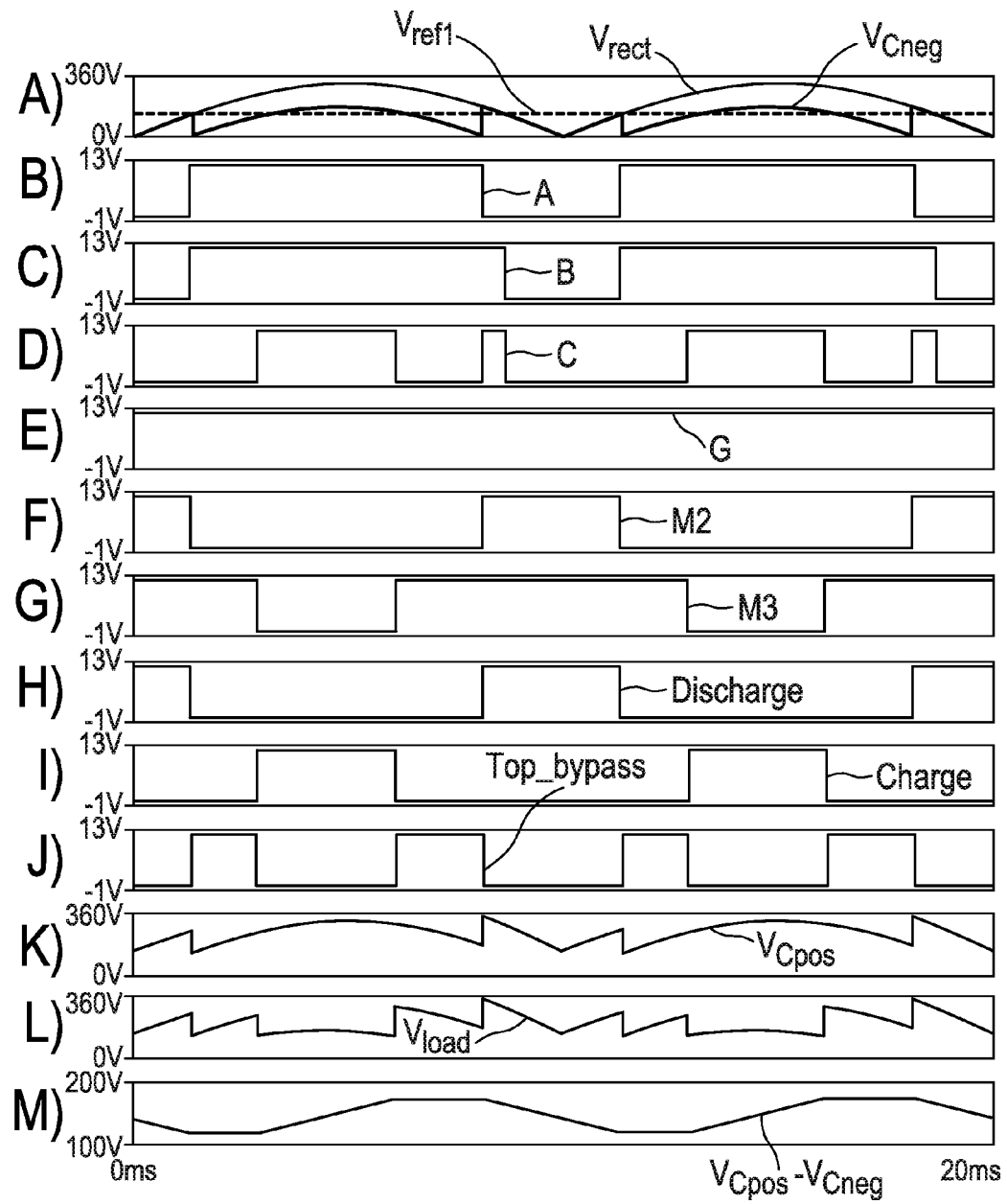
FIG. 34 shows waveforms of various voltages and logic signals using a first variant of the fourth switch control method in case of a relatively small series capacitor value.
Figure 35:
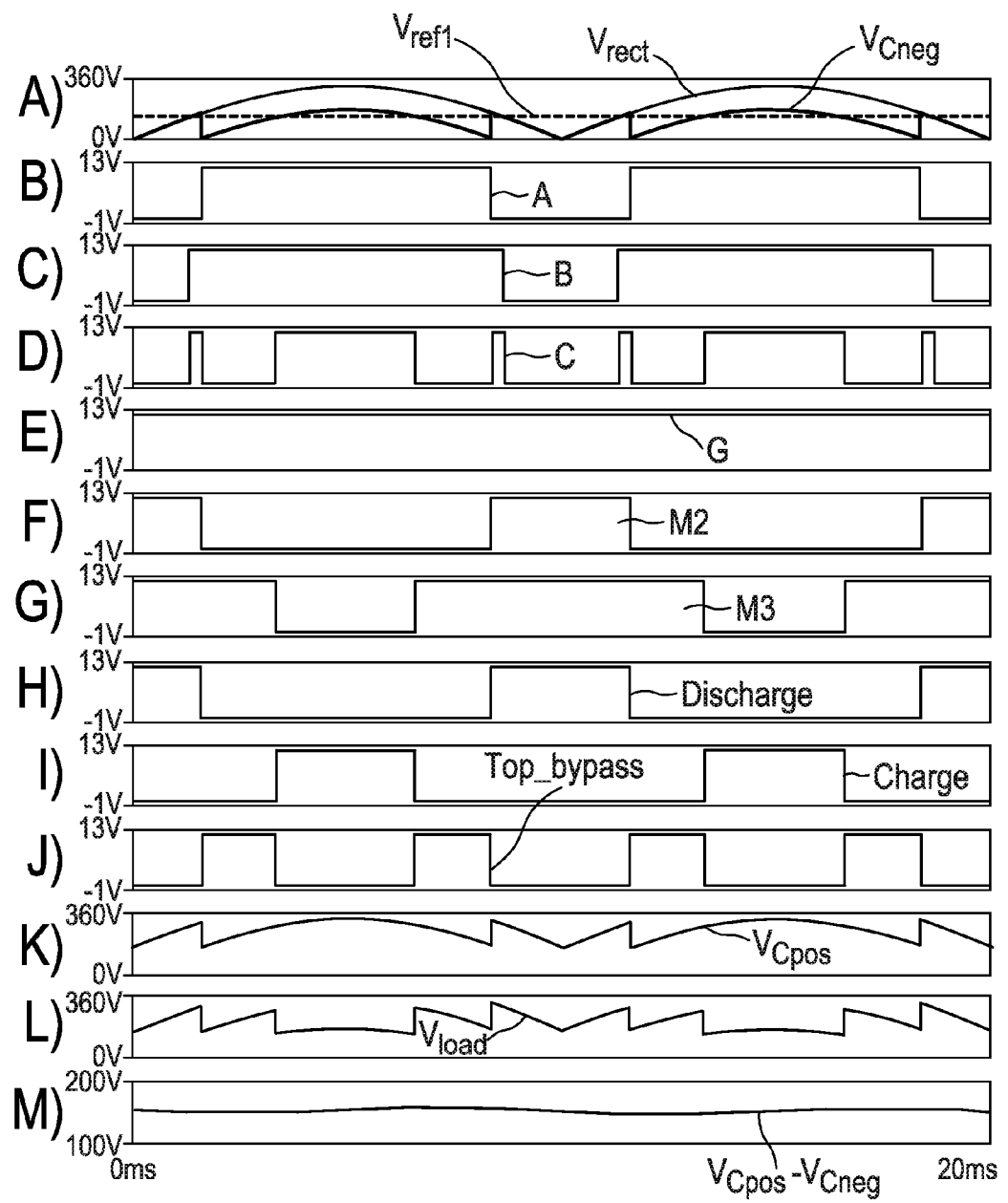
FIG. 35 shows waveforms of various voltages and logic signals using a first variant of the fourth switch control method in case of a relatively large series capacitor value.

FIGS. 34 and 35 show various waveforms of voltages and logic signals as a function of time over a time span of one full mains cycle (two mains half cycles) with a circuit in equilibrium for the case of relatively small series capacitor value (FIG. 34) and for the case of relatively large series capacitor value (FIG. 35).

FIGS. 34A and 35A show the reference voltage $V_{ref1}$, which is set at a level of 125 V, and the rectified mains voltage $V_{rect}(t)$ and the voltage at the negative terminal of the capacitor $V_{Cneg}(t)$.

FIGS. 34B-E and 35B-E show the logic signals A, B, C and G, respectively, generated by four comparators. These comparators implement the comparisons of equations (27), (28), (29) and (30) and are equipped with some hysteresis and show delay.

FIGS. 34F, G and 35F, G show the switch control signals M2 and M3 of the two independent switches, generated by the state machine of FIG. 33.

FIGS. 34H-J and 35H-J show the logic signals Discharge, Charge and Top_Bypass which indicate the corresponding switch control modes.

FIGS. 34K-M and 35K-M show the voltages $V_{Cpos}(t)$ on the positive capacitor terminal, the voltage $V_{load}(t)$, offered to the load, and the differential series capacitor voltage $V_{Cpos}(t) - V_{Cneg}(t)$.

In both cases the minimum load voltage is about 130V (equal to the set level of $V_{ref1}+V_{ref2}$=130V).

For the case of relatively small series capacitor value (FIG. 34, C=3 μF) the maximum load voltage is about 355V. At the mains voltage zero crossing the load voltage is 144V. The differential series capacitor voltage cycles between 121V and 176V.

For the case of relatively large series capacitor value (FIG. 35, C=20 μF) the maximum load voltage is about 325V. At the mains voltage zero crossing the load voltage is 151V. The differential series capacitor voltage cycles between 147V and 155V.

None of the circuit node voltages ever attains negative values.

In above example of switch control method 4a the reference voltage $V_{ref1}$ was set to a fixed value of 125V, similar to the method proposed in switch control method 3.

However, reference voltage $V_{ref1}$ can also be generated in other ways. Another possibility, better suited for use with phase-cut dimmers, is to offer a lower value of the reference voltage $V_{ref1}$ in case a value of the minimum load voltage close to the theoretical maximum (142V at an undimmed mains RMS voltage of 230V) can no longer be maintained, e.g. during start-up or due to phase-cut dimming.

In switch control method 4b the reference voltage $V_{ref1}$ is selected from a range of possibilities. In the example shown below the range contains two values. The choice is made using a logic signal Normal, which indicates whether or not the differential series capacitor voltage $V_C$ is high enough to supply two LED strings (125V in the example). In case logic signal Normal is false the reference voltage $V_{ref1}$ is chosen equal to a single LED string voltage (63V in the examples). In case Normal is true the reference voltage $V_{ref1}$ is chosen equal to the sum of the first and second LED string voltages (125V in the examples).

$$V_{ref1} = \begin{cases} V_{LED1} + V_{LED2} & \text{Normal} = 1 \\ V_{LED1} & \text{Normal} = 0 \end{cases} \quad (31)$$

The logic signal Normal can be generated by a comparator, comparing the capacitor voltage $V_C$ to a reference voltage $V_{ref4}$, as indicated below $$\text{Normal} = \begin{cases} 1 & V_C(t) \geq V_{ref4} \\ 0 & V_C(t) < V_{ref4} \end{cases} \quad (32)$$

The reference voltage $V_{ref4}$ can be chosen to have a value in the range between $V_{LED1}$ and $V_{LED1}+V_{LED2}$, e.g. $V_{ref4}$=1.1 $V_{LED1}$ (73V in the examples).

Figure 36:
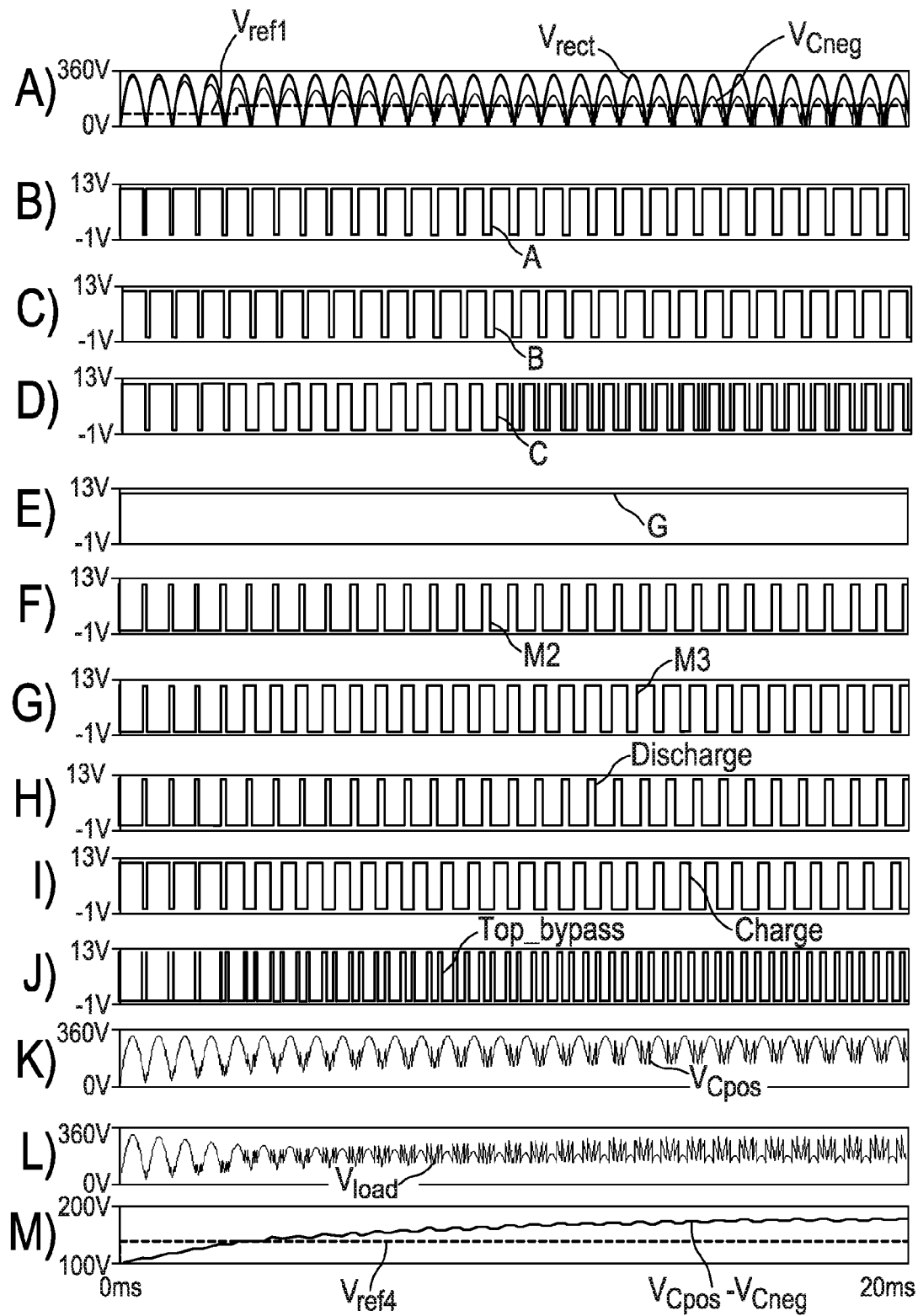
FIG. 36 shows waveforms of various voltages and logic signals using a second variant of the fourth switch control method in case of a relatively large series capacitor value.

FIG. 36 shows the waveforms of the first 300 ms after start-up with an empty series capacitor with a value of C=20 μF. In FIG. 36M the reference voltage $V_{ref4}$=73 V is shown together with the differential capacitor voltage $V_C=V_{Cpos}-V_{Cneg}$. At t=45 ms the differential capacitor voltage $V_C$ crosses the level of $V_{ref4}$=73V. Logic signal Normal (not shown) switches to a logic high and the first waveform strip shows that the reference voltage $V_{ref1}$ switches from 63V to 125V, see equation (31). The effect of the toggling reference voltage $V_{ref1}$ is clearly shown in the waveform strip of $V_{load}$ depicted in FIG. 36L.

In switch control method 4c the reference voltage $V_{ref1}$ is not held at a fixed level, nor is selected from a limited set of possibilities, but is a true analog quantity, e.g. controlled by a (minimum) peak detector. This method 4c is particularly intended to be independent of the forward voltages of the various high-voltage LEDs or, more general, intended to be independent of whatever load is connected (apart from a short circuit of course). To that end the minimum voltage level $V_{min}$ is derived from the local minima of the load voltage over at least half a mains cycle but preferably over a few cycles and that level is used as reference voltage $V_{ref1}$. The active switches are controlled to push this voltage level as high as possible.

A peak detector can be used to generate $V_{min}$. In its simplest form a resistor, a capacitor and a diode are needed to implement the circuit.

Figure 37:
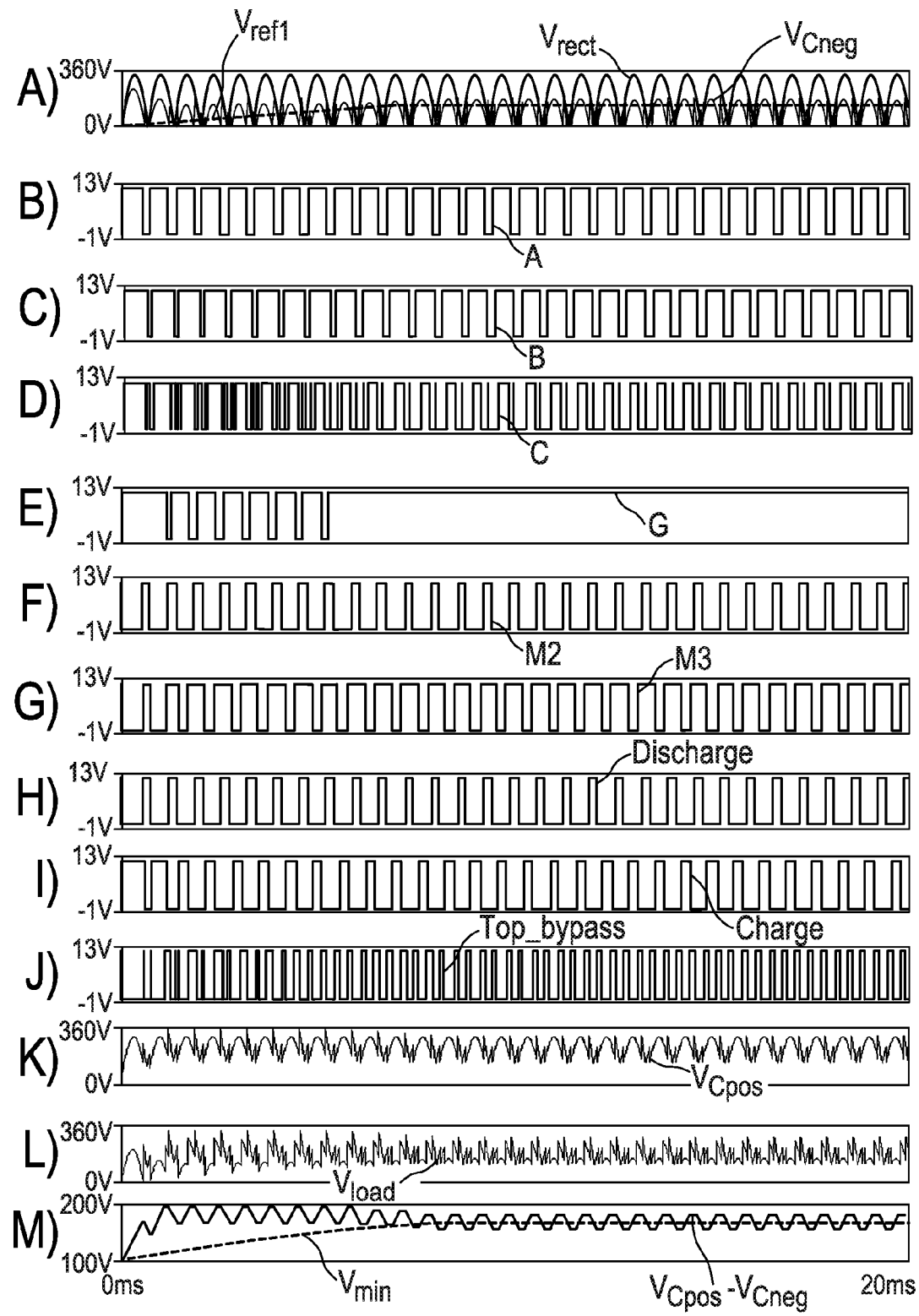
FIG. 37 shows waveforms of various voltages and logic signals using a third variant of the fourth switch control method in case of a relatively small series capacitor value.
Figure 38:
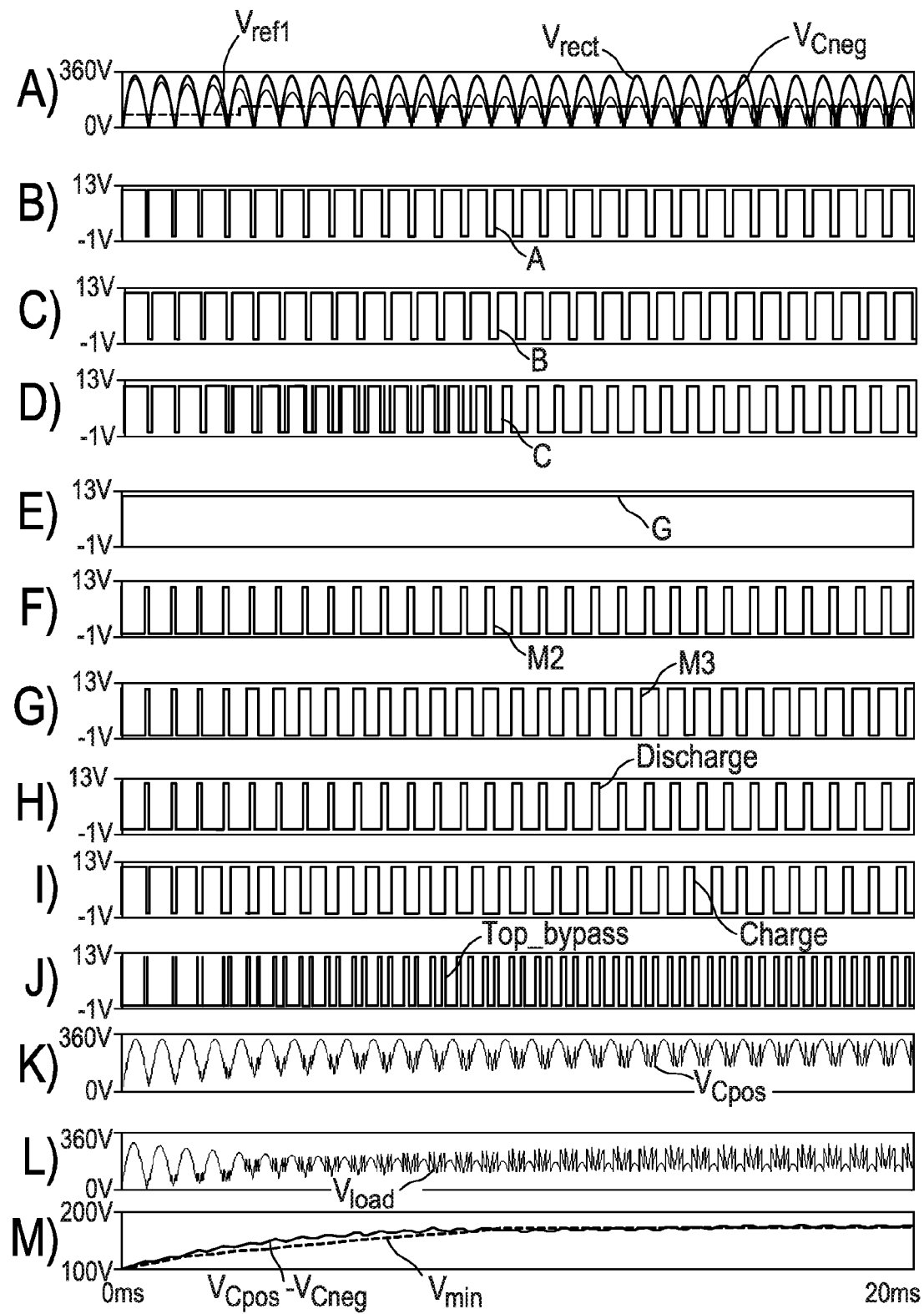
FIG. 38 shows waveforms of various voltages and logic signals using a third variant of the fourth switch control method in case of a relatively large series capacitor value.

Again two subcases are investigated: either a relatively low value of the applied series capacitor (FIG. 37, C=3 μF) or a relatively large value (FIG. 38, C=20 μF). Both figures show the behavior in the first 300 ms after start-up.

For the case of relatively small series capacitor value (FIG. 37, C=3 μF) the minimum load voltage, once equilibrium has been achieved, is about 133V. The maximum load voltage achieves values up to 375V in the start-up phase and is about 330V in equilibrium. At the mains voltage zero crossing the load voltage in equilibrium is 133V. The differential series capacitor voltage is initially quickly charged to 180V, at which time the capacitor charging mode is ended by the control signal G, indicating that the limiting function is activated to prevent overcharge of the series capacitor (the limit value is set to $V_{ref3}$=180V). This limiting functionality in total is activated seven times during the start-up phase (see waveform strip shown in FIG. 37E). In equilibrium the differential series capacitor voltage cycles between 111V and 165V.

For the case of relatively large series capacitor value (FIG. 38, C=20 μF) the maximum load voltage in the start-up phase is 310V and in equilibrium reduces to about 290V. The minimum load voltage, once equilibrium has been achieved, is about 138V. At the mains voltage zero crossing the load voltage in equilibrium is 138V. The differential series capacitor voltage cycles between 136V and 144V. Note that the capacitor charge limiting function is not activated (see the waveform strip shown in FIG. 38E).

None of the circuit node voltages ever attains negative values.

In summary, when operating a High Voltage LED from a mains voltage supply, both the electrical input waveform and the optical output waveform have to fulfill certain criteria. According to the present invention a switched capacitive current limiting device and method are proposed. A capacitor is to be switched into the DC current path of the LED string. Via some surrounding switches (e.g. implemented by means of CMOS bidirectional analog switch IC), the effective polarity of the capacitor can be set to be positive or negative or the capacitor can be bypassed. When the instantaneous value of the rectified mains voltage is higher than the LED voltage, the excess voltage is used to charge the capacitor. When the instantaneous value of the rectified mains voltage is lower than the LED voltage, the (previously charged) capacitor is connected with the opposite polarity, hence boosting the voltage such that the LED can be operated.

Using the capacitor to store and release the excess voltage (and energy) will improve the efficiency of the total system, compared to the lossy current limitation used normally. The method proposed here does not create a large phase shift on the AC input side, hence power factor is high. The general method can be used with any high voltage LED, but in combination with LED strings with variable forward voltage, e.g. a tapped LED string, the size and voltage rating of the capacitor can be reduced.

The present invention can be used for driving various types of loads and in various applications. For instance, the invention can be applied for LED lighting equipments, e.g. high efficient and high power factor "linear" HV LED drivers for mains-powered general illumination. The proposal can be applied in LED lighting and other applications, in particular high and low voltage AC driving of LED lamps (ACLED), low-cost LED lamps, such as tapped linear drivers for LED retrofit bulbs and modules, and LED lamps and modules with integrated drivers.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A driver device for driving a load, comprising an LED assembly comprising one or more LEDs, said driver device comprising:
   a rectifier unit for rectifying a received AC supply voltage, load terminals for providing at least one of a drive voltage and a drive current for driving said load,
   a capacitive storage unit coupled between said rectifier unit and said load terminals for storing electrical energy provided by said rectifier unit and providing electrical energy to said load, and
   a bridge switching unit coupled between said rectifier unit and said load for switching said capacitive storage unit into a load current path from said rectifier unit to said load terminals with a desired polarity, for switching said capacitive storage unit out of said load current path, and for maintaining the load current path during an entire AC cycle.

2. The driver device as claimed in claim 1, wherein said bridge switching unit comprises a full bridge of two switch paths coupled in parallel each comprising two switches coupled in series, wherein said capacitive storage unit is coupled between series coupling terminals of said two parallel switch paths, at which series coupling terminals the two switches of each of said two switch paths are connected.

3. The driver device as claimed in claim 1, wherein said capacitive storage unit comprises a single capacitor.

4. The driver device as claimed in claim 1, wherein said capacitive storage unit comprises two or more capacitors coupled in parallel, and wherein said bridge switching unit is adapted for separately switching each capacitor into or out of said load current path.

5. The driver device as claimed in claim 4, wherein said bridge switching unit comprises an additional capacitor switch per capacitor at least some capacitors which additional capacitor switch is coupled in series to its associated capacitor.

6. The driver device as claimed in claim 4, wherein said bridge switching unit comprises an additional switch path per capacitor for at least some capacitors coupled in parallel to the two switch paths of the full bridge.

7. The driver device as claimed in claim 1, further comprising a current source coupled between said rectifier unit and said load terminals.

8. The driver device as claimed in claim 1, wherein said bridge switching unit is controlled to switch said capacitive storage unit into said load current path with a first polarity when the instantaneous value of the rectified supply voltage is higher than the load voltage and to switch said capacitive storage unit into said load current path with a second polarity opposite the first polarity when the instantaneous value of the rectified supply voltage is lower than the load voltage.

9. The driver device as claimed in claim 1, wherein said bridge switching unit is controlled to alternately switch said capacitive storage unit into said load current path with the first and second polarity, in particular once, twice or four times during a half cycle of the rectified supply voltage.

10. The driver device as claimed in claim 8, wherein said bridge switching unit is controlled to control timing of the switching of said capacitive storage unit into said load current path with said different polarities by a delay time with respect to the zero crossings of the rectified supply voltage.

11. The driver device as claimed in claim 1, wherein said bridge switching unit is controlled to switch said capacitive storage unit out of said load current path when the electrical energy stored in the capacitive storage unit shall not be used for supplying the load.

12. The driver device as claimed in claim 1, wherein said bridge switching unit is controlled to charge said capacitive storage unit to a predetermined capacitor voltage, in particular to a predetermined initial capacitor voltage.

13. The driver device as claimed in claim 2, wherein said switches are implemented as bidirectional or unidirectional switches, in particular comprising one or more PMOS transistors, NMOS transistors or diodes.

14. A method for driving a load, comprising an LED assembly comprising one or more LEDs, said driver method comprising the steps of:
 rectifying a received AC supply voltage by a rectifier unit,
 providing at least one of a drive voltage and a drive current at load terminals for driving said load,
 storing electrical energy provided by said rectifier unit and providing electrical energy to said load by a capacitive storage unit coupled between said rectifier unit and said load terminals,
 switching said capacitive storage unit into a load current path from said rectifier unit to said load terminals with a desired polarity,
  switching said capacitive storage unit out of said load current path by a bridge switching unit coupled between said rectifier unit and said load, and
  maintaining the load current path during an entire AC cycle.

15. The method as claimed in claim 14, further comprising:
 coupling in parallel said bridge switching unit comprising a full bridge of two switch paths each comprising two switches coupled in series,
 coupling between series coupling terminals of said two parallel switch paths said capacitive storage unit at which series coupling terminals the two switches of each of said two switch paths are connected.

16. The method as claimed in claim 14, further comprising:
 separately switching each capacitor into or out of said load current path, wherein said capacitive storage unit comprises two or more capacitors coupled in parallel.

17. The method as claimed in claim 14,
 controlling said bridge switching unit to switch said capacitive storage unit into said load current path with a first polarity when the instantaneous value of the rectified supply voltage is higher than the load voltage, and
 controlling said bridge switching unit to switch said capacitive storage unit into said load current path with a second polarity opposite the first polarity when the instantaneous value of the rectified supply voltage is lower than the load voltage.

18. The method as claimed in claim 17,
 controlling timing of the switching of said capacitive storage unit into said load current path with said different polarities by a delay time with respect to the zero crossings of the rectified supply voltage.

19. The method as claimed in claim 14,
 controlling said bridge switching unit to alternately switch said capacitive storage unit into said load current path with the first and second polarity, in particular once, twice or four times during a half cycle of the rectified supply voltage.

20. A light apparatus comprising:
 a light unit, comprising one or more LEDs, and
 a driver device coupled to said light unit for driving said light unit, comprising:
 a rectifier unit for rectifying a received AC supply voltage,
 load terminals for providing at least one of a drive voltage and a drive current for driving said load,
 a capacitive storage unit coupled between said rectifier unit and said load terminals for storing electrical energy provided by said rectifier unit and providing electrical energy to said load, and
 a bridge switching unit coupled between said rectifier and said load for switching said capacitive storage unit into the load current path from said rectifier unit to said load terminals with a desired polarity, for switching said capacitive storage unit out of said load current path, and for maintaining a load current path during an entire AC cycle.

* * * * *